US008195555B2

(12) United States Patent
Robb

(10) Patent No.: US 8,195,555 B2
(45) Date of Patent: *Jun. 5, 2012

(54) METHOD AND SYSTEM FOR ENABLING COLLABORATION BETWEEN ADVISORS AND CLIENTS

(75) Inventor: Paul H. Robb, Tucson, AZ (US)

(73) Assignee: Collaborate Solutions Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,411

(22) Filed: Dec. 10, 2010

(65) Prior Publication Data

US 2011/0137823 A1   Jun. 9, 2011

Related U.S. Application Data

(63) Continuation of application No. 09/877,926, filed on Jun. 8, 2001, now Pat. No. 7,890,405, which is a continuation-in-part of application No. 09/732,008, filed on Dec. 8, 2000, now Pat. No. 7,848,984.

(60) Provisional application No. 60/210,460, filed on Jun. 9, 2000.

(51) Int. Cl.
*G06Q 40/00* (2012.01)

(52) U.S. Cl. ............................ 705/36 R; 705/37; 705/35

(58) Field of Classification Search .................... 705/35, 705/36 R, 26, 80, 50; 709/204, 217, 227; 379/202.1

See application file for complete search history.

(56) References Cited

U.S. PATENT DOCUMENTS

| 4,694,397 A | * | 9/1987 | Grant et al. | 705/42 |
| 4,742,457 A | * | 5/1988 | Leon et al. | 705/35 |
| 5,006,998 A | * | 4/1991 | Yasunobu et al. | 705/36 R |
| 5,231,571 A | * | 7/1993 | D'Agostino | 705/36 R |
| 5,606,496 A | * | 2/1997 | D'Agostino | 396/235 |
| 5,706,452 A | * | 1/1998 | Ivanov | 715/751 |
| 5,710,889 A | * | 1/1998 | Clark et al. | 235/379 |
| 5,745,706 A | * | 4/1998 | Wolfberg et al. | 705/35 |
| 5,787,175 A | * | 7/1998 | Carter | 713/165 |
| 5,819,230 A | * | 10/1998 | Christie et al. | 705/4 |
| 5,873,071 A | * | 2/1999 | Ferstenberg et al. | 705/36 R |
| 5,890,129 A | * | 3/1999 | Spurgeon | 705/4 |

(Continued)

OTHER PUBLICATIONS

Leonard et al. "The role of budget and financial reform in making government work better and cost less" Spring 1995 Public Budgeting & Finance v15n1 pp. 4-18.*
Wood, James O "Public pension plans in the third millennium" Third Quarter 1996 Benefits Quarterly v12n3 pp. 69-74.*
McMahan, Kevin L. "The Program Financial Advisor" Summer/Autumn 1998, Financier, V5N2/3, pp. 40-54.*

(Continued)

*Primary Examiner* — Kelly Campen
(74) *Attorney, Agent, or Firm* — Pillsbury Winthrop Shaw Pittman LLP

(57) ABSTRACT

A common collaboration tool enables advisors, their clients and other participants to interact in a coordinated manner in various areas of interest. A client authorizes selected advisors as well as other participants to view, discuss, modify and perform other operations in response to the client's request for services. A client defines the scope of authorization for advisors and/or other participants for security and confidentiality reasons. Advisors (and/or participants) access information submitted (or authorized) by the client to collaborate as a cohesive team in sharing information, devising a plan, addressing client's concerns, drafting (or modifying) a document and performing other services for the client.

20 Claims, 43 Drawing Sheets

U.S. PATENT DOCUMENTS

| | | | | |
|---|---|---|---|---|
| 5,913,202 | A | * | 6/1999 | Motoyama .................. 705/36 R |
| 5,918,217 | A | * | 6/1999 | Maggioncalda et al. ... 705/36 R |
| 5,940,843 | A | * | 8/1999 | Zucknovich et al. ......... 715/210 |
| 6,154,753 | A | * | 11/2000 | McFarland .................... 715/221 |
| 6,195,091 | B1 | * | 2/2001 | Harple et al. ................. 715/751 |
| 6,243,722 | B1 | * | 6/2001 | Day et al. ..................... 715/205 |
| 6,266,683 | B1 | * | 7/2001 | Yehuda et al. ................ 715/234 |
| 6,356,909 | B1 | * | 3/2002 | Spencer ................................ 1/1 |
| 6,430,542 | B1 | * | 8/2002 | Moran ........................ 705/36 R |
| 6,502,113 | B1 | * | 12/2002 | Crawford et al. ............. 715/210 |
| 6,551,357 | B1 | * | 4/2003 | Madduri ....................... 715/235 |
| 6,581,039 | B2 | * | 6/2003 | Marpe et al. ................. 705/7.29 |
| 7,848,984 | B1 | | 12/2010 | Robb |
| 2002/0091725 | A1 | * | 7/2002 | Skok .......................... 707/501.1 |
| 2003/0107587 | A1 | * | 6/2003 | Maritzen et al. .............. 345/700 |

OTHER PUBLICATIONS

Paul Thurrott's WinInfo, http://www.wininformant.com/display.asp?ID=2996, printed Dec. 6, 2000.

Leonard et al., "The Role of Budget and Financial Reform in Making Government Work Better and Cost Less", *Public Budgeting & Finance*, vol. 15, No. 1, Spring 1995, pp. 4-18.

Wood, James O., "Public Pension Plans in the Third Millennium", *Benefits Quarterly*, vol. 12, No. 3, Third Quater 1996, pp. 69-74.

McMahan, Kevin L., "The Program Financial Advisor", *Financier*, vol. 5, Nos. 2/3, Summer/Autumn 1998, pp. 40-54.

\* cited by examiner

Collaborative Module
126
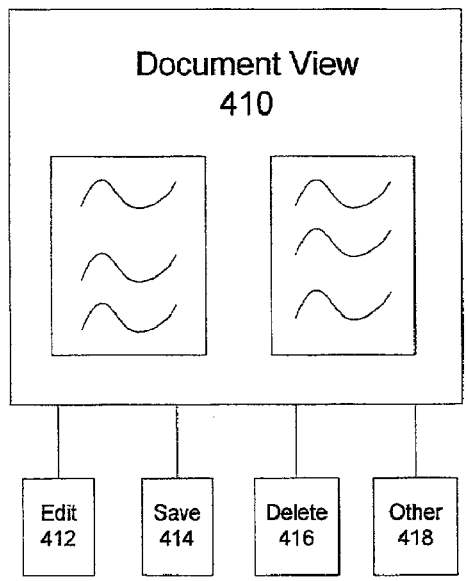
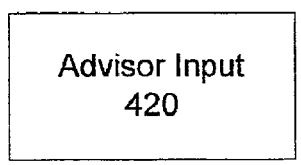
Advisor Input
420
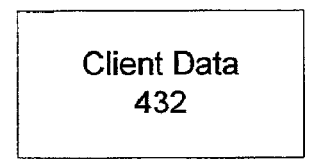
Client Data
432
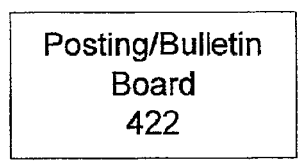
Posting/Bulletin Board
422
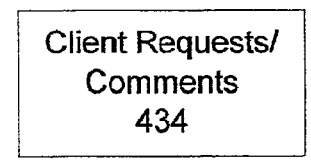
Client Requests/Comments
434
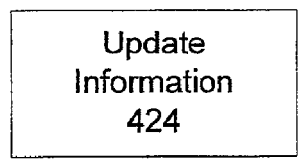
Update Information
424
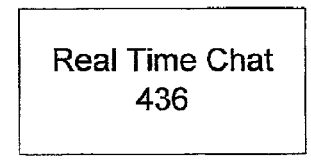
Real Time Chat
436
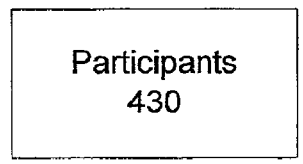
Participants
430
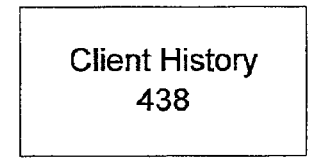
Client History
438
FIG. 4

Registration Information *(Note: fields marked with * are required)*

*Name (First,Middle,Last)

*Email Address

Login Information

*Login ID

*Password

*Re-enter Password

Billing Information

The charges for this client (5$/mo.) will be added to your bill

Discount ⊙ I would like to pay by the month (at the price shown above)
○ I would like to receive a 20% discount by paying for a full year Sign Up  Cancel

← 1304

Copyright 2000-2001 © Collaborate Solutions, Inc.
Suggestions & Comments

Done  |  🖳 | ⊗ Internet

| Name | Specialty | State | City | Description | Action |
|---|---|---|---|---|---|
| John Doe | Attorney | DC | Washington | AV Rated | ADD ~1602 |
| Jane Does | Accountant | DC | Washington | CPA | ADD ~1602 |
| John Doe | Financial Planner | DC | Washington | | ADD ~1602 |

1600

Done

FIG. 16

Add Document

Folder to add document: My Documents

Select document to upload:

| Files | Size |
|---|---|

← 1910

Select File   Remove File

← 1902

Document Name: [_____] ← 1912

Email notification? ☐ ← 1989

Comments

← 1990

OK   Cancel

Add Document Version

Document Name: test3

Files | Size

Select document to upload: 2710

[Select File] 2702  [Remove File]

Email notification? ☐ —2715

Comments

2790

[OK] 2714  [Cancel]

Copyright 2000-2001 © Collaborate Solutions, Inc.
Suggestions & Comments

2700

? Help

FIG. 27

| 2901 | 2902 | 2903 | 2904 | 2905 | 2906 | |
|---|---|---|---|---|---|---|
| New Folder | New Document | Delete | Move | Lock | Unlock | Search |

Folders for: Rosenbloom, Brian S Note: You are now viewing a Client area  ? Help 📁 My Documents ⇐ ▬ Currently Open Folder (Contents displayed below) ← 2950

| Select | File Name | Version | Size | Access | Created | Last Changed | Last Changed By | Locked By |
|---|---|---|---|---|---|---|---|---|
| ☐ | 📁 folder 1 | | | R | 5/18/2001 11:14am | | | |
| ☐ | test2 | 3 | 1 | RWD | 5/19/2001 8:58pm | 5/19/2001 9:01pm | Gatto, James | Rosenbloom, Brian |
| ☐ | test2a | 1 | 8 | RWD | 5/19/2001 9:02pm | 5/19/2001 9:02pm | Gatto, James | |
| ☐ | ⊙ 📄 test3 | 4 | 367 | RWD | 5/20/2001 6:40pm | 5/21/2001 3:16pm | Gatto, James | Rosenbloom, Brian |

2952  2954

Copyright 2000-2001 © Collaborate Solutions, Inc.
Suggestions & Comments

Side menu: How it Works, My Account, My Clients, My Documents, My Calendar, E-Mail, Financial Planning, Continuing Education, Active Documents, Library, Help Desk, Other Resources, Sign Off

| Document | Version | Date | Change Action | Changed by | Source Folder | Move Folder |
|---|---|---|---|---|---|---|
| test.doc | 1 | 5/19/2001 2:58:25 PM | add | James G. Gatto | folder 1 | |
| test.doc | 1 | 5/19/2001 2:58:34 PM | read | James G. Gatto | folder 1 | |
| test.doc | 1 | 5/19/2001 2:59:12 PM | move | James G. Gatto | folder 1 | folder 1 |
| test.doc | 1 | 5/19/2001 5:15:57 PM | read | Brian S Rosenbloom | folder 1 | |
| test.doc | 2 | 5/19/2001 5:18:36 PM | add | Brian S Rosenbloom | folder 1 | |
| test.doc | 1 | 5/19/2001 5:22:33 PM | read | Brian S Rosenbloom | folder 1 | |
| test.doc | 2 | 5/19/2001 5:23:01 PM | delete | Brian S Rosenbloom | folder 1 | |
| test2 | 1 | 5/19/2001 8:58:24 PM | add | James G. Gatto | My Documents | |
| test2 | 1 | 5/19/2001 8:58:38 PM | read | James G. Gatto | My Documents | |

FIG. 32

My Forms

| Action | Name | Description | Advisor | Create Date | Last Modified |
|---|---|---|---|---|---|
| Delete / Done | Notice of Withdrawal Rights | Notice of Withdrawal Rights | James G. Gatto | 5/22/2001 12:52:36 PM | 5/22/2001 1:12:20 PM |

Copyright 2000-2001 © Collaborate Solutions, Inc.
Suggestions & Comments

Teamworks® CLIENT TOOL BOX
- How it Works
- My Account
- My E-Forms
- My Advisors
- My Portfolio
- My Documents
- My Calendar
- E-Mail
- Library
- Help Desk
- Other Resources
- Sign Off 3500
3503
3702

FIG. 37

Standard Form Types

? Help

| Action | Name | Description | Client | Create Date | Last Modified |
|--------|------|-------------|--------|-------------|---------------|
| Delete / Edit / File | Notice of Withdrawal Rights — 3801 / 3802 | Notice of Withdrawal Rights | Brian S Rosenbloom | 5/22/2001 12:52:36 PM | 5/22/2001 1:15:20 PM |
| Add | Notice of Withdrawal Rights ▼ | | Suzanne Cuccurullo ▼ | | |

3400

Copyright 2000-2001 © Collaborate Solutions, Inc.
Suggestions & Comments

Teamworks® ADVISOR TOOL BOX
- How it Works
- My Account
- My Clients
- My Documents
- My Calendar
- E-Mail
- Financial Planning
- Continuing Education
- Active Documents
- Library
- Help Desk
- Other Resources
- Sign Off Done | Internet

FIG. 38

Additional Modules 3901
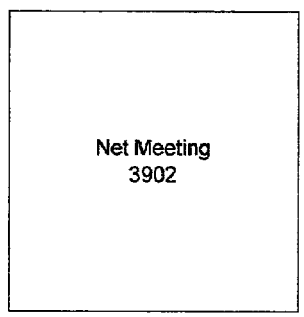
Net Meeting
3902
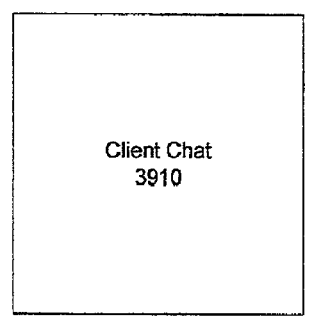
Client Chat
3910
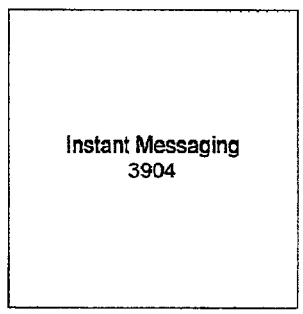
Instant Messaging
3904
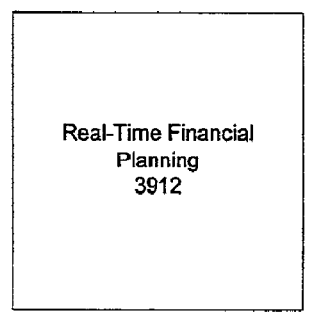
Real-Time Financial
Planning
3912
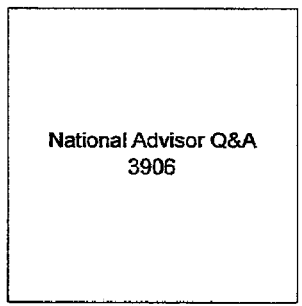
National Advisor Q&A
3906
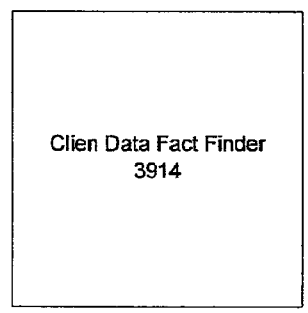
Clien Data Fact Finder
3914
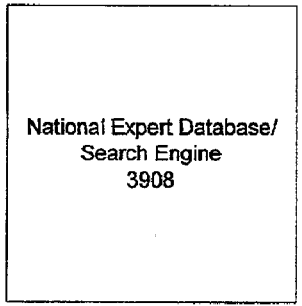
National Expert Database/
Search Engine
3908
FIG. 39

METHOD AND SYSTEM FOR ENABLING COLLABORATION BETWEEN ADVISORS AND CLIENTS

This application is a continuation of U.S. patent application Ser. No. 09/877,926, entitled "Method and System for Enabling Collaboration Between Advisors and Clients," filed on Jun. 8, 2001, now U.S. Pat. No. 7,890,405 which claims the benefit of U.S. Provisional Patent Application Ser. No. 60/210,460, entitled "Method and System for Collaboration of Financial Advisors," filed on Jun. 9, 2000. This application is also a continuation-in-part of U.S. patent application Ser. No. 09/732,008, entitled "Method and System for Collaborating Advisors," filed on Dec. 8, 2000, which issued as U.S. Pat. No. 7,848,984 on Dec. 7, 2010, and which also claims the benefit of U.S. Provisional Application Ser. No. 60/210,460, entitled "Method and System for Collaboration of Financial Advisors," filed on Jun. 9, 2000. The contents of the above-referenced U.S. Provisional Patent Application and the above-referenced U.S. patent application are both hereby incorporated by reference in their entirety.

FIELD OF INVENTION

The present invention relates to the field of collaborating resources and other information, more particularly, to a method and system for providing a collaboration tool where advisors, clients and/or other participants may access client data, exchange data with other participants and communicate with each other where consistent and accurate collaboration of resources and information may be achieved.

BACKGROUND OF THE INVENTION

On-line companies offer a variety of products and services including on-line trading; software products for sale; information on advisors in various area; advice from national experts at high profile companies; advice from in-house advisors; various financial products; and other products and services. While some of these companies also offer advice, clients generally do not have the ability to interact with multiple advisors with various areas and levels of expertise.

Generally, a client may have more than one advisor which may include other sources of information to assist the client in managing the client's assets and other aspects of the client's life and/or business. Advisors from different disciplines that serve common clients lack a centralized tool to interact, communicate and share resources. The current industry model is hampered by a fragmented planning and implementation process, with separate advisors acting independently rather than as a collaborative team. Advisors may duplicate efforts and may rely on old or inaccurate data. Separate advisors oftentimes are unable to simultaneously access current data and historical documents pertaining to their common clients.

This is largely due to the time consuming, cumbersome and inconsistent communication methods of the existing services. The effects of this traditional system have been inefficiencies, such as missed project deadlines, uninformed team members, wasted resources, lost time and expenses, squandered planning opportunities, and frustrated and confused advisors and clients.

For example, some advisors may create work products, such as financial plans, legal documents, tax returns, financial statements etc., while others may place and/or manage products, such as investment accounts, insurance policies, annuities and retirement plans. In either case, the work being done by a particular advisor may directly or indirectly affect the other advisors working for that client. Often, advisors of a client may be from different disciplines and different firms. Generally, advisors lack a common tool to interact, communicate, and serve the client in a coordinated manner. Currently, there is no common place where the client's financial history, for example, resides to insure informed decision making and effective implementation rationale. This is a liability for both clients, advisors, and other participants.

Electronic information processing and communication systems are playing an increasingly important role in coordinating business operations among various participants in a community (e.g., the financial community). Among other functions, these technologies may be utilized for coordinating administrative operations, disseminating information or documents for review and retention, individual access to investment information, reference and research libraries and providing information inputs for ongoing financial, legal, investment and other support and functions. Currently, these activities are disjoint and provided independently of each other. In addition, many vital services and activities as well as important investment and/or reference information are not provided in an automated way. Client/advisor history is typically kept in offline data storage and is cumbersome to review and disseminate. Further, the client to advisor interaction suffers from much lost productivity and opportunity due to delays in communication and coordination between the parties (particularly in cases where many advisors are to be included on the clients' support team). With the advent of multiple discipline practices in the advisor and other communities, many of these issues may become exacerbated due to lack of consistency and standardization.

Historically, clients and advisors had to communicate via telephone, mail, e-mail, facsimile, in person meetings, and/or conference calls, for example. Various problems and difficulties often result from such communication methods when dealing with a team of advisors or other participants. For example, advisors and clients may have difficulty in scheduling times and places for face to face meetings or conference calls. Also, delays may result due to sending documents to all of the team members who may need to review the documents. In addition, incomplete decision making often result due to information or documents not being available to all parties involved. Other problems include wasted time and costs involved in sending documents as well as difficulty of coordinating document revisions or other actions. Such problems and difficulties add up to delays in completing the transactions, higher overhead costs, lost financial opportunities and frustration all around.

These and other drawbacks exist with current systems.

SUMMARY OF THE INVENTION

The present invention provides a method and system for providing collaborative environments for advisors, their clients and other participants to interact, communicate and exchange data and information. In addition to providing an environment in which advisors, clients, and others may collaborate, the present invention integrates leading third-party software packages with the collaborative environment. Other features and options are also available.

The present invention enables a client to authorize selected advisors as well as other participants to view, discuss, modify and perform other operations in response to the client's request for services. A client may define the scope of authorization for advisors and/or other participants for security and confidentiality reasons. Security features may be implemented to permit safe communication through the Internet and allow for secure storage of documents, for multiple distinct advisors, clients and other authorized participants. Advisors (and/or participants) may then access information submitted (or authorized) by the client to collaborate as a cohesive team in sharing information, devising a plan, addressing client's concern, drafting (or modifying) a document and performing other services for the client. The present invention provides a mechanism to implement planning in an organized and efficient manner, by promoting consistent and accurate collaboration of resources and efforts.

The present invention provides a common collaboration tool to interact, communicate and serve the client in a coordinated manner in various areas of interest. A common repository for organizing and maintaining a client's history may be managed by the collaboration tool of the present invention to insure informed decision making and effective implementation rationale. As a result, advisor interaction, efficiency, profitability, client satisfaction, and increased earnings may be realized.

For example, advisors may include accountants, attorneys, financial planners, insurance agents, investment advisors, trust officers, and charitable officers. Other entities with experience and/or knowledge of a particular area of interest may be considered an advisor.

The present invention may enable the advisor community to leverage their resources and compete successfully thereby retaining existing market share and attracting new market share. By using the present invention to collaborate, advisors may be able to retain their separate identities, while partnering with other firms to expand and diversify their revenue sources.

The present invention enables advisors, clients and other participants to view and modify various documents and work products pertaining to a client's planning process remotely through the Internet. Other forms of access are also available.

Advantageously, according to an embodiment of the present invention, the technology of the collaboration tool does not require separate software or the purchase of any additional components by advisors, clients or other participants who already have Internet access. Thus, member advisers and their clients may have access to sophisticated web enabled financial planning software, research and content software, and account aggregation software, which may be unavailable and/or unaffordable to some advisers. This enables advisers the ability to offer value-added technology and services to selected clients.

Each member of the planning team may review and/or update only those documents for which they have been granted authorization. Since access to the planning deliverables is easy to accomplish, additional advisors may be added to the process whenever their area of expertise is needed, avoiding the geographic and scheduling constraints of existing business models. All plans and documents may be retained permanently and made accessible to a team of advisors and/or participants for future reference of the client's planning implementation history and rationale. In addition to working on or viewing documents and client data independently, the whole team may work together in collaboration using virtual office tools and other techniques. These tools may implement a wide variety of collaborative approaches, such as real time live video conferencing, for example.

The effective application of these technologies into the mature vertical market of the various services and other industries may result in cost savings, increased productivity and higher revenue potential. Other advantages may also be realized. The present invention provides a mechanism to implement planning in an organized and efficient manner, by promoting consistent and accurate collaboration to augment in person meetings.

According to an embodiment of the present invention, each advisor and/or other participant using the present invention may pay a subscription fee for the use of software and the collaborative site, in addition to fees based upon the number of clients for whom they make the tool available. Other business models may also be implemented.

Other objects, features and advantages of the present invention will be apparent through the detailed description of the preferred embodiments and the drawings attached hereto. It is also to be understood that both the foregoing general description and the following detailed description are exemplary and explanatory and not restrictive of the scope of the invention.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 4 is an example of a collaboration module, according to an embodiment of the present invention.

FIG. 13 is an example of a client registration screen, according to an embodiment of the present invention.

FIG. 16 is an example of a search results screen, according to an embodiment of the present invention.

FIG. 19 is an example of an add document screen, according to an embodiment of the present invention.

FIG. 27 is an example of an add document-version screen, according to an embodiment of the present invention.

FIG. 29 is an example of a documents screen, according to an embodiment of the present invention.

FIG. 31 is an example of an account screen, according to an embodiment of the present invention.

FIG. 32 is an example of a history screen, according to an embodiment of the present invention.

FIG. 37 is an example of the client's form screen after the client as saved an e-form.

FIG. 38 is an example of the form type screen after the client has filled in an e-form.

FIG. 39 is a functional block diagram illustrating additional modules that could be added to the client and/or advisor module.

DETAILED DESCRIPTION OF THE PREFERRED EMBODIMENTS

Generally, individuals and businesses work with advisors of various disciplines in planning and managing areas of business and other areas, such as finances, personal affairs, etc. The present invention provides various collaborative features, which may include connecting some or all of the client's advisors and other authorized participants, tracking work in process, creating a central client history, monitoring various aspects of a client which may include financial and other assets, and building a synergistic collaborative team out of distinct independent advisors. The present invention may provide advisor benefits including immediate data and document access, reductions in data gathering duplication, low cost quality software access, faster project completion and fee/commission turnaround, referral opportunities from networked teams, efficiency from collaboration yield less time/revenue event, higher client volume, higher earnings, and more commission. The present invention may also provide client benefits including immediate data and document access, reduction in data disclosure duplication, better reports and service, faster project completion, less costs, better and more comprehensive advice, efficiency from collaboration yielding reduce client time spent, lower client fees, better understanding, and better satisfaction. As a result, client and advisor relationships are established and enhanced.

The collaborative features of the present invention may be applied to other areas of interest as well, where multiple entities may be involved in providing information and other services. Examples may include a collaboration of a client's financial advisors, medical advisors (e.g., doctors), educational advisors (e.g., teachers, counselors, etc.) and others. Also, other projects with multiple consultants and/or participants providing a service to a client may also utilize the collaborative features of the present invention.

Figure 1:
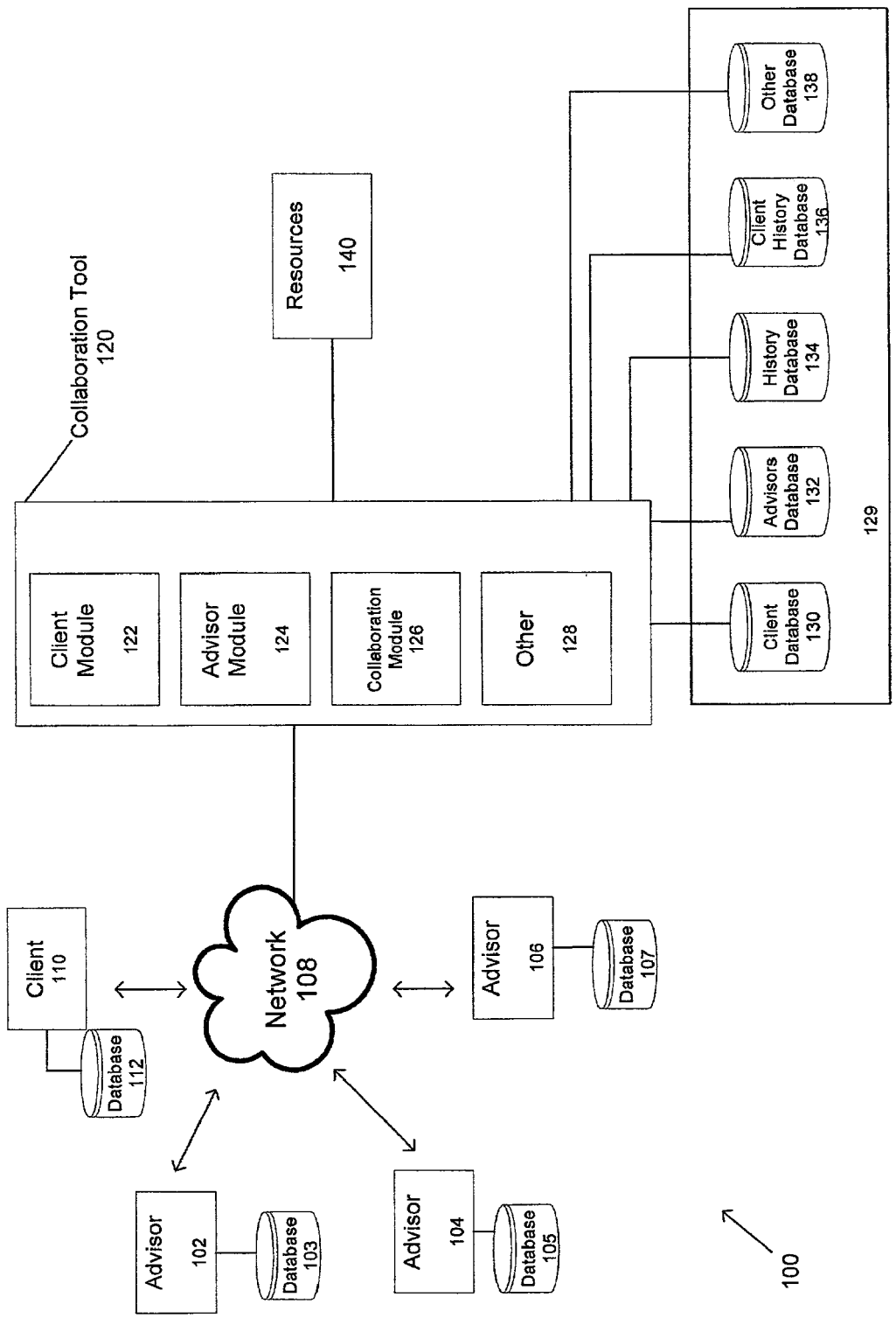
FIG. 1 is a diagram of a system for collaborating participants, according to an embodiment of the present invention.

FIG. 1 is an example of a system 100, according to an embodiment of the present invention, for enabling a client, associated advisors and/or other authorized participants to collaborate efficiently. System 100 includes a collaboration tool 120 that is accessible to clients 110 and advisors and/or other participants (hereafter "advisors") 102-106. Client 110 and advisors 102-106 (collectively "users") may access and communicate with collaboration tool 120 through a communication device and a network 108 (e.g., the Internet or other data network or communication network). In particular, the advisors (or authorized participants) 102, 104, and 106 may communicate with client 110 as well as each other through password protected forums to retrieve various documents and information from fellow advisors (or participants) and/or from client 110 through collaboration tool 120 of the present invention.

In addition, the various advisors (or participants) 102, 104, and 106 may further maintain respective databases 103, 105 and 107 regarding the client, information regarding specialized areas, and other relevant information. This information may be stored remotely or within local advisor (or participant) databases. Further, client 110 may also maintain databases (e.g., database 112) to store personal and other relevant information related to various areas of interest.

Databases may, include or interface to, for example, the Oracle™ relational database sold commercially by Oracle Corp. Other databases, such as Informix™, DB2 (Database 2), Sybase, Microsoft SQL Server database or other data storage or query formats, platforms or resources such as OLAP (On Line Analytical Processing), SQL (Standard Query Language), a storage area network (SAN), Microsoft Access™ or others may also be used, incorporated or accessed in the invention.

An advisor may include an individual (or entity) with some type of accreditation in an area of specialty, such as a CPA, financial planner or attorney. Advisors typically either work as sole proprietors, with small firms, with large firms, or with very large international firms. For example, advisor areas may include Financial Planning; Accounting; Insurance; Law; Investments; Trust Officers; Estate Planners; Charitable; Securities; Investment Services; and others. Some advisor areas may have multiple accreditations. Advisors may also address other aspects of a client's personal or business dealings (or affairs). For example, an advisor may include a physician (e.g., doctor, dentist, specialist, etc.) or other entity with experience or expertise in an area of interest.

A participant may be an entity (e.g., individual or a group) that has been granted authorization by a client or other associated entity to view, analyze and/or provide guidance, information, advice, etc. through the collaboration tool of the present invention. Other participants may also utilize the collaborative tool of the present invention, such as associates of the automotive industry, construction industry, education industry, philanthropy and other industries and areas of interest.

Clients may include individuals, families, groups and companies that have one or more services performed by one or more advisors and/or participants. Services may include information retrieval and dissemination of advice. For example, in the financial service provider industry, individual clients may be typically identified by categories such as total assets, annual income, net worth, or via age bracket specialties. Company sales or number of employees may be identified by corporate clients.

In the financial industry, for example, advisors may access the client's financial plan, exchange data, view investments, and communicate using chat rooms, bulletin boards and other modes of communication. Also available are education and interaction in separate advisor and client communities where tools are available to monitor client's finances, manage the advisor's practice and perform other operations.

Collaboration tool 120 of the present invention may provide various modules and/or pages (e.g., web pages) of information (hereafter "modules"). For example, collaboration tool 120 may enable access to client module 122, advisor module 124, collaboration module 126 and other modules 128. Various information may also be stored through collaboration tool 120 (or through a remote storing facility). For example, collaboration tool 120 may maintain have access to a data storage 129 for storing client database 130, advisor database 132, history database 134, client history database 136 and other database 138. For example, client database 130 may contain client information, such as personal information, authorized advisors (and/or participants), authorization information, personalized preferences and other information. Advisor database 132 may contain advisor information, such as associated clients, authorization information, contact information and other information. History database 134 may contain history information, such as document (and other work product) edits, date/time of edits, author of edits, type of action taken, and other information. Client history database 136 may contain client history information, such as associated advisors, actions taken by advisors, client work product (e.g., documents), updates and other information. Other databases may store and organize other information, in accordance with the present invention. Also, the databases may remain separate or may be combined as one database. Other variations and storage options may be implemented.

The collaboration tool 120 of the present invention may also retrieve information from resources 140, which may include various entities, such as firms, banks, and/or other companies that may provide relevant information to advisors, clients and/or participants.

Figure 2:
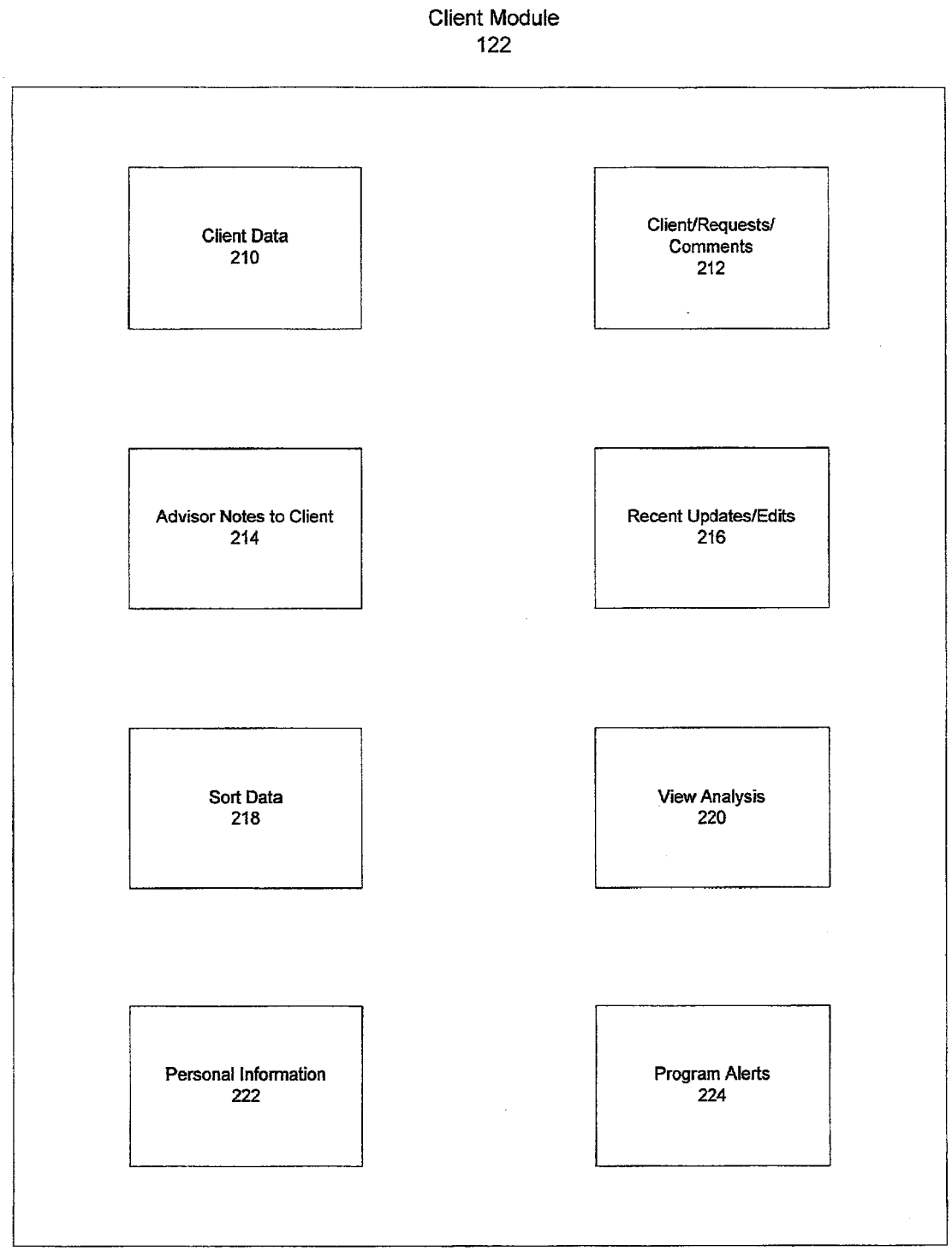
FIG. 2 is an example of a client module, according to an embodiment of the present invention.

FIG. 2 is an example of a client module, according to an embodiment of the present invention. Client Module 122 may provide various information to the client and/or other associated entities that are authorized to access client information. The present invention enables clients to create and/or review work products and other specific data/information. The present invention further enables clients to define data level access security rules for advisors and/or participants. For example, specific advisors or groups of advisors may be given access to a particular document, category of information or based on other user-defined criteria.

Client data may be viewed at 210, which may include personal data and other related client information. A client may submit questions, requests and/or comments to all or some participating advisors and/or participants at 212. For example, the client may request a specific advisor to update a file or make changes to a document. At 216, a client may view recent updates/edits made by the client's associated advisors and other authorized participants regarding specific matters of interest. In addition, a client may view the frequency of visits, types of edits by a selected one or more advisors and/or participants and other information. The client may select to view update information pertaining to individual advisors and/or participants or view all updates/edits made within a defined period of time. At 218, the client may input (or select) factors by which to sort data that may be viewable on the client module of the present invention. For example, data may be sorted by date made, by which entity, which product, etc. Other variations may also be made available.

At 220, the client may view a summary and/or detailed view of analysis and other information provided by associated advisors and/or participants. The client may select one or more specific advisor (and/or participant) or the client may view all analysis information provided by all participating advisors (or participants). Other viewing selections may also be available.

Client defined personalized information may be displayed at 222. For example, a client may view stock tickers for stocks that the client has invested in or has otherwise expressed interest. The client may also view press releases for selected subjects and topics of interest. Other newsworthy information may also be displayed. A client may define other areas of interest for display in 222.

A client may define personalized alerts for client defined triggering events at 224. For example, when an advisor (or other participant) performs a certain action, the client may receive notification. For example, when an advisor (or participant) views, edits, or performs other operations, the client may receive immediate notification. Also, when an identified advisor views information regarding the client, notification may be sent to the client. The client may define the form of notification, which may include e-mail, text messaging, voice-mail, phone call, or other form of communication. Further, the user may define different methods of notification for different triggering events. This feature of the invention ensures that the client is consistently updated and notified of actions affecting the client (or otherwise flagged as being important to the client).

Figure 3:
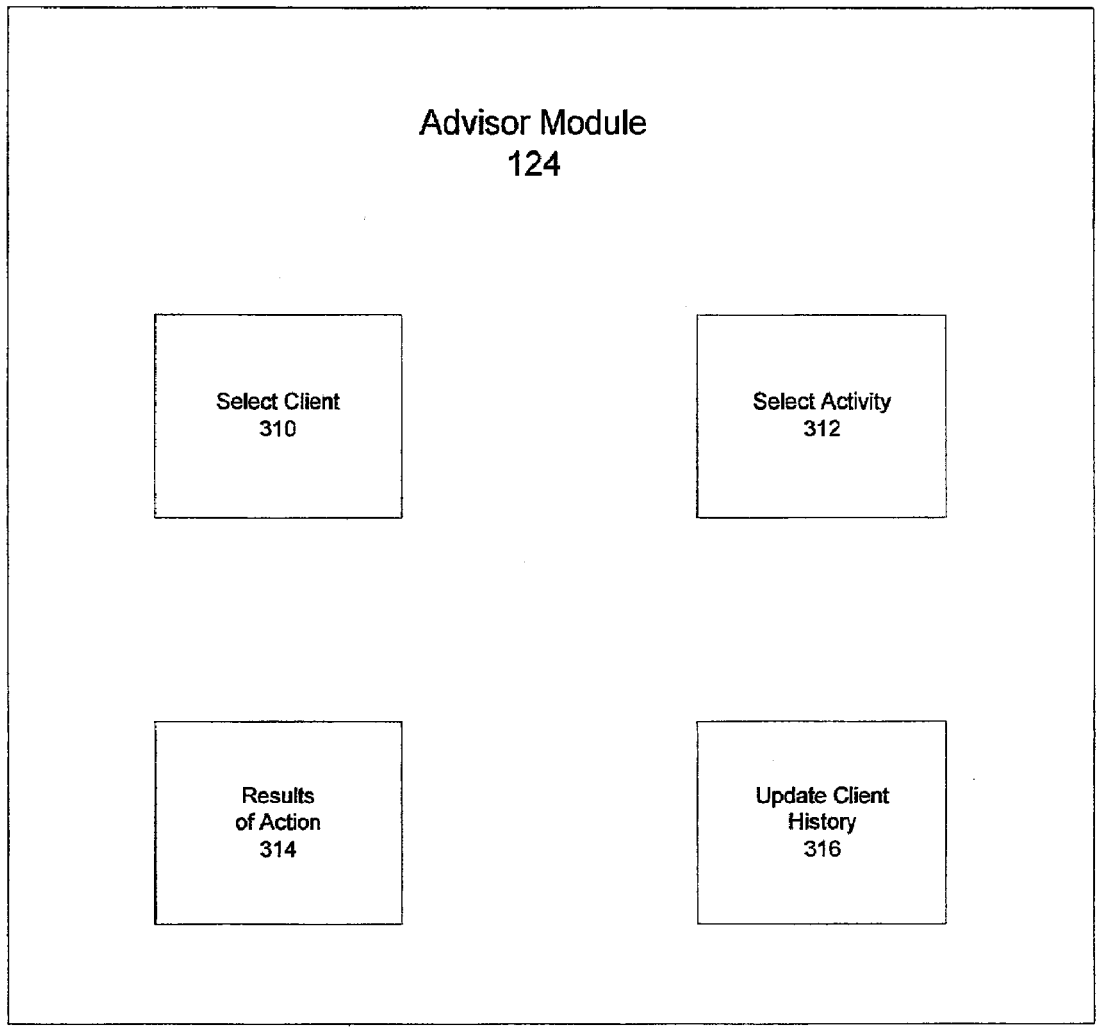
FIG. 3 is an example of an advisor module, according to an embodiment of the present invention.

FIG. 3 is an example of an advisor module, according to an embodiment of the present invention. Advisors and/or participants may create and/or review work products including documents and other information relevant to the client. The present invention enables advisors to import or export work products created/maintained externally into or out of the system.

An advisor (or participant) may select a client of interest, at 310. Oftentimes, an advisor may have multiple clients in varying geographic locations with different requests for services. The present invention enables advisors (or participants) to group and/or categorize clients (and other information) for management purposes. The advisor may select from a list of clients where the clients have given authorization to the advisor to access the client's data. At 312, the advisor (or participant) may select one or more activities. An activity (or action) may involve a process to be performed for the selected one or more clients, which may involve building/modifying a plan (e.g., financial plan), providing advice regarding an issue, creating/modifying a document, etc. At 314, the advisor may view results of the action, which may include answers, comments and other information from the client or other participating advisor(s) and/or participant(s). At 316, the client history and/or other databases may be updated to ensure accurate information for other advisors to access.

FIG. 4 is an example of collaboration module 126, according to an embodiment of the present invention. Collaboration module 126 provides clients, advisors, participants and other authorized entities the ability to converge resources, interact and communicate with each other, unify information, and perform other activities, in accordance with the present invention.

Document view 410 enables authorized entities to view a selected document from a database or other source. A participant may perform various operations, such as edit 412, save 414, delete 416 and other operations 418. This feature of the invention enables documents to have the same edits thereby minimizing inconsistencies, inefficiencies, confusion and duplicative efforts. Often, an entity may make modifications to a document, only to realize that another entity had already made the same or similar modifications. The collaborative module of the present invention minimizes duplication of efforts by providing a central repository of documents that may be viewed and/or modified by various advisors addressing various aspects of a client's business, assets and personal business. The accessed documents (or other work product) may be uniform and updated for all who consult these documents. Thus, the information relied upon may be consistent for all advisors for a client.

Advisor Input 420 enables advisors and/or participants the ability to provide information that may be relevant to other aspects of a client's business, assets and/or personal business. Other areas may also be affected. In addition, bulletin board 422 may provide a bulletin board where various advisors and other participants may provide information and comments. This enables other advisors to become aware of changes made by a client (or other authorized entity) that will affect another advisor's responsibilities to the client.

Update information 424 may provide information related to advisor or participant updates. For example, if an advisor makes modifications to a document, update information 424 may provide a summary or detailed description of the modifications made by that advisor and other advisors. Other specifics may also be displayed. Also, when a document is accessed, various edits (including deletions, additions, etc.) may be displayed in a manner to designate that a particular advisor has made certain edits. For example, edits made by a financial planner may be displayed in a unique color, unique font or other unique manner.

Participants 430 provide information related to which entities have been given authorization to the client's information. Participants 430 may provide a list of advisors and/or participants that the client has authorized to view and analyze the client's matters. Further links to other databases and other advisor information may also be provided at 430. Also, the scope of authorization for each advisor (or participant) may also be displayed.

A summary or detailed description of the client may be displayed at client data 432. Client data 432 may provide client information that may be relevant and/or useful in analyzing, viewing client matters and/or documents. At 434, client requests, comments, and/or questions may be displayed. This information may be obtained through module 212, which may be entered through client module 122. Also, the client may update requests, comments, and/or questions as new information is received.

Chat board 436 enables advisors and other participants (e.g., client and others) to engage in a real time conference where information and ideas may be exchanged. Client History 438 may provide summary and/or detailed information related to a client's historical information which may include previous edits and/or other transactions. This feature of the present invention provides a mechanism for tracking actions by advisors and other participants. Trends and results may also be viewed through Client History 438.

Figure 5:
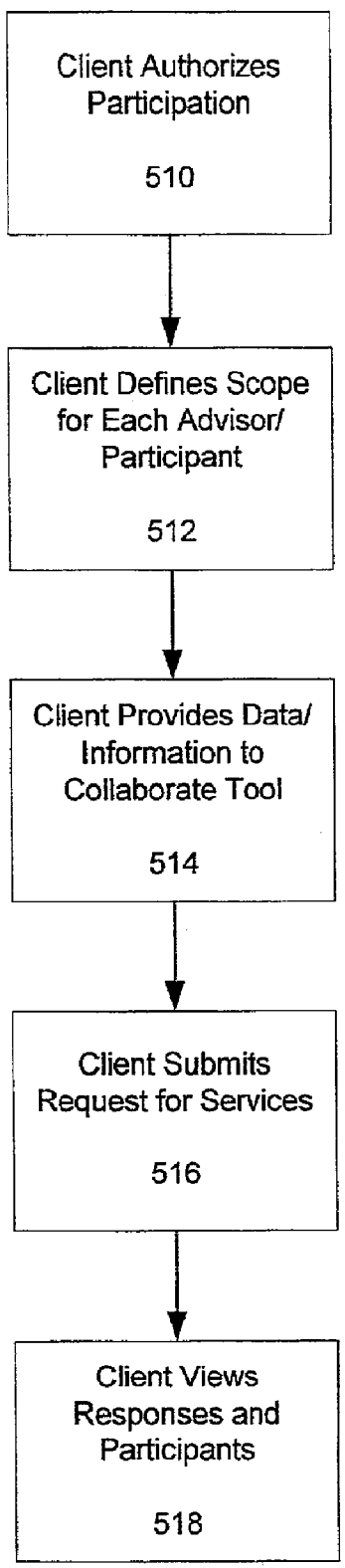
FIG. 5 is a flowchart of a client side process for collaboration, according to an embodiment of the present invention.

FIG. 5 is a flowchart illustrating a client side process for providing collaboration, in accordance with the present invention. At step 510, a client may authorize participation to various advisors and/or other participants. A client may identify advisors and/or participants including contact and other relevant information. In addition, the client may pre-authorize one or more advisors and/or participants. This pre-authorization feature enables a pre-authorized advisor or participant to participate through the collaboration tool of the present invention when the pre-authorized advisor is needed, which may occur at a later point in time. Triggering events may also be identified which may trigger authorization for an identified advisor and/or participant. For example, if at a later point in time, an advisor or other participant advises the client that a financial advisor is needed, a pre-authorized financial advisor may gain access immediately through the present invention. Loss of time and other inefficiencies may be minimized. Also, comprehensive results may be expedited to the client. The pre-authorization feature may also be useful in pre-authorizing an authorized advisor's colleagues, partners, and/or associates in a common firm, generally with confidentiality agreements or similar mechanism, for example. Other variations may be implemented.

At step 512, a client may define the scope of authorization for each advisor and/or participant. For example, a client may entitle certain advisors access to a specific document, type of documents, sector and other criteria. A client may define a specific folder which specific documents that an identified advisor may be able to view, analyze and/or modify. Other user-defined restrictions may also be applied.

At step 514, a client may provide access to data/information to the collaboration tool. For example, this information may include documents, spreadsheets, e-mails, and any other correspondence or documentation found on or accessed by a client's computer. The client information may be downloaded, sent electronically, faxed, scanned or conveyed by other modes of communication.

At step 516, the client may submit one or more requests for services through the collaboration tool of the present invention. At this time, the authorized advisors and/or participants may access documents and other information (within the designated scope of access) and process the client's request. At 518, the client may view responses and analysis performed by authorized entities (e.g., advisors, participants) and/or participant in the exchange of information through the collaboration tool.

Figure 6:
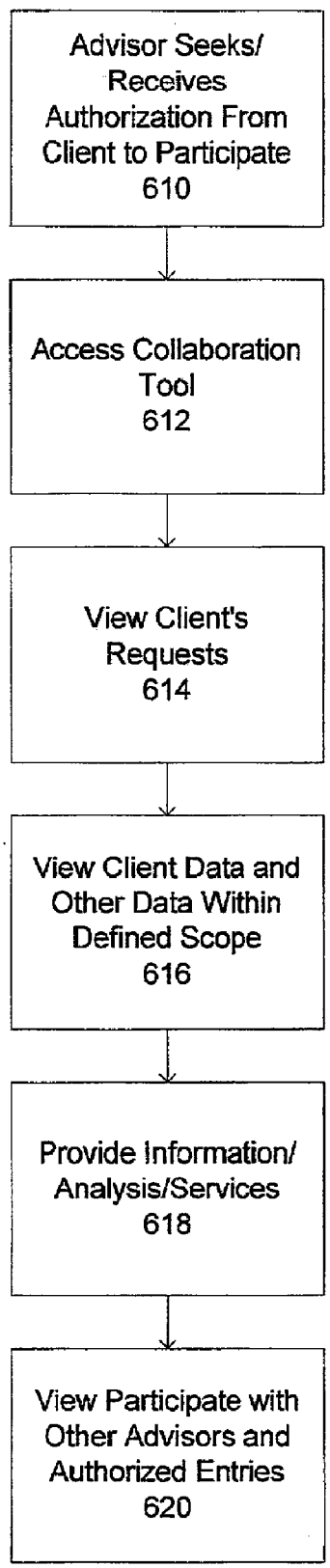
FIG. 6 is a flowchart of an advisor side process for collaboration, according to an embodiment of the present invention.

FIG. 6 is a flowchart illustrating an advisor (or participant) side process for providing collaboration, in accordance with the present invention. At step 610, an advisor may receive authorization to participate in the collaboration tool of the present invention. Also, an advisor may proactively seek authorization from a client. For example, an advisor may inform the client that to address the client's request for services, the advisor may need access to certain information. The client may then provide access to the requested information.

At step 612, an authorized advisor and/or participant may access the collaboration tool for information exchange and retrieval. At step 614, the advisor (or participant) may view the client's request and other information. At step 616, the advisor (or participant) may view client data and other data within the defined authorization scope. At step 618, the advisor (or participant) may provide information, analysis and/or other requested services to the user through the collaboration tool of the present invention. Other resources may also be consulted. At step 620, the authorized entity may view and/or participate with other advisors and authorized entities.

According to another embodiment of the invention, the present invention may reach clients by marketing to their advisors. Each advisor may maintain information relevant to client 110 at remote databases, such as 103, 105, and 107. Also, collaboration tool 120 may also maintain one or more databases (e.g., 130, 132, 134, 136 and 138) with information related to the client's activities and other activities and information. Also, collaboration tool 120 may negotiate strategic alliances and joint ventures with various resources 140, such as financial planning firms, software manufacturers, insurance companies, brokerage firms, trust banks, financial publishers and a variety of consumer financial service firms, for example. Thus, advisors may access extensive client data, as authorized by the client or other associated entity, through the present invention.

The approach of existing Internet financial service companies is to either sell products, advisors, or both directly to clients in an attempt to capture and control the client and their assets. This approach threatens existing advisors. The present invention, however, provides advisors with a competitive advantage over impending high tech firms. Also, the present invention focuses on the client advisor relationship. In building a relationship and enhancing communication and practice management tool for advisors, these advisors may efficiently network large segments of new and established clients, by strengthening their relationships particularly with existing clients.

The present invention provides a mechanism for advisors to create virtual multiple disciplinary practices, while maintaining their separate identity. This provides companies or firms a means to leverage resources and compete with the larger and more established firms. In particular, the added benefits of accountants, attorneys, and other entities being able to more closely collaborate on projects include project efficiency, timeliness, reduced costs and overall improved products and services.

In order to provide a comprehensive solution for information and communication needs, the present invention may provide the technical architectures to facilitate the creation of complete information management, communication and networking capabilities to enable the linking of pertinent activities (e.g., financial activities).

The present invention may functionally decompose each area of information processing and network communication and group each with similar functional components. Each group-processing component may be addressed individually, via proprietary development, partnering with "best of class" OEM vendors, or other method. Then, each group's unique blend of technical solutions may then be integrated. As a result, each functional processing unit may have a technical solution specifically designed for its unique requirements.

At a high level overview, financial processing units may include categories, such as Collaboration Services; Client Community Services; Advisor Community Services; Site Support Services and other categories, for example.

Each specific requirement may logically fit under one or more of these and other primary categories. For example, Financial Planning, Estate Planning and Practice Management may be categorized under Advisor Community Services. By continuing the process of functional decomposition into sub categories and sub categories, and so on, critical elements may be defined and thereby identifying efficient architectural components to support each element of comprehensive financial planning information processing and communication.

Each functional component of the system may comprise basic architectural elements, such as communication and information flow processing, for example. Some components require high-speed communication while others do not. Some require time critical processing (on-line); others only require hourly, daily, or even weekly information processing (electronic mail delivery). In short, no one technological solution may efficiently and cost effectively provide for all the diversified needs of an electronic planning information system. However, by integrating several processing methodologies, the present invention provides a processing environment where all the components of a system may coexist.

One architecture for the present invention may include a central information-processing hub. This hub (which may be operated by the present invention or outsourced to a service supplier or other entity) may consist of a diverse range of multiprocessor computers, operating systems, relational databases, workflow processing systems, Internet Web servers and other elements. These support systems may be dedicated to specific processing and support tasks (e.g. e-mail, on-line query, etc.). Distributing tasks between separate small computer platforms may provide many benefits over a central large-scale computer. These benefits may include high performance at a lower price; ability to match the correct technology platform to each task; low cost scalability; flexibility of development platforms and development tools; minimal central point of failure so that if a single category of computer fails, only a small segment of total systems operations become inoperable; system performance malfunctions may be located and corrected easily; and new technological advances may be implemented in one environment without concern or redesign in another.

Likewise, communication links may be designed and implemented for specific processing categories (ISDN links, T1 links, Internet connections, etc.). For many of the user community, the communication infrastructure may centralize through the Internet. This method may allow remote sites on a worldwide basis to have access to the present invention without the need for high cost leased line connections. In addition, the specific processing requirements of remote clients may determine the method of connection. For example, 28.8 Kbps, analog modems, modem pools, or even through 128 Kbps ISDN digital connections may be specified. However, clients who require higher performance connections may be provided direct leased line circuits. Other variations may also be implemented.

Benefits of using the Internet for basic connectivity infrastructure may include immediate connectivity worldwide; interoperability of platforms; speed of system implementation; lower cost of implementation and operation; easier to create customer interest and sale; higher levels of security than via other network connection alternatives; and other benefits. Further, other modes of communication may also be implemented.

The present invention may employ one or more of the following elements: Thin Client Design techniques, Information Agent Middleware, Automatic customization of services by logon id, client history concept and other elements. Other options may also be implemented.

Thin Client architecture may employ the use of Web Browsers at the client location (e.g., the CFP office) for GUI presentation of system services. Proprietary application functionality may be implemented at the server location(s) within the present invention. This design feature may eliminate the need to dictate minimum hardware or software platform requirements to the customer (thereby reducing upgrade cost issues or possible sales restrictions) while also drastically reducing the cost of maintenance, version control and deployment of the application itself as compared to other design alternatives such as older client server techniques where part or all of the application was distributed to the client location, since only one copy of the application software (in the server location) needs to be administered. A potential client may only have sufficient technology to connect to the Internet and execute a Web Browser.

Having connected to the present invention using the desktop Browser and Internet supplied connectivity, the client may access application facilities through a standardized, point and click interface implemented at the server location and distributed to the desktop via XML, HTML, JAVA and ACTIVE-X types of facilities. Other options may be implemented.

With respect to Information Agent Middleware, many of the core application services provided by the present invention may be supplied by creating OEM arrangements with "best of class" applications, which already exist. By leveraging OEM arrangements with these kinds of systems vendors where possible, the present invention may reduce startup, development and maintenance costs as well as creating a flexible, low risk architectural design structure. For key application components, the present invention may establish exclusive arrangements for the functionality provided.

As to Automatic customization of services by logon id, each individual end user may log on to the present invention via a unique user id/password pair. This unique identification may be used by the present invention to automatically customize the service selection available to that user as appropriate to their specific requirements and level of authorization. Users may have access only to the services, functions and data for which they have a legitimate need, including screens, buttons on screens, data ranges, financial information, etc.

As to the Client History concept, the basic unit of data in the present invention architecture may be the client. Activities performed by the various categories of advisor may include first selecting an 'object' (the client) and then an 'activity' (the process to be performed for that client, such as building or modifying a financial plan). Each action performed and any data or information created by that action may be associated within the system with the specific client for which the action was performed. This creates a detailed audit trail for every client of each action performed, the results of the action, which user performed each activity and when, and other information. The collection of all information stored in the system for a given client may be referred to as client history which may be archived indefinitely for reference by authorized members of the present invention user community. The client history can be kept in offline storage until needed, thereby eliminating security issues which may result from unauthorized access. The client history may serve as a communication, reference and information storage device which may optimize many of the workflows involving the financial planning process and other processes.

The system architecture of the present invention may be constructed upon one or more of the following feature strategies. The present invention may have the ability to confront a specific subset of an entire marketplace domain. This ensures that the application features and capabilities may match the needs of the target client community without being distracted by trying to be all things to all people. The system may also be easily sizable to client community needs. The system may also exhibit security capabilities. Further, the system may be easy to use and easy to modify to meet changing client requirements.

In order to be effective in the marketplace, a service supplier should be careful to focus its mission into a specific, well defined subset of the entire financial mission, for example. Frequently, examples of vertical product or service offerings fail to succeed due to lack of focus in the design of the product mission. This is particularly true for those products targeted toward the financial community (as opposed to the client subset of the marketplace) since procedures, policies and business practices vary widely from one company to the next, thereby forcing the service supplier to spend a great deal of time, money and business energy creating and maintaining tailored solutions for each client. The present invention avoids this potential problem by focusing its mission into specific areas and the associated process and information flows.

Scalability insures that the system design of the present invention may easily and cost efficiently accommodate itself to the widest possible variation in the processing volume required to support an individual client or the aggregate effects of a defined client population. This scalability may account for all or some components of the system architecture (such as the network, the task processing computers and the database storage media) and occur with little or no visibility to the client community. The present invention may be designed to incorporate the further scalability technologies into each of the key components of the system implementation.

As processing requirements increase with an increase in the subscriber population, each task computer may be segmented further by means of simple duplication. For example, if a primary Web page server supporting 4,000 pages reaches its maximum performance capacity, the task server processing may be split into two separate servers each supporting 2,000 pages. The Web server hardware platform may be upgraded to the latest high performance platform available, and the old task server can be utilized in other task processing areas. The present invention may provide immediate capabilities to supply scalable task processing computer equipment ranging from the smallest Windows/PC platforms up through and including the largest IBM mainframe platforms, for example.

Similarly, communication speeds may also need to be scalable—from the customer sites to the present invention, and from the present invention to the customer sites. To address this issue, the present invention may be prepared to implement several types of communication links. For most customers, the Internet connectivity will suffice. However, where customer needs dictate high volume data transfer, single ISDN connections or T1 leased circuits may be implemented. As with the task servers, as the user community grows so will the central connection system.

There may be a point at which adding additional high speed links reach a saturation point. For example, this point may be reached when the total bandwidth of all the communication links becomes larger than the bandwidth of the backbone. For example, if the main backbone of the hub site is running 100

Mbps Ethernet, and T1 links provide 1.5 Mbps, then after approximately 60 to 70 T1 links are added, the maximum throughput of the hub will be exceeded. This is assuming that all 70 T1 links are operating at 100% capacity, 100% of the time. Fortunately, there is another available segmentation step. The task server(s) can be separated into individual subnets. T1 links follow the same organization into corresponding subnets. Finally, each subnet can be linked through fiber optic cable and fiber optic bridges to provide a new backbone with 1,000 times the previous capacity.

Behind the communication architecture of the present invention may reside a scaleable computer processing power and communications topology. The communication core may bypass generic Internet Services Providers (ISPs) and connect directly with super ISPs, NAPs or other direct backbone links to the Internet. Bypassing generic ISPs may allow the present invention to implement nearly an unlimited number T1, T3 and fiber optic links. In addition to the distribution and subneting of information servers, the present invention may provide a scaleable communications topology that may achieve gigabit data transmission levels. Scaling from several to several hundred T1/T3 Super ISP links (and eventually fiber optic links) lines are bridged to 10 Mbps Ethernet channels. Each 10 Mbps Ethernet channel is directed to a single port on a 10 port Ethernet-to-Fast-Ethernet switch. 100 Mbps output from these switches are interfaced to a 10 port Fast-Ethernet-to-Fiber switch. Finally, the fiber channel may be connected to the fiber optic backbone for a total bandwidth of one gigabit/second for each communications segment. Initially, the present invention may implement only a small portion of a complete communication segment. As the user community grows, additional high speed links will be added to continue to extend communication bandwidth to the present invention.

The present invention may implement high level security services available to protect subscribers and application resources against unauthorized use. Communications may be encrypted and authenticated, and the integrity of the transmitted information may be verified quickly and transparently. System controls may be put in place to determine subscriber access to applications, Web pages, directories, discussion groups, databases and other areas. E-mail, real time and other communication may be made private by authenticating each party and encrypting the message traffic. Additional Data Level Security may ensure that each user is able to see and or modify only that information which they own or are authorized. Legacy system usage may be protected via applicable existing security systems. Additionally, no client data may be directly accessible via the web during periods when online collaborations for that client are inactive (all client information will be contained in offline storage during these periods).

Figure 41:
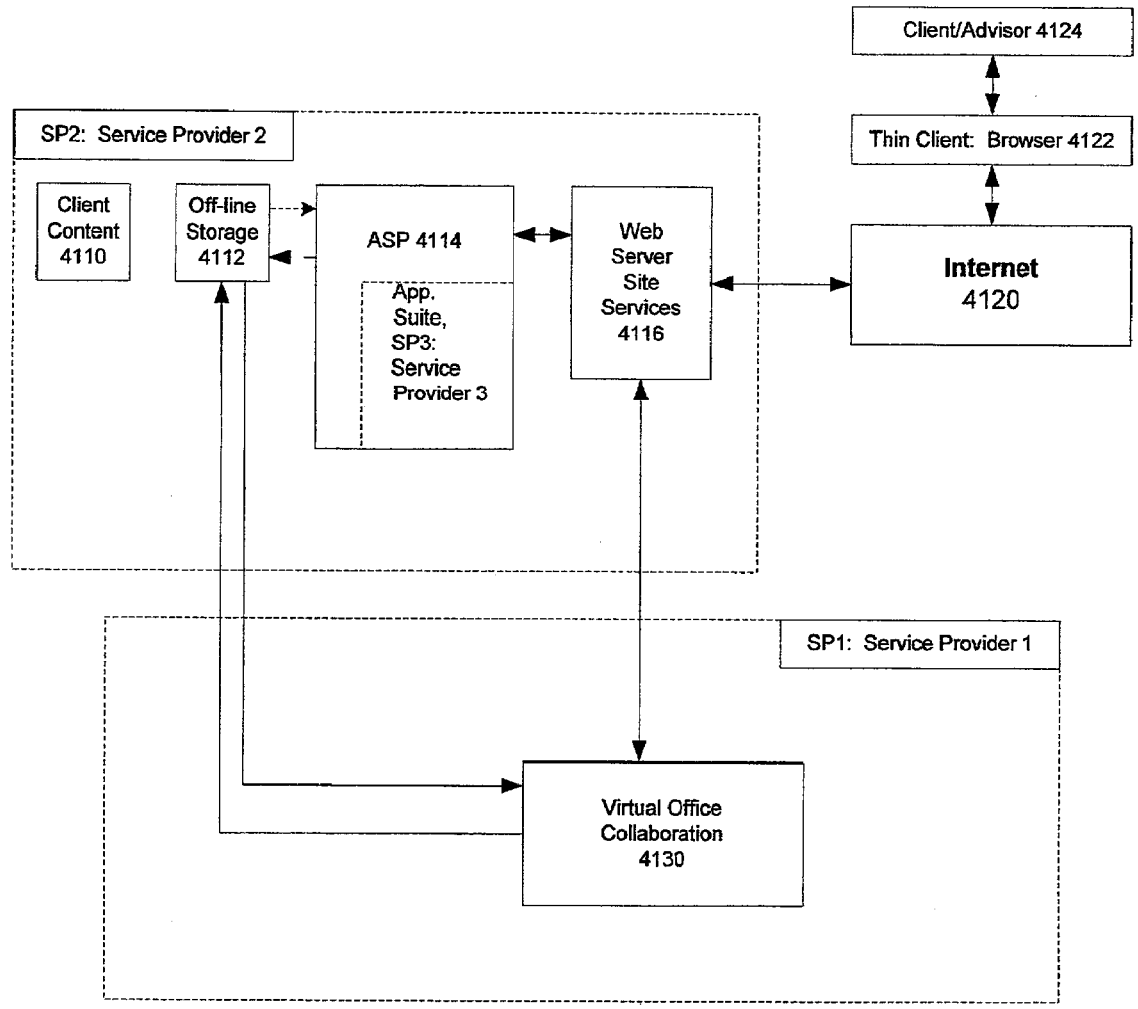
FIG. 41 is a site diagram, according to an embodiment of the present invention.

FIG. 41 illustrates an example of a site diagram according to an embodiment of the present invention. Service Provider 1 may comprise Virtual Office Collaboration 4130 which communicates with Web Service Site Services 4116 and Off-Line Storage 4112, both residing on Service Provider 2. Client information may be stored in Client Content 4110. Application Service Provider 4114 may support financial applications. Client or Advisor 4124, through Browser 4122 may access the system via the Internet 4120. Other variations exist.

The present invention may implement a layered security environment. These levels of communication security may provide the subscriber community with a high level of remote system data security.

Level 1. The present invention may implement Internet address authentication through a hardware firewall located at a Tech Center. Internet traffic not specifically enrolled in services of the present invention may be refused access to secure areas of the present invention. In addition, assigned subscriber names and passwords will be authenticated against the specific Internet address and master subscriber lists of the present invention.

Level 2. Upon enrollment, subscriber access may be determined as to the specific areas of information services of the present invention that may be made available. Requests to certain services areas may be restricted based on the initial security service enrollment. In addition, access to second level security areas will require a second password which may again be authenticated against the subscriber's Internet address, subscriber name, password, and other information. Subscribers attempting to obtain access more than three times to a restricted area, or entering an invalid password, may have their transfers blocked at the firewall and their accounts immediately suspended. When an infraction occurs, the subscriber will be required to reestablish the account through direct re-enrollment through security services of the present invention.

Level 3. All data transfers (when authenticated) will be transferred using the highest level of data encryption available using RSA 128-bit key data encryption models, for example.

Level 4. For high levels of security interest (personal financial records, legal records, etc.), requests for data transfers may, at the subscriber's option, be queued for maintenance by a responsible advisor or other subscriber designee (such as legal guardian, spouse, etc.). Data transfers at this level may then request the approval of such designee. These transfers may include the initial load of the information from the offline data storage. In this way, the client may control which information is directly connected to the web.

Level 5. At the highest level of security, subscribers may optionally request level 5 security control. At this level, all previous security levels would need to be passed through (1-4), then a dial back call would be placed from the present invention to the subscriber. The system at the requested site would have to respond with a security code and request message. Once the correct message was received, the requester's system would dial a dedicated line and the present invention may verify caller ID phone packet as to the orientation of the call. If all the components matched, the subscriber would be allowed transmission of the required information.

Other Levels are Possible.

An important aspect of the system architecture and application design of the present invention is the ability to achieve flexibility. For example, flexibility may include ease of use by the various user types involved in the financial workflows; ability to tailor services to meet all workflow or customer variations; ease of maintenance and support; ease of integration with existing legacy systems (such as advisor practice management systems); ability to modify the application suite to meet additional and future requirements; ability to coordinate, integrate and deploy a wide variety of additional (non-core) services via the framework (such as existing Web based information, forums and sites); ability to implement and tailor security measures that exceed those used in traditional approaches to control the client information, and other features.

According to another embodiment, the present invention enables the interaction of team members (and/or other participants) by employing collaborative tools and technologies to connect team members (and/or other participants) in secure sites on the Internet. By enabling team members to create financial plans, track work in process, access central client histories, monitor financial assets and/or perform other operations, the present invention provides the resources and tools to build a synergistic teams out of clients, associated advisors and/or other participants.

The present invention may be designed to support various types of users. For example, users may include advisors, clients and/or other participants of the present invention. For example, advisors may provide expert and other services. Clients may be users for whom the advisors apply their expertise. Other types of users may be supported by the present invention.

Client

Various services and features may be available for various types of users, such as a client. For example, the present invention may provide an online workspace for a client where the client's team of advisors may research, plan and implement various financial and other objectives. The team of advisors may be selected by the client and led by the client. The client may have access to a password-protected site (or other web interface) that provides various resources necessary and/or desirable to tailor a comprehensive financial or other plan to meet the client's needs and/or goals. The client and the client's team members may confer in real-time via secure connections, using interactive financial planning and/or other software. The site may store a current version (as well as past versions) of the client's financial plan, personal profile and/or other information that may be accessible to all team members to the degree authorized by the client. The client may access an extensive library of information, collaborative scheduling and document management, national advisor directories and other resources.

The client may benefit from the collective dynamism created by timely interaction of advisors who represent the professional disciplines important (and/or useful) to the client's particular situation and/or needs. In addition, the cost to the client (or other participant) in professional fees may be kept to a minimum, since travel and/or time spent in meetings may be kept to a minimum or eliminated.

Thus, the present invention may provide various features to clients and other users, such as interactive financial planning software enabling efficient (e.g., one-time) data entry accessible to advisors and other participants with permission or other authorization. The client may select advisors to include any desired party and/or entity (e.g., accountant, lawyer, insurance agent, financial planner, estate executor, etc). In addition, the present invention may enable a client to grant access to specific advisors for specific documents and information. Varying levels of access to certain client information may be defined by the user (or other authorized entity). The client may also have access to an extensive library of various topics (e.g., financial) designed to inform and educate. A collaborative document management and communication system may be available to facilitate team interaction and promote efficiency. A calendar program may enable the client to track team interaction and schedule timelines for project management. Also available are national advisor directories to enable the client to mine for experts in various disciplines. A knowledge center with links to a wide range of useful financial and other relevant sites may also be provided to the client. Other benefits and features may also exist.

Advisor

Various services and features may be available for various types of users, such as advisors. For example, the present invention may provide the advisor with access to planning and research tools with collaborative (or other) software to enable easy, efficient collaboration with an advisor's clients and the client's individual sets of advisors. A management system of the present invention may include comprehensive financial planning programs, robust research resources, collaborative data and document sharing systems, calendar programs and relevant industry and association links.

For example, a client's entire financial plan may be consolidated into a single secure site to reduce redundant and inaccurate data gathering by multiple advisors and/or other entities. Thus, the present invention may provide the framework to create a virtual multi-discipline practice. For example, advisors may expand business models and provide clients with advanced services, by minimizing high capital demands of new technology and bricks-and-mortar expansion. Through the present invention, advisors may use the system of the present invention to reflect a specific corporate (or other) identity, and populate the system with content specific to the needs, goals and/or wishes of the advisor's firm and clients.

The present invention may provide various features to advisors and other users, such as interactive comprehensive financial planning software, including cumulative estate plan versioning capabilities and other planning tools. Advisors may also research library and other resources through the present invention, with discussions and decision tools relating to various financial planning topics, providing powerful advisor research and client presentation resources. The present invention may also provide standard forms and work flow systems, including automated document creation templates. The present invention may further provide collaborative document management and communication systems to facilitate team interaction and promote efficient project completion. A calendar program may be provided to track team interaction and schedule product timelines and timelines for project management. A document inventory may be used to store work in progress and/or other relevant information and material. Advisors may use the present invention to access continuing education and resource links to major professional associations and other entities. Advisors may also have access to a knowledge center with links to various related research sites. Other benefits and features may also exist.

Figure 7:
FIG. 7 is an example of a registration screen, according to an embodiment of the present invention.

Referring now to FIG. 7, FIG. 7 illustrates an exemplary user interface that allows people to register with collaboration tool 120. A person must register with collaboration tool 120 before they can use the tool to collaborate with others. As shown in FIG. 7, a person either registers as an advisor or as a client. After the registrant enters the requested registration information in the appropriate fill in fields 702, the registrant transmits the registration information to collaboration tool 120 by selecting next button 704. If the registrant registers as a client, then, after receiving the registration information, collaboration tool 120 creates a new client account for the client and stores the registration information in client database 130. Similarly, if the registrant registers as an advisor, then, after receiving the registration information, collaboration tool 120 creates a new advisor account for the advisor and stores the registration information in advisor database 132.

Once a user (client or advisor) is registered, the user is given a username and password so that the user can login to collaboration tool 120. After logging in, a client is given access to client module 122 and an advisor is given access to advisor module 124.

Figure 8:
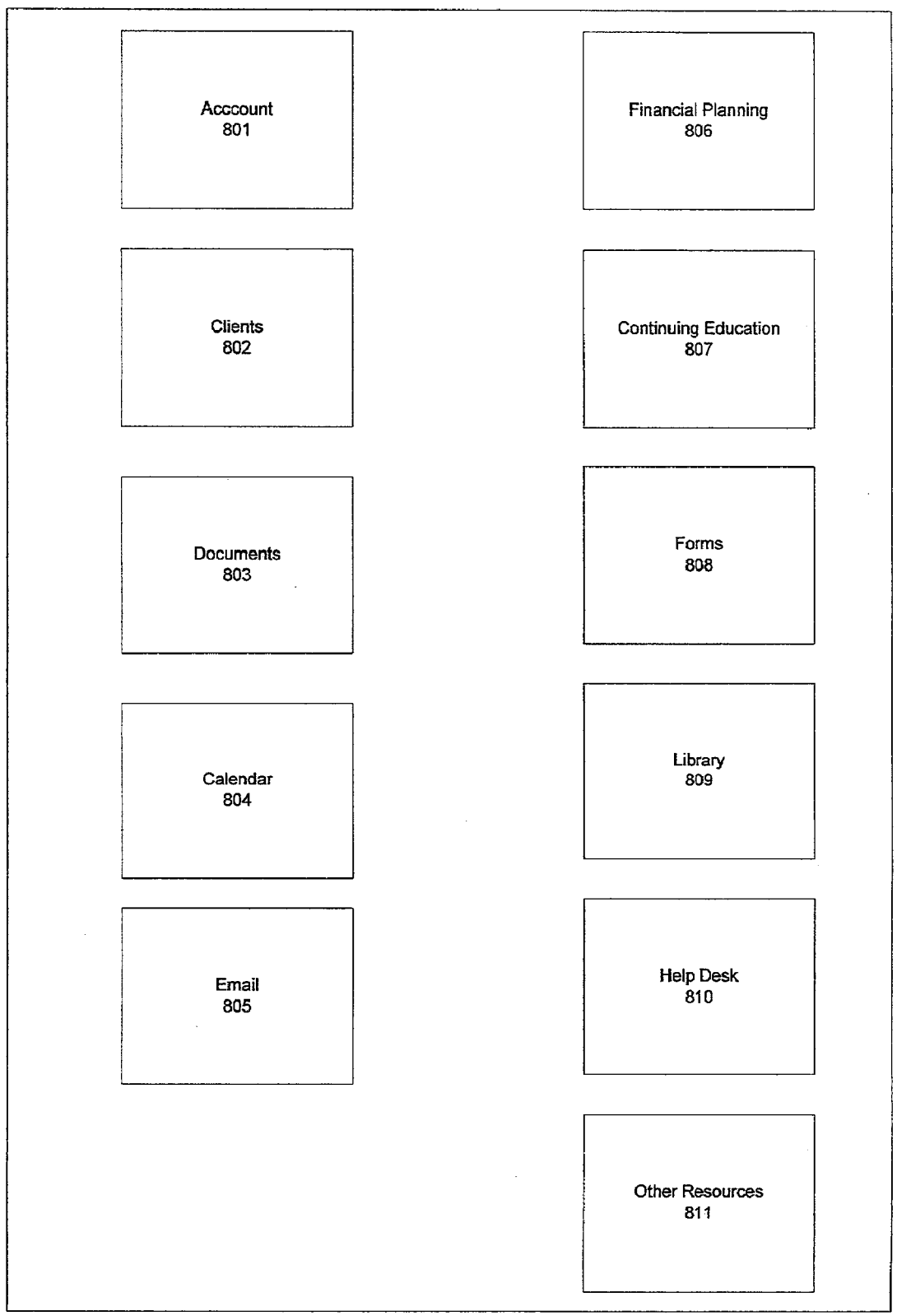
FIG. 8 is a functional block diagram of the advisor module according to one embodiment of the present invention.
Figure 9:
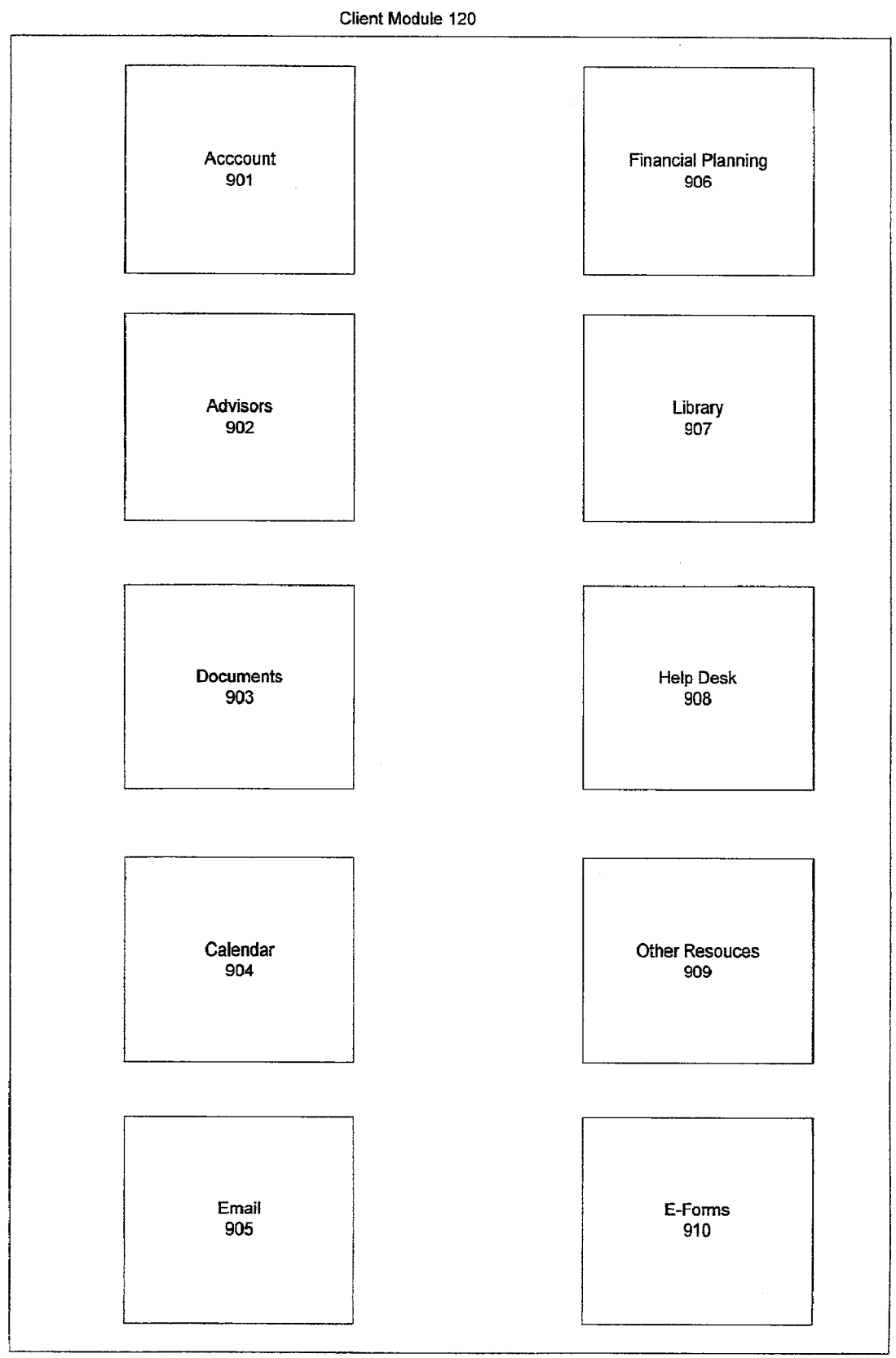
FIG. 9 is a functional block diagram of the client module according to one embodiment of the present invention.

FIG. 8 is a block diagram illustrating advisor module 124, according to one embodiment, and FIG. 9 is a block diagram illustrating client module 122, according to one embodiment. As shown in FIG. 8, advisor module 124 includes a number of sub-modules 801-811. Sub-modules 801-811 enable an advisor to, among other things, collaborate with a client and with the client's other advisors. Similarly, as shown in FIG. 9, client module 122 includes a number of sub-modules 901-910 that enable a client to collaborate with one or more advisors.

Figure 10:
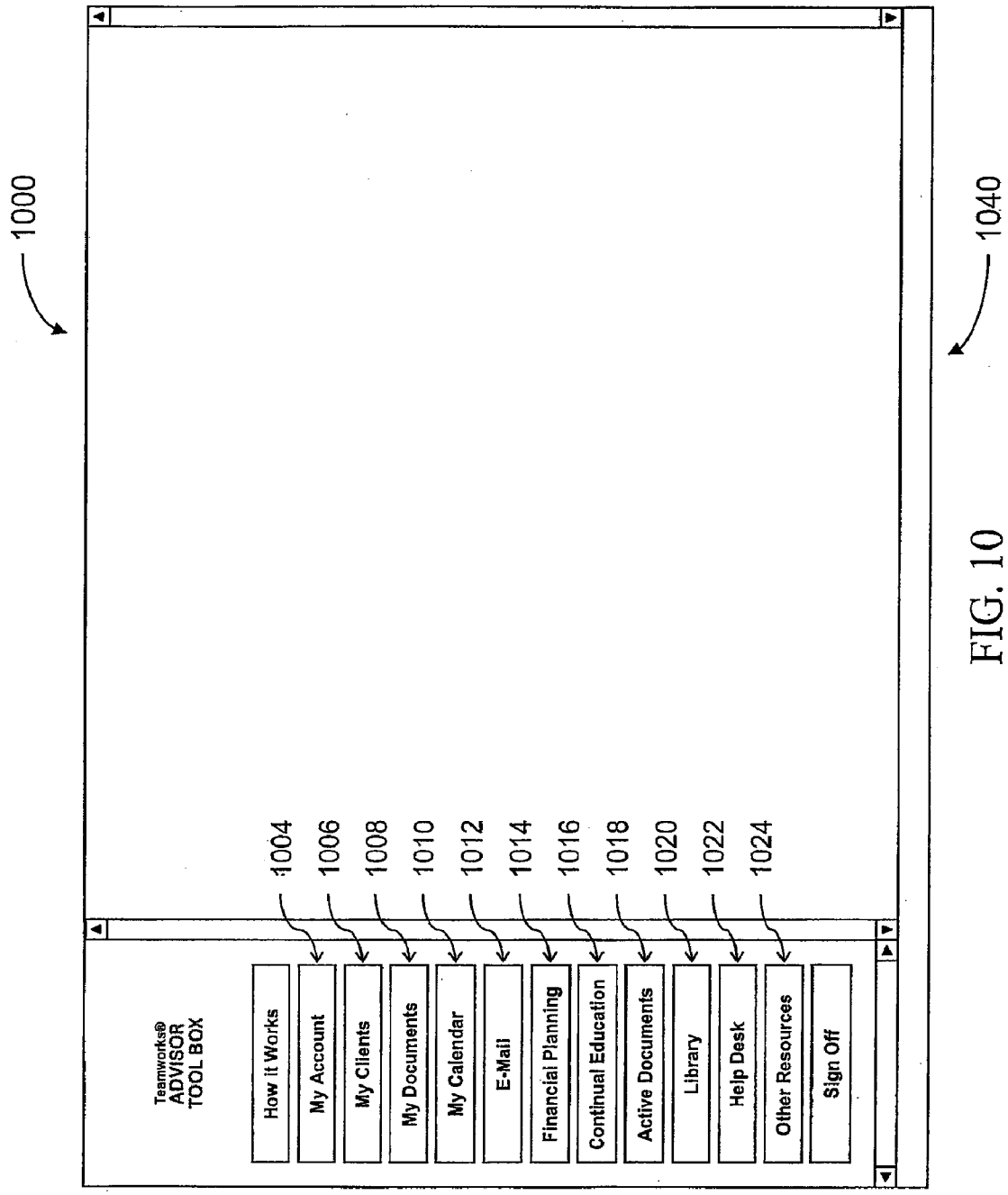
FIG. 10 is an example of an advisor interface screen, according to an embodiment of the present invention.
Figure 11:
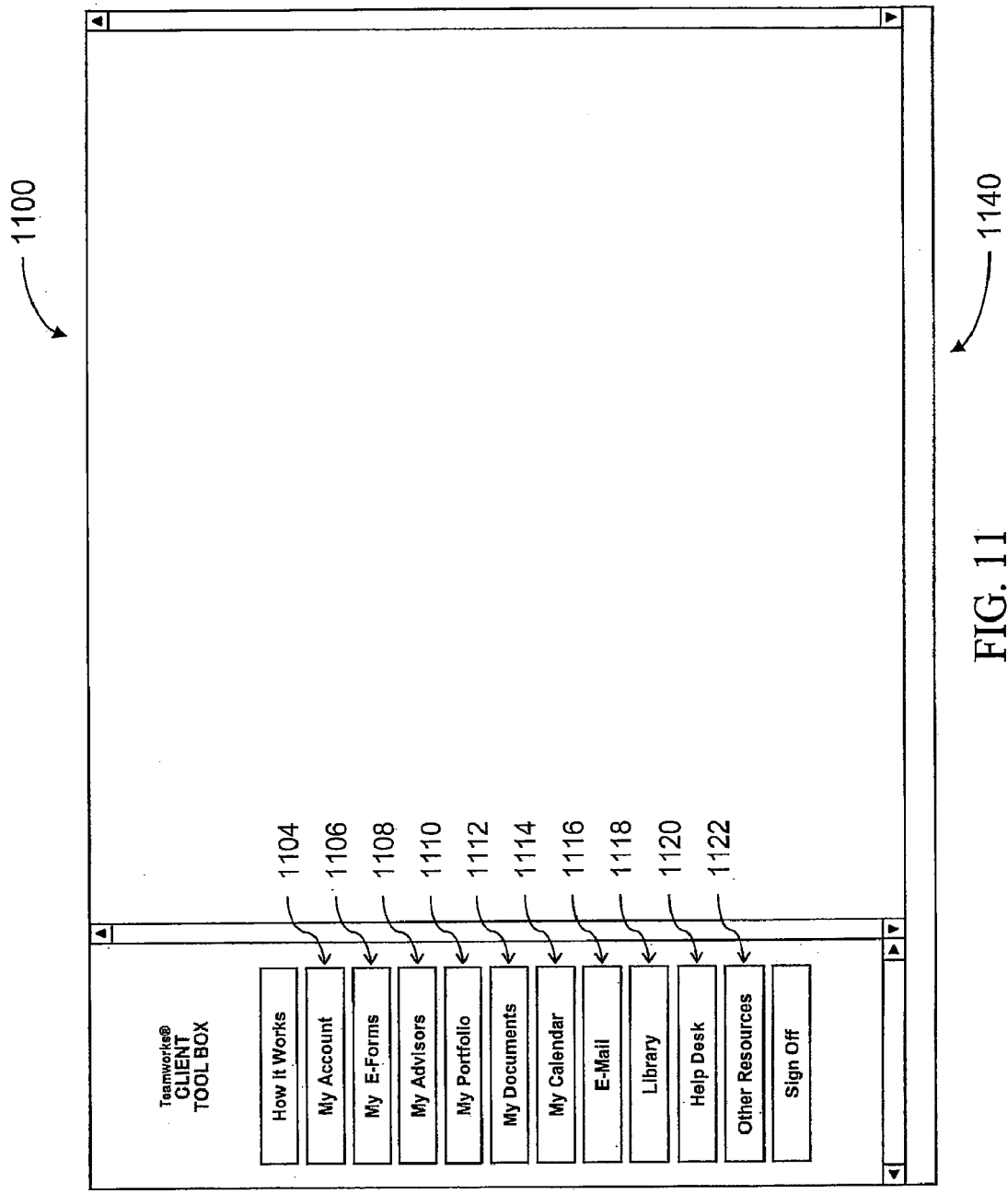
FIG. 11 is an example of a client interface screen, according to an embodiment of the present invention.

FIGS. 10 and 11, illustrate, respectively, an exemplary user interface 1000 (hereafter "advisor interface") presented to an advisor after the advisor logs in to collaboration tool 120 and an example user interface 1100 (hereafter "client interface") presented to a client after a client logs in to collaboration tool 120. Advisor interface 1000 includes an advisor toolbox section 1001 and a display area 1040. For each sub-module 801-811 within advisor module 124, a corresponding selectable button is provided in advisor toolbox section 1001 for accessing the corresponding sub-module. Thus, for example, advisor toolbox section 1001 includes a my account button 1004 corresponding to account sub-module 801, and a my clients button 1006 corresponding to clients sub-module 802.

Similarly, client interface 1100 includes a client toolbox section 1101 and a display area 1140. For each sub-module 901-910 within client module 122, a corresponding selectable button is provided in client toolbox section 1101 for accessing the corresponding sub-module. Thus, for example, client toolbox section 1101 includes a my account button 1104 corresponding to account sub-module 901, a my advisors button 1108 corresponding to advisors sub-module 902.

Before a client and one his advisors can collaborate on a project, the advisor must be added to the client's "advisors list." The client's advisors list contains the list of advisors with whom the client may collaborate. A client's advisors list is stored in client database 130. There are two ways for an advisor to be included in a client's advisors list.

The first way for an advisor to be added to a client's advisors list is for the advisor to register the client with collaboration tool 120. An advisor who registers a client is automatically included in that client's advisors list. Additionally, by initiating registration of the client, the advisor may be automatically granted view and edit permission for all of the documents that are placed in the client's "my documents" folder (also referred to as "home folder"), which is described more fully below.

Figure 12:
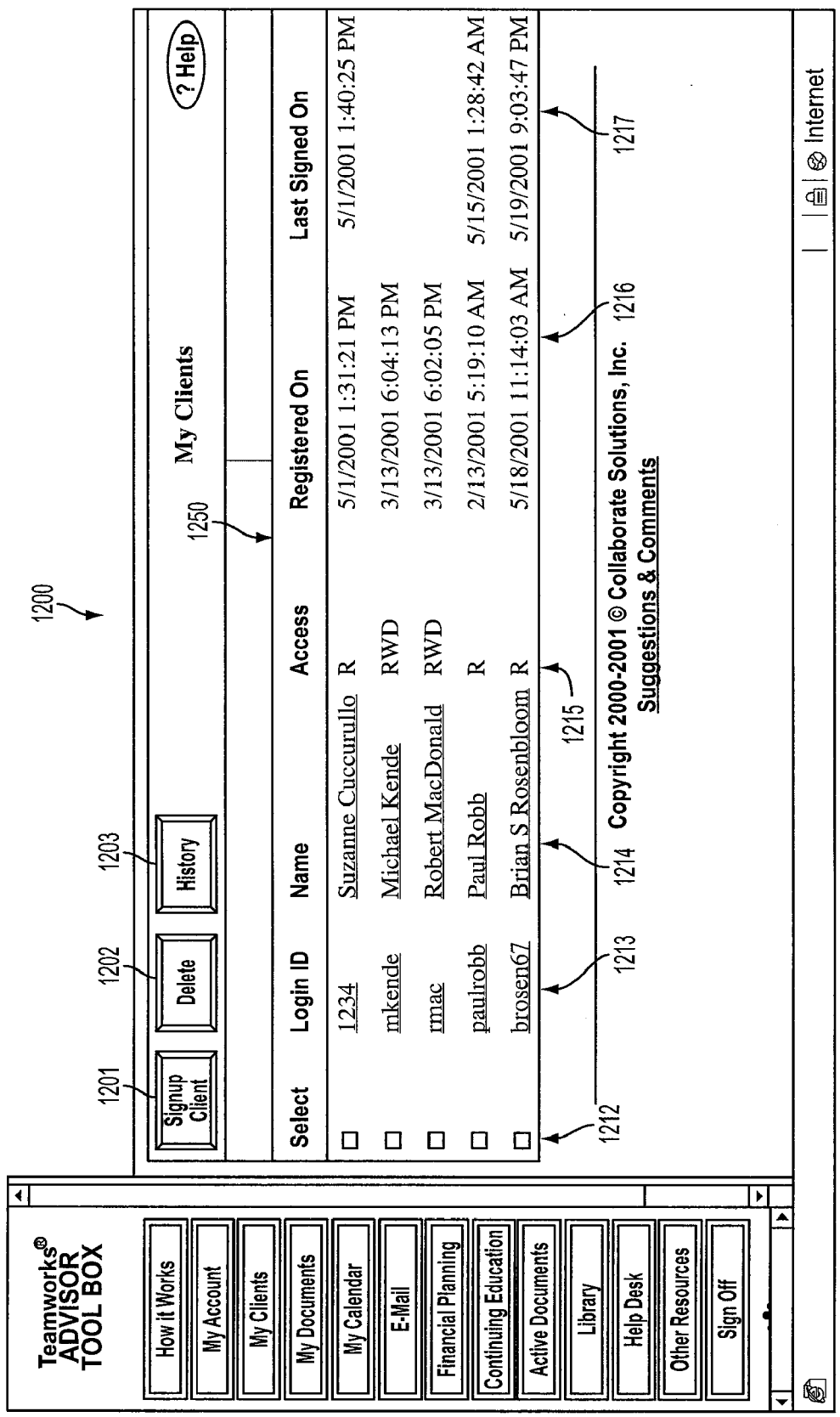
FIG. 12 is an example of an advisor's client screen, according to an embodiment of the present invention.

An advisor registers a client by accessing clients sub-module 802 (that is, selecting my clients button 1006). After selecting my clients button 1006, a client screen 1200 (see FIG. 12) is displayed in display area 1040. Client screen 1200 includes function buttons 1201-1203, including a signup client button 1201, delete button 1202, and history button 1203.

Client screen 1200 also includes a client table 1250 for displaying, among other things, a list of clients with whom the advisor may collaborate using tool 120. More specifically, client table 1250 includes a select column 1212 that includes selection boxes which allow the advisor to select the clients to be processed when a function is initiated, such as delete or history, a login id column 1213 that displays each client's login id, a name column 1214 that displays each client's name, an access column 1215 that indicates the access that the advisor has to each client's home folder, a registered on column 1216 that displays the date each client was registered with collaboration tool 120, and a last signed on column 1217 that displays the date and time that each client last logged in to collaboration tool 120.

To delete a client from client table 1250, the advisor selects the client by placing a checkmark in the selection box associated with the client and then activates delete button 1202. The result of deleting a client from client table 1250 is that the advisor is removed from the client's advisors list. The client may be automatically notified that an advisor has been removed from the client's advisors list through an automatically generated e-mail or other communication.

To view a history page associated with a client, the advisor selects the client by placing a checkmark in the selection box associated with the client and then activates history button 1203. The client history pages are stored in client database 130.

Lastly, to register a client, the advisor activates signup client button 1201. In response to signup client button 1201 being activated, a client registration form 1300 (see FIG. 13) is displayed to the advisor. The advisor fills in the requested or, at the least, the required client registration information and then selects sign up button 1304. The client registration information is then transmitted to and received by collaboration tool 120. After receiving the client registration information, collaboration tool 120 creates a new client account and stores in client database 130 the registration information. Each client registered by an advisor may receive an automatic notification (e.g., an e-mail or other form of communication) indicating to the client that the client has been registered.

As is shown in client registration form 1300, the advisor is prompted to select a billing option. Preferably, the advisor, rather than the client, pays for the client's account. That is, the client is given free access to collaboration tool 120, whereas an advisor must pay to use collaboration tool 120 and/or must pay a certain amount (e.g., $5 per month) for each client that the advisor registers. This arrangement is preferred because advisors generally have more to gain monetarily than clients from the use of collaboration tool 120.

Figure 14:
FIG. 14 is an example of a client's advisor screen, according to an embodiment of the present invention.

The second way for an advisor to be added to a client's advisors list is for the client to manually add the advisor to his advisors list. A client manually adds an advisor to his advisors list by accessing advisors sub-module 902 (that is, selecting my advisors button 1108 on client interface 1100). After selecting the my advisors button 1108, an advisors screen 1400 (see FIG. 14) is displayed in display area 1140. Advisors screen 1400 enables a client to view a list of the client's advisors (i.e., the client's advisors list), to change access level information for an advisor, to add/remove an advisor from the client's advisors list and perform other operations.

In one embodiment, advisors screen 1400 includes an advisors table 1402 that shows the advisors that are currently included in the client's advisors list. Advisors table 1402 also indicates the current access status of each advisor in the advisor list. In one embodiment, an advisor's access status is either set to "allow" or set to "none." The client sets the access status of each advisor in his advisor's list. If the client sets an advisor's access status to "none," then the advisor is not allowed to view or edit any documents that are within the client's home folder. The home folder will be explained in more detail further below, but, in short, a client's home folder enables a client to work with one or more advisors in creating and editing documents. If the client sets an advisor's access status to "allow," then the advisor may view and/or edit certain documents for which the client grants permission. Advisors table 1402 also displays the date and time when a particular advisor was last signed on to the system of the present invention and description information for each advisor, which may include information related to advisor, level of access or other information.

Figure 15:
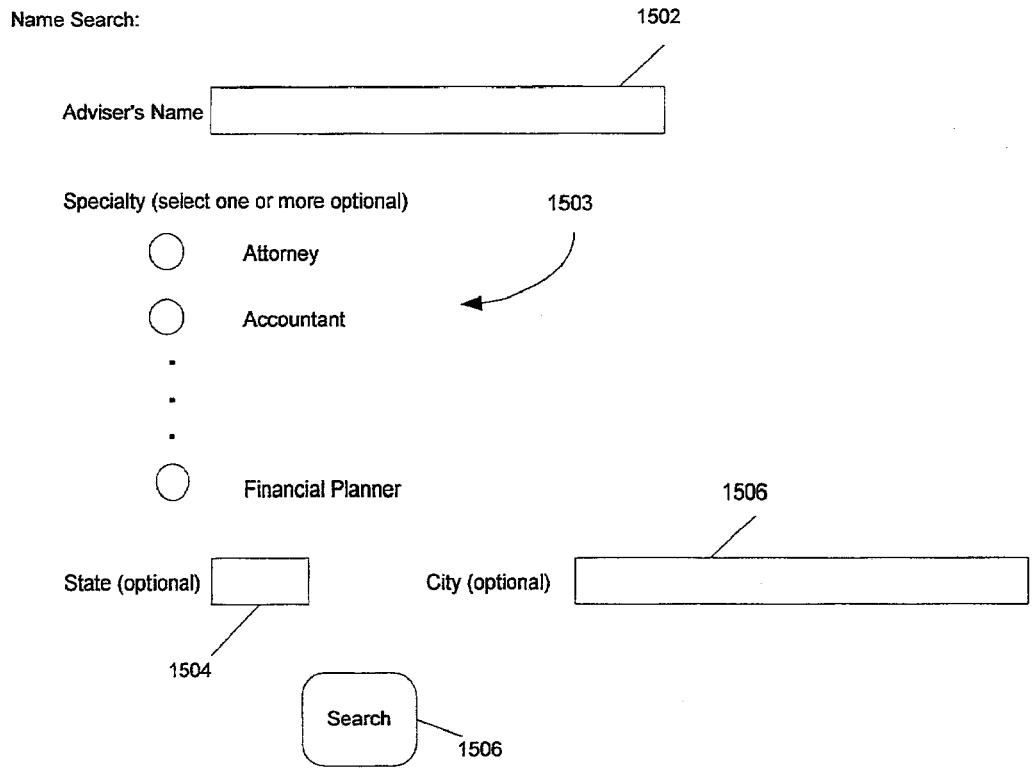
FIG. 15 is an example of an advisor search screen, according to an embodiment of the present invention.

Advisors screen 1400 also includes an add advisor button 1410. By activating this add advisor button 1410, a client can manually add advisors to his advisors list. In response to the client activating add advisor button 1410, an add-advisors screen 1500 is displayed (see FIG. 15). Screen 1500 enables a client to find advisors and manually add advisors to the client's advisors list.

Screen 1500 provides two ways for a client to find an advisor. First, the client can perform a name search if the client knows the name of an advisor. Second, if the client doesn't know the name of an advisor, the client can perform a specialty search.

To perform a name search, the client types in an advisor's name (or part of an advisor's name) into a search field 1502. Optionally, the client can limit the search to one or more specialties by using check boxes 1503 to select one or more specialties and to limit the search by specifying a state and city using search fields 1504 and 1505, respectively. To run the name search, the client selects search button 1506. To perform a specialty search, the client uses check boxes 1507 to limit the search to one or more specialties. Optionally, the client can also limit the search by specifying a state and city using search fields 1508 and 1509. To run the specialty search, the client activates search button 1511.

Activating search button 1506 or 1511 causes collaboration tool 120 to search advisors database 132 to find those advisors that match the specified search criteria (e.g., all advisor's in Boston, Mass. named John Smith or all accountants and attorneys in Boston). The advisors that match the search criteria are then displayed to the client in a search results screen 1600 (see FIG. 16). In the case that a client wishes to add an advisor to his advisors list, but that advisor is not registered with collaboration tool 120 (e.g., the advisor does not have a login id and password and is not listed in advisor database 132), the client may contact that advisor and request that the advisor register with collaboration tool 120.

Search results screen 1600 displays the results of the search. That is, search results screen 1600 lists each registered advisor that matches the search criteria. For each listed advisor, search results screen 1600 also displays the advisor's specialty and location (city and state) as well as a description of the advisor. A client adds one of the listed advisors to his advisors list by selecting the add button 1602 that is associated with the advisor that the clients desires to add. When an advisor is added to a client's advisors list, the access status for the advisor is automatically set to "allow." Preferably, the newly added advisor is notified that he has been added to the client's advisor list by a notification (e.g., an e-mail or other method of communication) that is automatically generated and transmitted by collaboration tool 120 to the newly added advisor.

Other sources of advisors and search facilities may be implemented. For example, a database of advisors may be queried by the user, through various search tools and search criteria. Other user defined search criteria may be applied to databases of information, such as advisor directories, etc.

The function of deleting an advisor from the advisors list is also provided. The client would first select the my advisors button 1108 to display the advisors screen 1400. The client would next activate the delete button associated with the advisor that the client desires to delete. Activating the delete button causes collaboration tool 120 to remove the selected advisor from the client's advisors list. Preferably, the newly deleted advisor is notified that he has been deleted by a notification (e.g., an e-mail or other method of communication) that is automatically generated and transmitted by collaboration tool 120 to the newly deleted advisor.

A client may view history information concerning one of his advisor's by selecting the history button associated with the advisor. An advisor's history information may include information related to the advisor's contribution to the client. For example the history information may include a log of all the transactions performed by the advisor, such as editing a document, downloading a document, and viewing a document.

Figure 17:
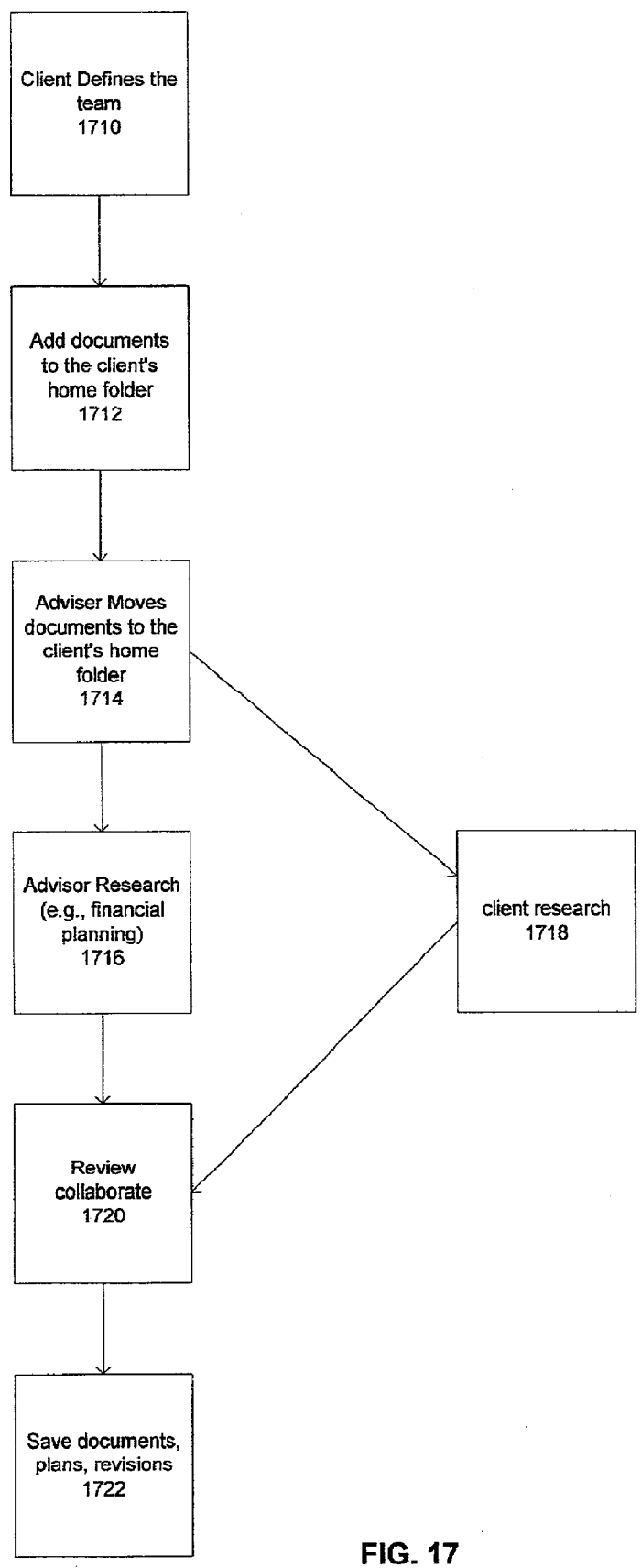
FIG. 17 is a flowchart of a collaboration process, according to an embodiment of the present invention.

After a client adds advisors to his advisors list, the client can collaborate with the advisors and the client's advisors can collaborate amongst themselves on behalf of the client. FIG. 17 is a flowchart of a collaboration process 1700, according to an embodiment of the present invention.

The collaboration process 1700 may be changed to meet the specific needs, goals and desires of a client and advisors on a collaboration team. In the first step, step 1710, a client team is created. That is, one or more advisors are added to the client's advisors list.

At step 1712, the client may place or authorize the placing of the client's documents and other information in the client's home folder (or folder within the home folder). For example, any document relating to the client may be placed in the client's home folder.

Figure 18:
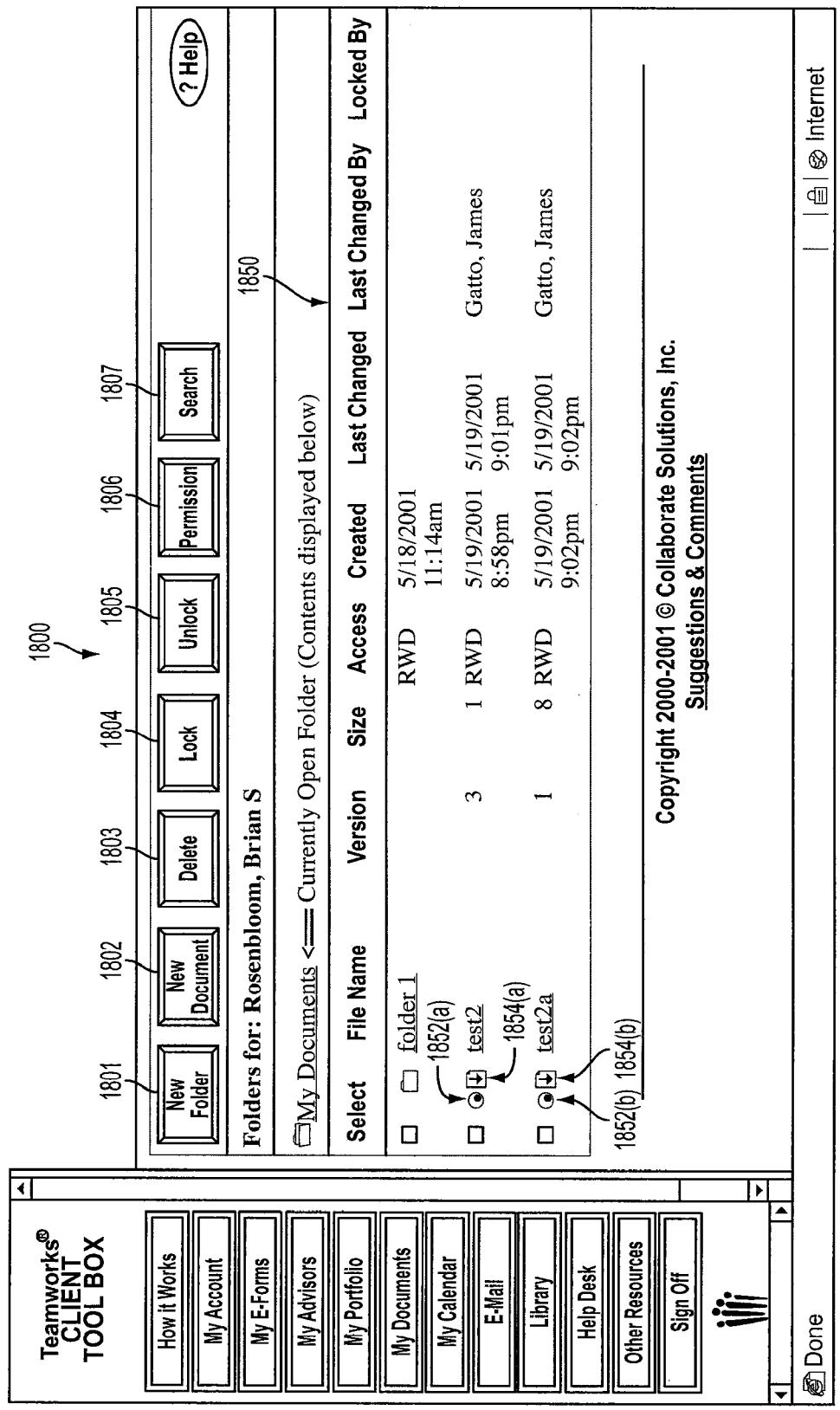
FIG. 18 is an example of a client's my documents screen, according to an embodiment of the present invention.

A client places documents in his home folder by using the documents sub-module 903. The client accesses this module by activating my documents button 1112. When the client activates my documents button 1112 a my documents screen 1800 (see FIG. 18) is displayed to the client. My documents screen 1800 includes function buttons 1801-1807, including a new folder button 1801, new document button 1802, delete button 1803, lock button 1804, unlock button 1805, permissions button 1806, and search button 1807.

My documents screen 1800 also includes a content table 1850 for displaying the contents of the currently open folder. By default, the client's home folder (also referred to as "my documents folder") is the currently opened folder whenever my documents button 1112 is activated. The contents of a folder may include one or more documents and/or one or more other folders. In the example shown in FIG. 18, the currently opened folder (i.e., the client's home folder) includes one folder named "folder1" and two documents named "test2" and "test2a." Documents may be any type of information that may be stored on a computer (or other processing/communication device). Documents may be in various forms, such as word processing documents, PowerPoint presentations, spreadsheets, etc.

More specifically, content table 1850 includes a select column that includes selection boxes which allow the advisor to select the documents/folders to be processed when a function is initiated, such as delete, lock, or unlock, a file name column that displays the name of each document or folder within the currently open folder (if the name is underlined or otherwise highlighted, the user may select the document, otherwise the user may not select the document), a version column for displaying the version number of each document, a size column for indicating the size of each document, an access column for displaying the client's access level for each document/folder, a created column for displaying the creation date of each document/folder, a last changed column for displaying the date each document was last modified, a last changed by column for displaying the name of the user who last edited each document, and a locked by column for indicating for each locked document the user who locked the document/folder.

A client deletes, locks, and unlocks a document/folder by selecting the document/folder (e.g., clicking in the selection box located adjacent to the document) and then activating delete button 1803, lock button 1804, and unlock button 1805, respectively. When a document is locked, no user except for the user who placed the lock on the document may transfer the document to their local storage, and thereby edit the document. When a folder is locked, no user except for the user who placed the lock on the folder may open the folder.

Figure 42:
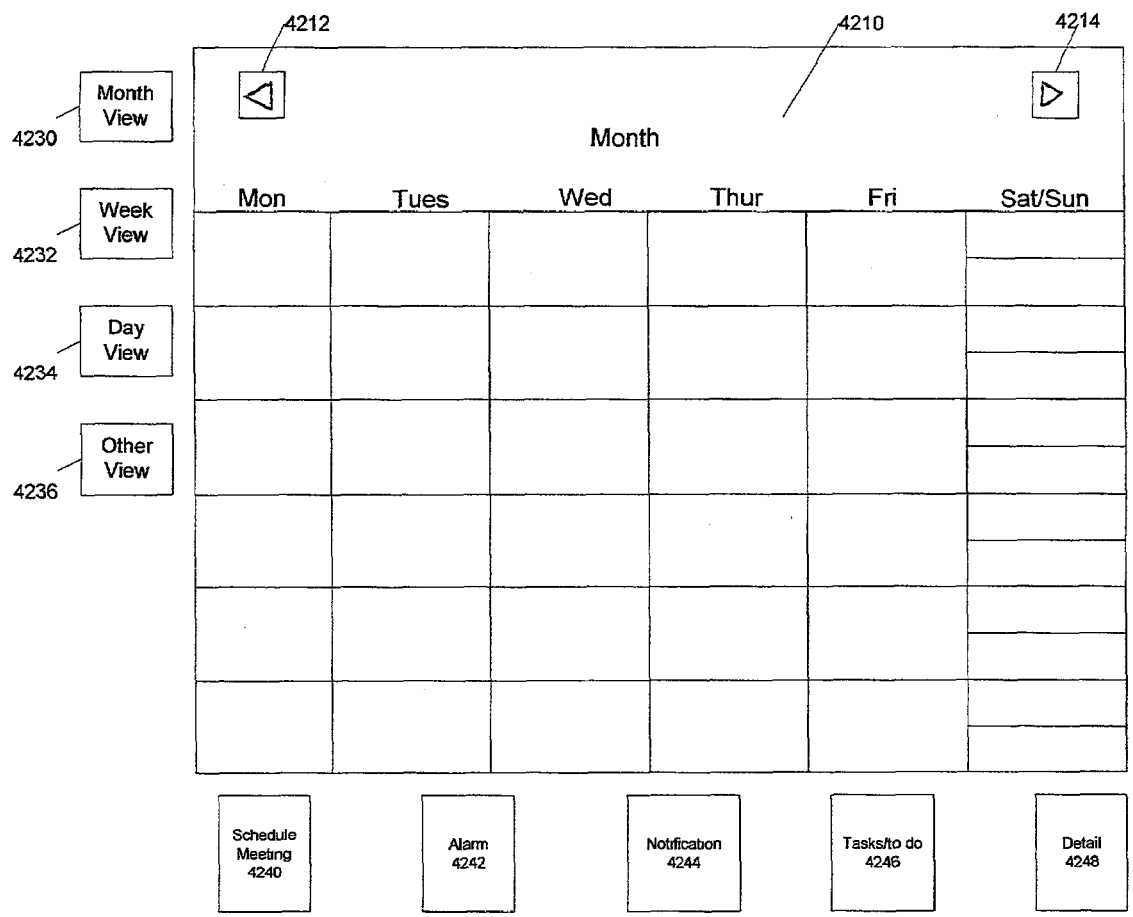
FIG. 42 is an example of a calendar feature, according to an embodiment of the present invention.
Figure 43:
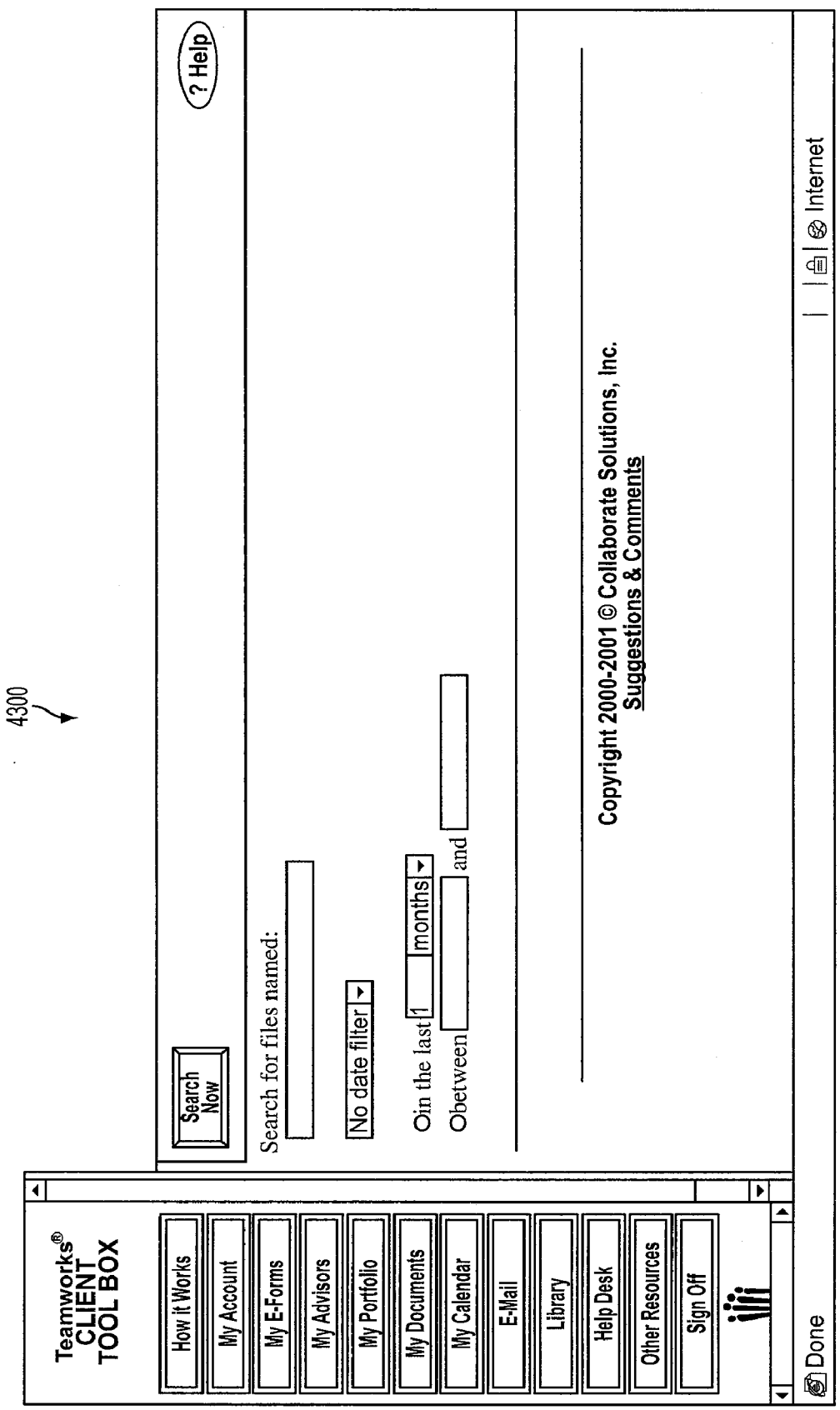
FIG. 43 is an example of a search screen, according to an embodiment of the present invention.

Search button 1807 enables the client to scan their home folder area for any files of folders that meet a criteria specified in search screen 4200 (see FIG. 42). Search screen 4200 is displayed when the client activates search button 1807. All of the files/folders that match the search criteria are displayed in a results screen (not shown).

Figure 20:
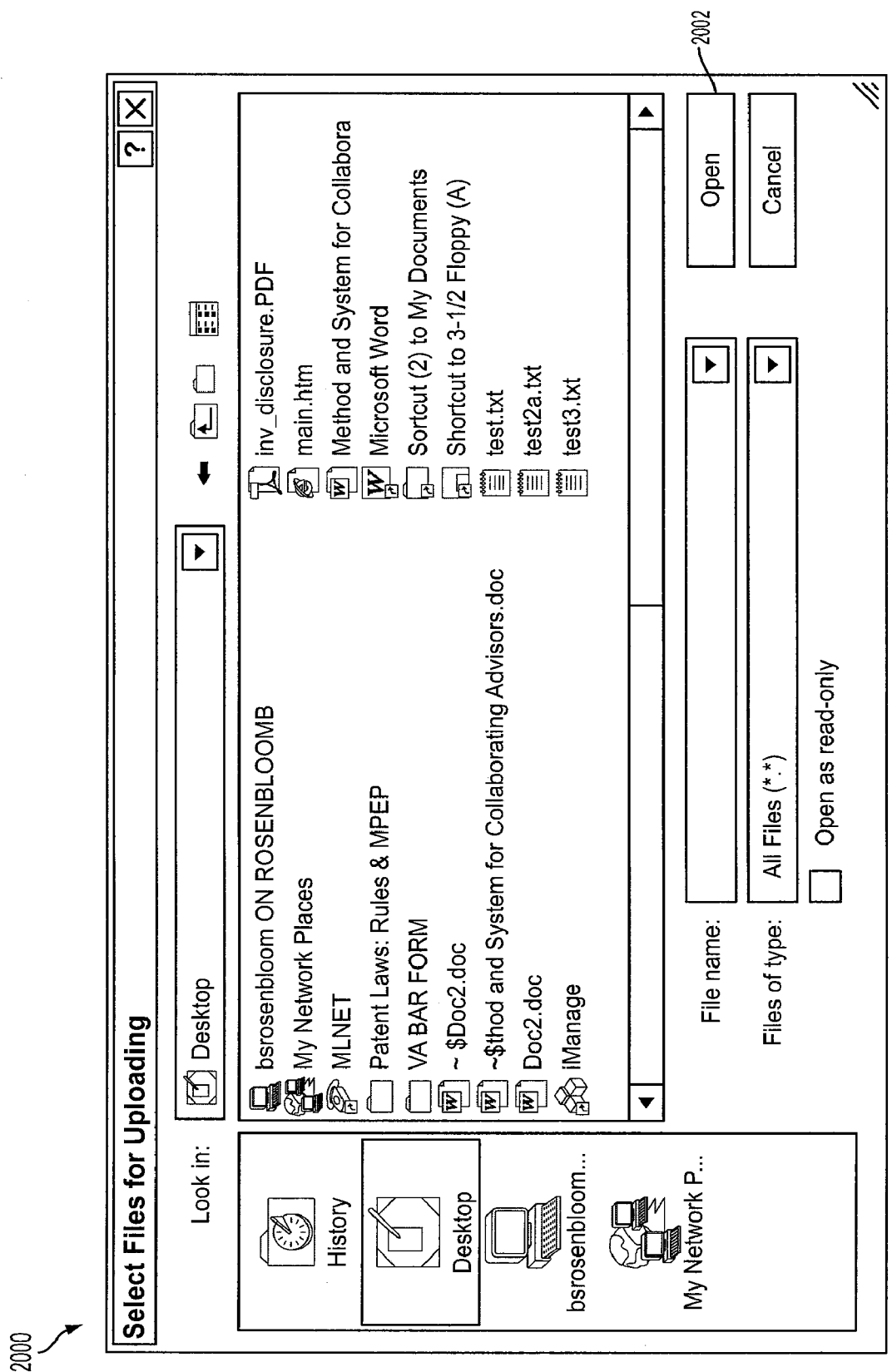
FIG. 20 is an example of a select file screen, according to an embodiment of the present invention.

A client places documents in his home folder by first opening the home folder (e.g., activating my documents button 1112) and then activating new document button 1802. This causes an add document form 1900 (see FIG. 19) to be displayed to the client. The client selects the document to be placed in the home folder by activating select file button 1902. Selecting this button causes a window 2000 (see FIG. 20) for selecting a file. In one embodiment, window 2000 enables the client to navigate through the client's various local folders (e.g., folders on his or her local hard disk or floppy disk) to find the file that the client desires to add to the home folder. Once the desired file is found, the client selects the file and activates the open button 2002. This will cause the add document form 1900 to re-appear with the selected file listed in window 1910. At this point, the clients names the document by inputting a name into the document name field 1912, optionally inputs a comment into comment box 1990 and checks e-mail notification box 1989, and then activates ok button 1914. After activating ok button 1914, the collaboration tool 120 updates client database 130 to indicate that the file is "placed" in the home folder. Optionally, the selected file or a pointer to the selected file may be sent to collaboration tool 120 and stored in data storage 129. Additionally, if e-mail notification box 1989 is checked, an automatic e-mail notification (or other communication) is sent to any user who may have permission to see or modify the document notifying these users that this document has been uploaded.

Figure 21:
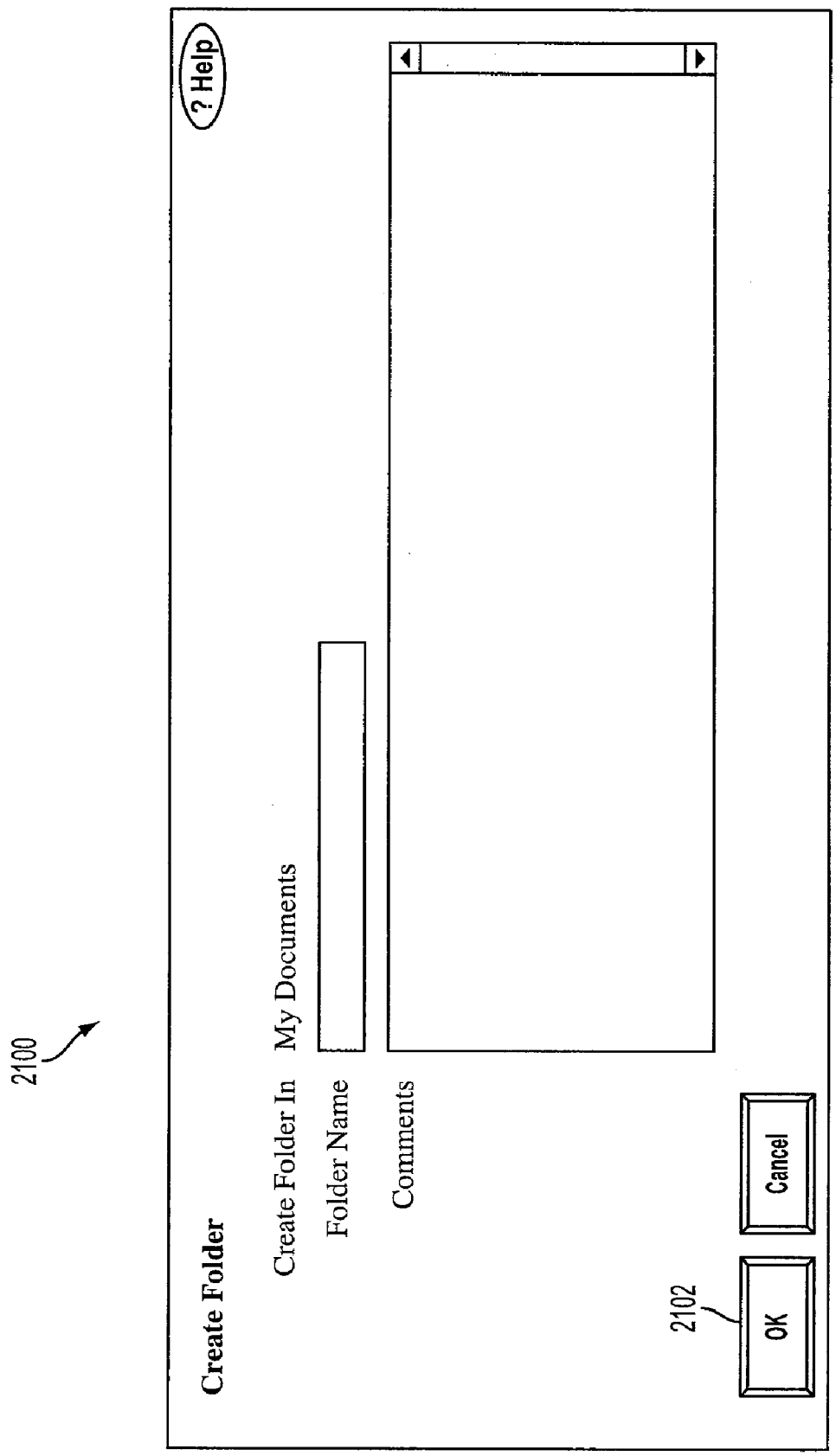
FIG. 21 is an example of a create folder screen, according to an embodiment of the present invention.

To create a folder in the home folder, the client opens the home folder by activating my documents button 1112 and then activates new folder button 1801. This causes a create folder screen 2100 (see FIG. 21) to be displayed. This form enables the client to name the new folder and to optionally provide comments. When the client activates ok button 2102, collaboration tool 120 updates database 120 to reflect that a new folder has been created in the home folder and a new folder having the name specified by the client will appear in content table 1850. The client may place documents in the newly created folder in the same manner that the client places documents into his home folder. However, the client must first open the folder before he can add any documents to the folder. In one embodiment, the client opens the folder by "clicking on" the folder name displayed in content table 1850. When the client open a folder, the content table 1850 lists the files and folders contained in the folder.

An advisor places documents in his home folder by using the documents sub-module 803. The advisor accesses this module by activating my documents button 1008. When the advisor activates my documents button 1008 a my documents screen 2200 is displayed to the advisor. My documents screen 2200 includes a display section 2250 for displaying the contents of the advisor's my document folder. The contents may include one or more files and/or one or more folders. In the example shown in FIG. 22, the advisor's my document folder simply includes one folder named "My financial plans" and one file named "test3.txt." My documents screen 2200 also includes function buttons 2201-2207 for performing various functions, such as creating a folder, creating a document, searching for documents, etc.

More specifically, an advisor places documents to his home folder by activating new document button 2202. This causes the add document form 1900 to be displayed to the advisor. The advisor uses the add document form 1900 in the same way as the client. That is, the advisor selects the file to place by activating select file button 1902. Selecting this button causes the window 2000 for selecting a file to be displayed. After the advisor selects a file, the advisor activates the open button 2002. This will cause the add document form 1900 to re-appear with the selected file listed in window 1910. At this point, the advisor names the document by inputting a name into the document name field 1912 and then activates ok button 1914. After activating ok button 1914, collaboration tool 120 "adds" the selected file to the advisor's home folder (or a sub-folder within the home folder). The steps an advisor performs to create a folder within his home folder are the same steps that the client performs, which are described above.

Referring back to FIG. 17 and process 1700, at step 1714, the documents maintained in an advisor's home folder may be moved to the client's home folder. Any document that needs to be part of the collaboration may be placed in the client's home folder or in a folder within the home folder.

Figure 22:
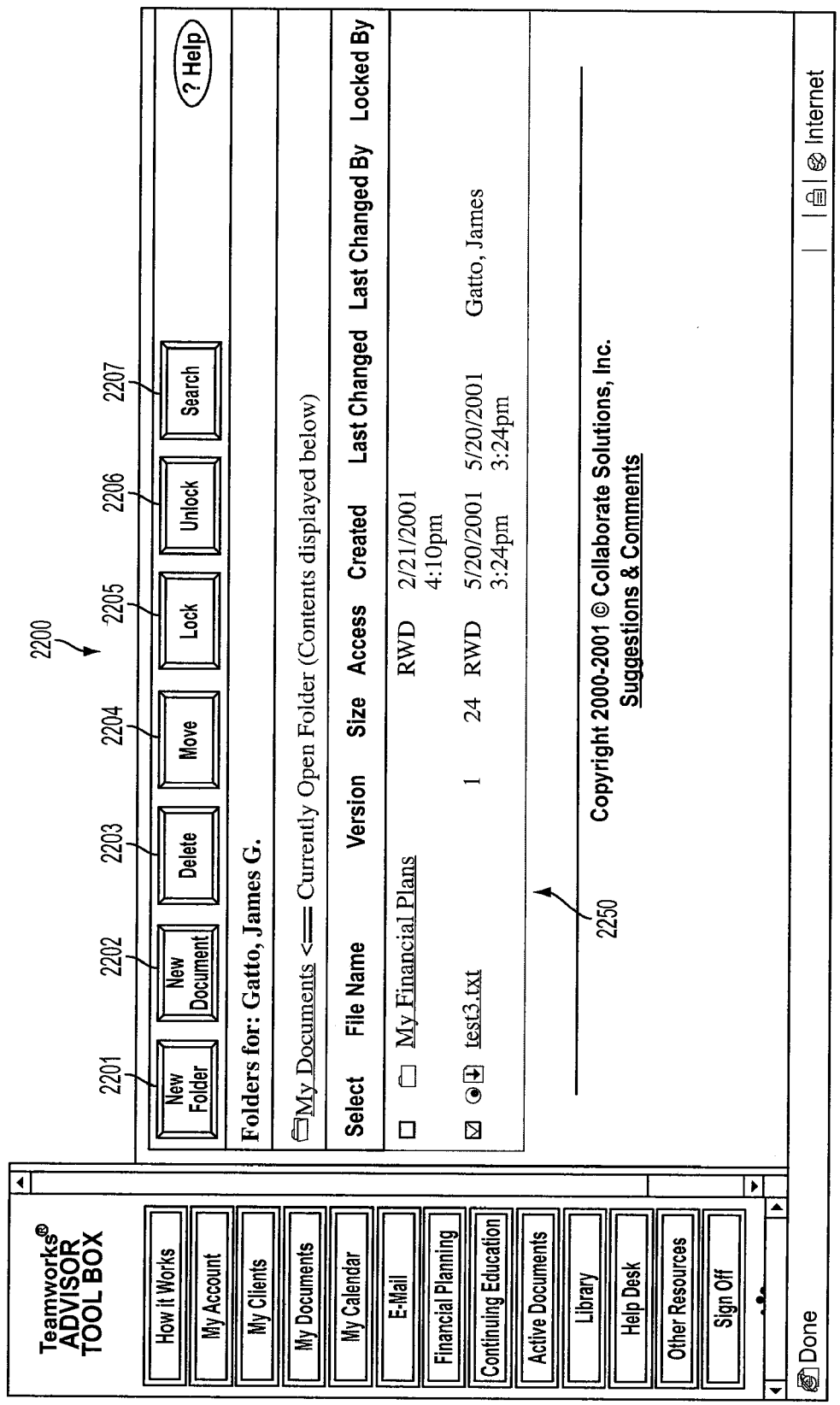
FIG. 22 is an example of an advisor's my documents screen, according to an embodiment of the present invention.
Figure 23:
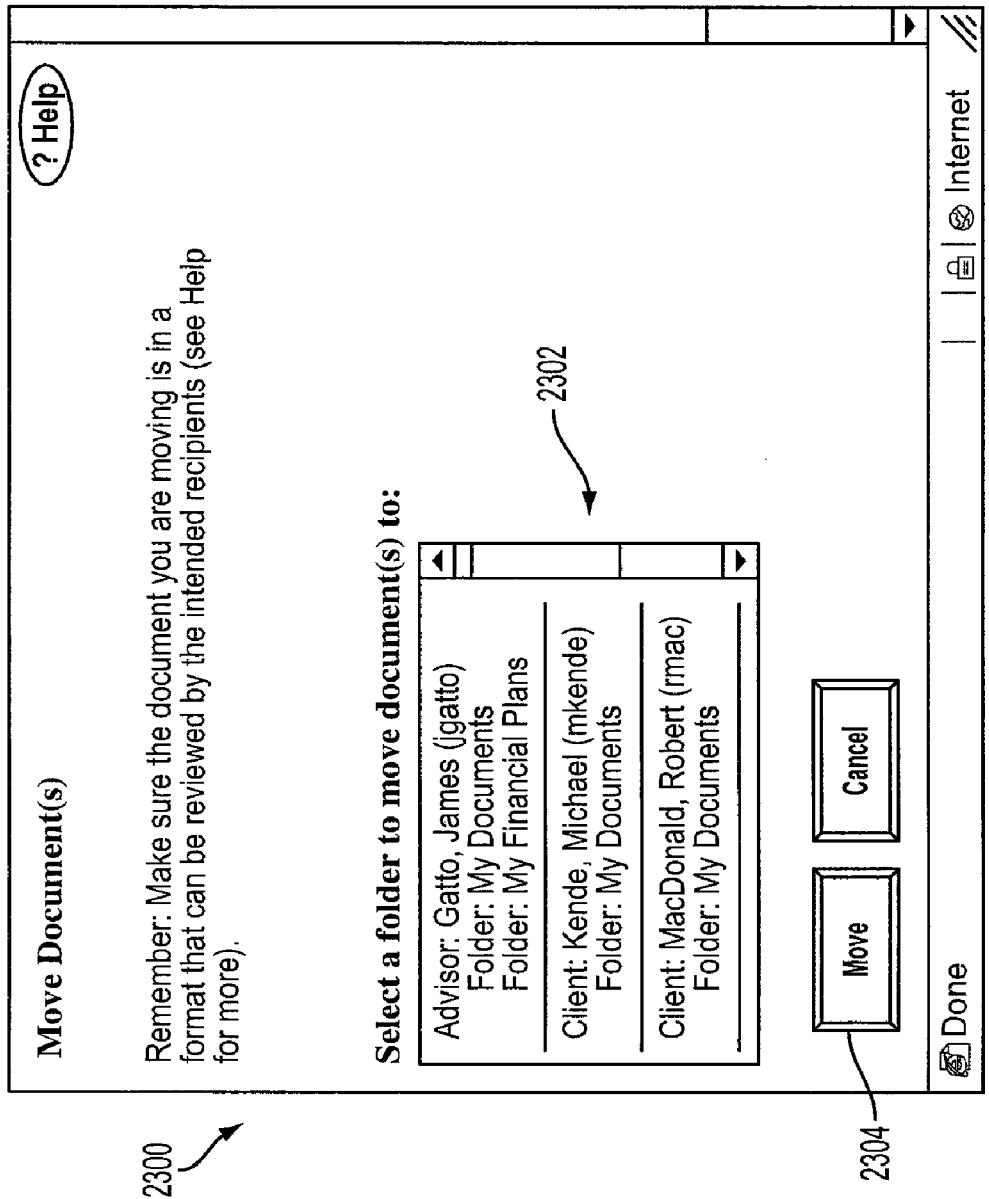
FIG. 23 is an example of a move screen, according to an embodiment of the present invention.

As an example, referring to FIG. 22, the advisor can move the document entitled "test3.txt" to one of his clients' home folder (provided the client has given the advisor access rights to the client's home folder). To move the document, the advisor first selects the document by inputting a checkmark in the checkbox associated with the document. Next, the advisor activates move button 2204. In response to the advisor activating move button 2204, a move document(s) screen 2300 is displayed. Move document(s) screen 2300 provides a list of folders 2302 to which the advisor is able to move documents. As shown in folder list 2302, the advisor may move files to his client's folders. That is, the clients listed in folder list 2302 have given the advisor access to their respective home folders. The advisor selects one of the folders listed in folder list 2302 and then selects move button 2304. This will cause collaboration tool 120 to "move" the selected file to the selected folder. That is, collaboration tool 120 updates its database to reflect that the file has been placed in the selected folder. In this way, an advisor can move a document that he created into one of his clients' home folders.

Once the document is in the client's home folder, the client can access the document (view and/or edit) and one or more of the client's other advisors who have access to the client's home folder can also access the document. In this way, multiple advisors can collaborate with the client and with each other.

The client can view and edit the document placed by the advisor in his home folder by using the documents sub-module 903. The client accesses this module by activating my documents button 1112. When the client activates my documents button 1112 my documents screen 1800 is displayed to the client. As described above, my documents screen 1800 includes content table 1850 for displaying the contents of the client's home folder, including the document moved to the folder by the advisor.

To view a document that is listed in content table 1850, the client activates a view button 1852 associated with the document. For example, the client can view the document named "test2a" by activating view button 1852(*b*). When the client activates this button, client module 122 displays the contents of the document to the client.

To make edits to a document that is listed in content table 1850, the client must first transfer the document to the client's local storage device 112, if the document is not already stored therein. In one embodiment, all files listed in content table 1850 are stored by collaboration tool 120 in data storage 129.

Figure 25:
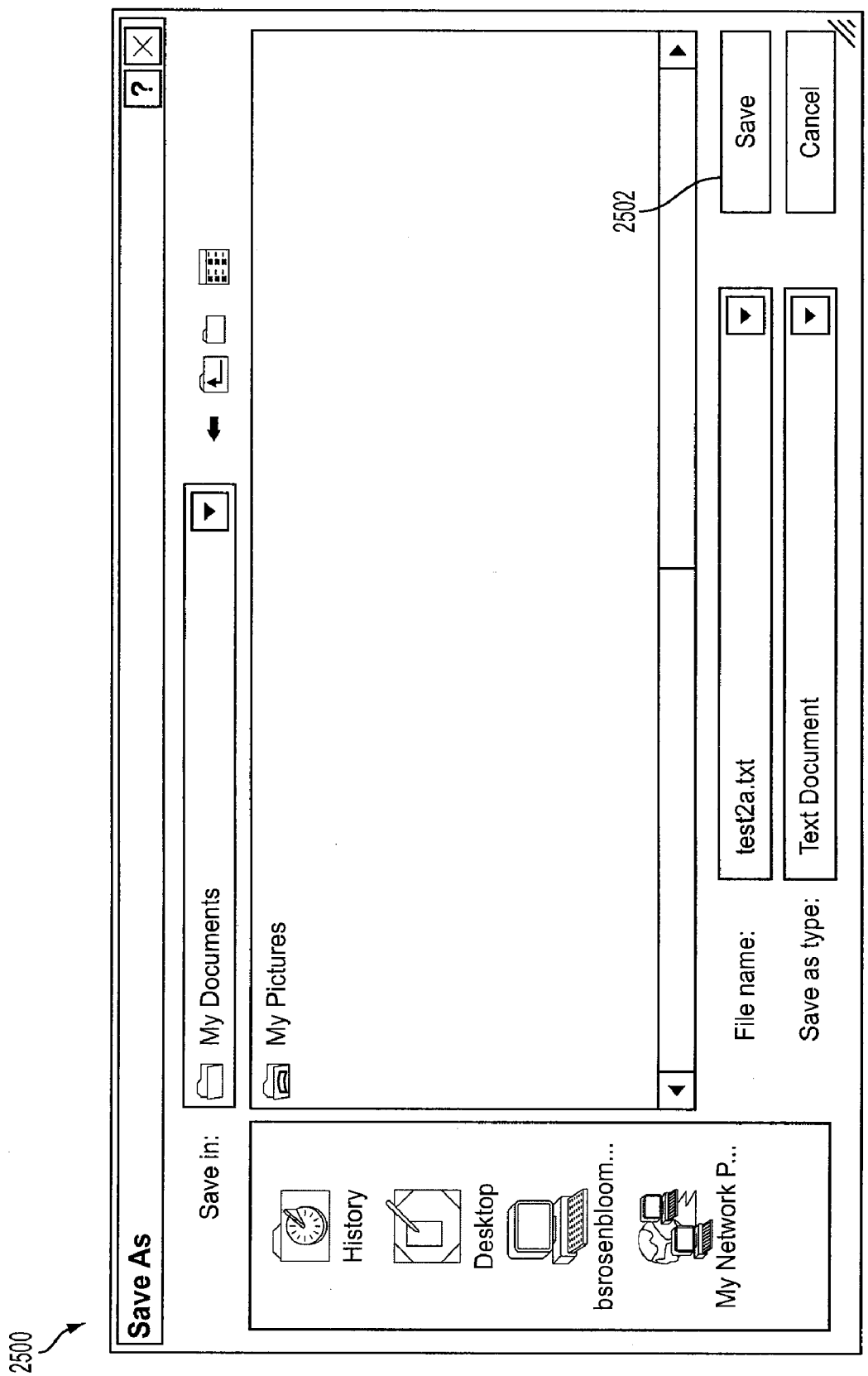
FIG. 25 is an example save as screen, according to an embodiment of the present invention.

The client can transfer the document to a local storage device 112 by activating a transfer button 1854 associated with the document. For example, the client can transfer the document named "test2a" to local storage 112 by activating transfer button 1854(*b*). When the client activates this button, a save as box 2500 (see FIG. 25) is displayed. Save as box 2500 allows the client to specify the location on local storage device 112 to where the document (or a copy of the document) will be transferred and to specify a name for the file. After the client activates save button 2502, the document will be transferred to the specified location and will be given the specified name. After transferring the document to local storage, the client can use a conventional document editing program to edit the document.

Additionally, after transferring the document, the client may choose to "lock" the document within collaboration tool 120 so that no one else can transfer the document to their own local storage. This will prevent two people from editing the same document at the same time. As explained above, a client locks a document by selecting the document (e.g., clicking in the selection box located adjacent to the document) and then activating lock button 1804.

Figure 26:
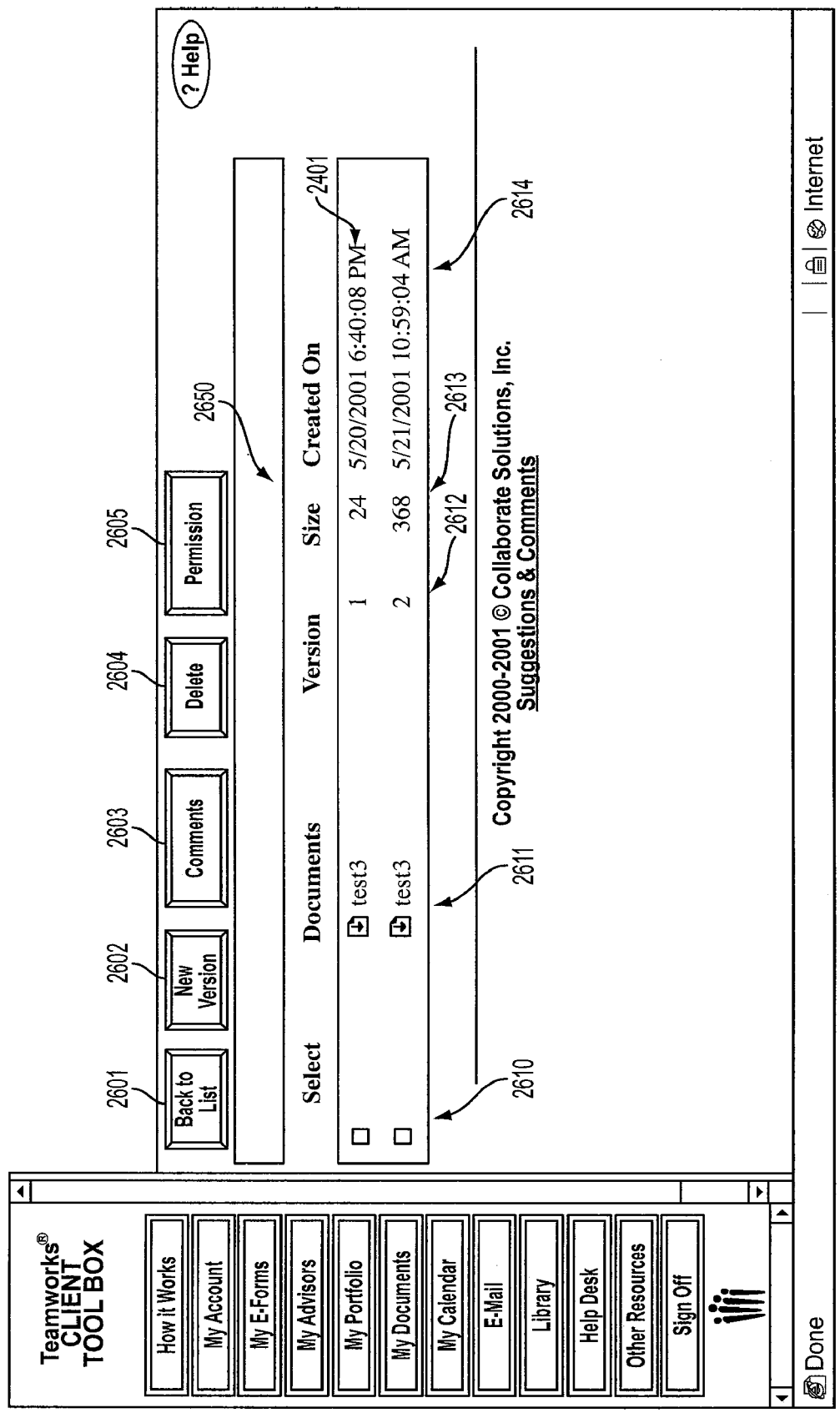
FIG. 26 is an example of a document detail screen, according to an embodiment of the present invention.
Figure 28:
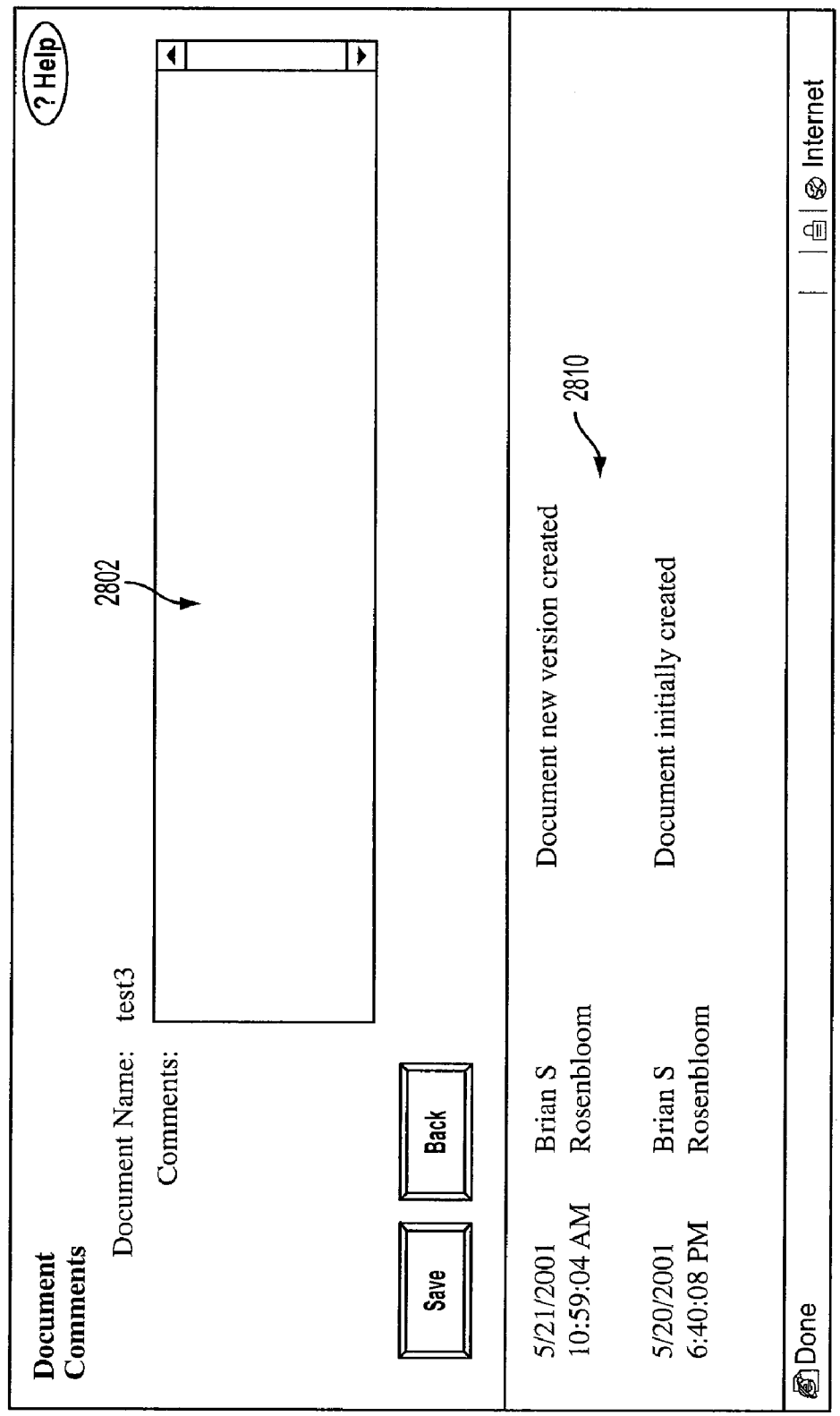
FIG. 28 is an example of a document comments screen, according to an embodiment of the present invention.

When the client is finished making all of his desired edits, the client can create a new version of the document by transferring the edited document (or a copy of the edited document) back to collaboration tool 120 in the manner described below. After the new version of the document is transferred to collaboration tool 120, the client's advisor(s) can review the new version and make their own edits to this version. The client creates a new version by selecting (e.g., clicking on) the name of the document in content table 1850. Selecting the name of the document causes a document detail screen 2600 (see FIG. 26) to be displayed. This screen allows the user to, among other things, view information concerning the properties for the selected document and to transfer the edited document back to collaboration tool 120, thereby creating a new version of the document. Document detail screen 2600 includes function buttons 2601-2605, including a back to list button 2601, a new version button 2602, a comments button 2603, a delete button 2604, and a permission button 2605.

Document detail screen 2600 also includes a version table 2650 for displaying a list of the versions of the selected document. As shown in the example FIG. 26, the document named "test3" has two versions: version1 and version2. Version table 2650 includes a select column 2610 that contains selection boxes which allow the user to specify which version in the table is to be processed when a function is initiated, such as comments, delete, permission, etc., a documents column 2611 that displays the name (or other identifier) of each version, a version column 2612 that displays the current version (or version number) for a document or other item, a size column 2613 that displays the size of the document in bytes or other form of measurement, and a created on column 2614 that displays the time and date that the item was created. Other information may be displayed and other formats may be used to display the information.

A client transfers an edited document back to collaboration tool 120 by selecting new version button 2602. In response to the client activating new version button 2602, an add document version screen 2700 (see FIG. 27) is displayed to the client. Add document version screen 2700 functions in the same manner as add document form 1900. That is, the client selects the document to be transferred to collaboration tool 120 by activating select file button 2702. Selecting this button causes window 2000 to be displayed. As described above, window 2000 enables the client to navigate through the client's various local folders to find the document that the client desires to transfer to collaboration tool 120. Once the desired document is found, the client selects the document and activates the open button 2002. This will cause the add document version screen 2700 to re-appear with the selected file listed in window 2710. At this point, the client optionally inputs a comment into comments box 2790, and then activates ok button 2714. After activating ok button 2714, the selected document is transferred to tool collaboration tool 120, which updates client database 130 to indicate that of the document has been transferred to the system. Optionally, the selected file or a pointer to the selected file may be sent to collaboration tool 120. Additionally, if the client selected e-mail notification by placing a mark in checkbox 2715, then after the user activates ok button 2714, an e-mail (or other communication) is automatically sent to one or more of the advisors listed in the client's advisor list. More specifically, the e-mail is automatically sent to those advisors that at least have read permission for the document. In the above manner, the client can create a new version of any document within his home folder.

Comments associated with a version of a document can be reviewed through document detail screen 2600. A user can view comments associated with a version of a document and provide comments for a version of a document by selecting the desired document version and activating comments button 2603. In response to the user activating comments button 2603 a document comments screen 2800 is displayed. Document comments screen 2800 includes a comment box 2802 for receiving the client's comments and a comment area 2810 for displaying the comments that have previously been inputted.

Figure 24:
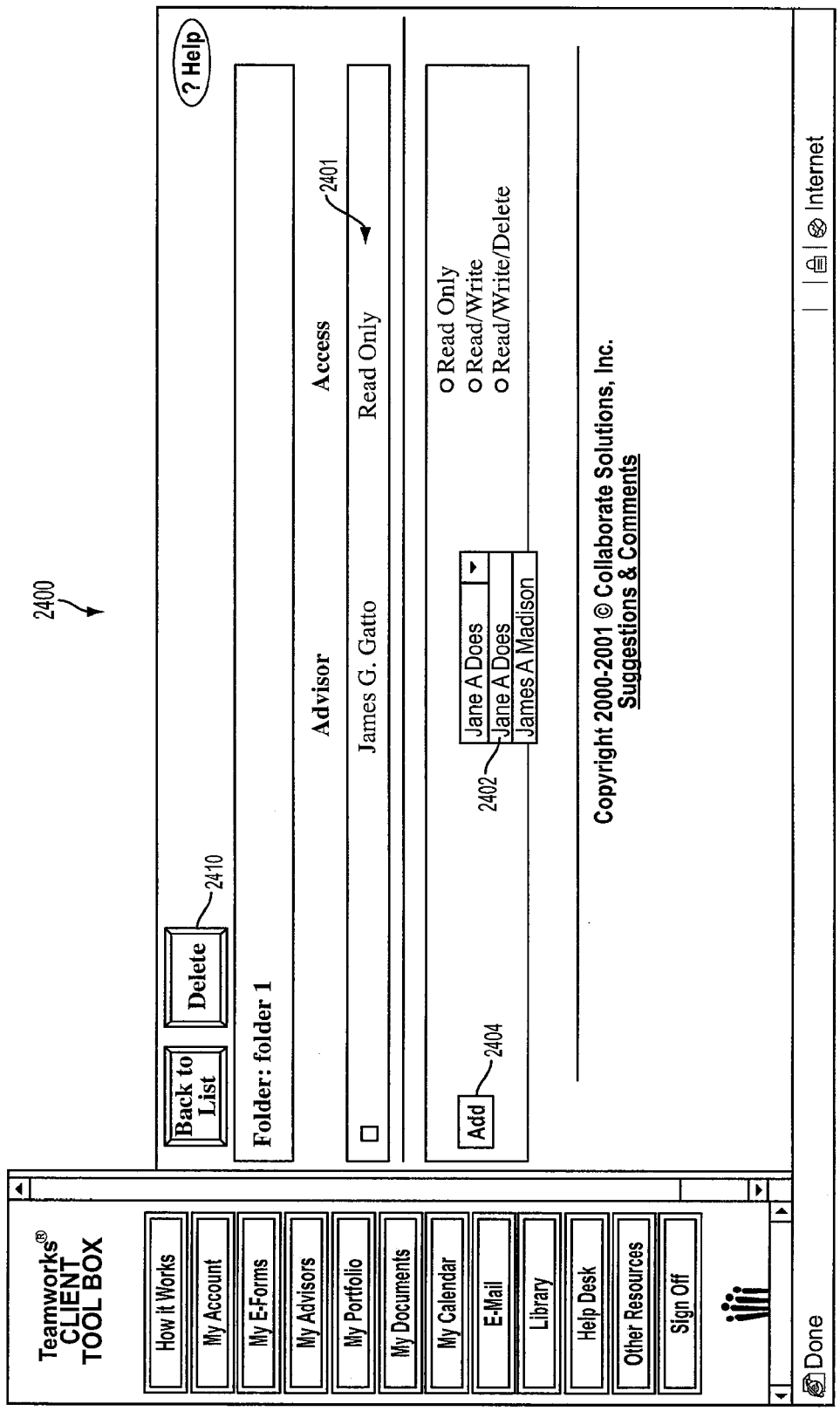
FIG. 24 is an example of a permissions screen, according to an embodiment of the present invention.

The client can also set the permissions for each version of a document. The client accomplishes this by selecting a version listed in version table 2650 and activating permission button 2605. Selecting permission button 2605 causes a permission screen 2400 (see FIG. 24) to be displayed. Permission screen 2400 is described more fully further herein.

At step 1716, advisor research and/or other operations may be performed, such as education of clients, formulation of client plans, and other opportunities. Similarly, the client may also perform research, at step 1718.

At step 1720, the client and one or more advisors may collaborate in accordance with the present invention. For example, the collaborative process may be carried out via the independent review and editing of any of the documents which have been placed in the clients home folder, or of the financial plan for that client. Each advisor may perform their own part of the review process at any time or location that is convenient for them. As each active advisor completes their review, the advisors may send comments and other information to any member (or all members of the team) via the e-mail sub-module 805 (or other mode of communication), and may create and upload suggested revisions. This review process may continue until a consensus is reached.

The client may choose any amount of involvement, as desired. For example, the client may choose to oversee the collaboration process and take an active role by providing detailed instructions, guidance and other input. Also, the client may opt to review the final product at the end of a collaboration process.

Since advisors may not edit or view documents in another advisor's home folder, all collaboration may be done via the client's home folder, according to an embodiment of the present invention. By setting up a folder(s) (or other common forum or area) for these documents, a team (a client and his advisors) may control, maintain, and organize the work to be reviewed. The shared folder may be set up by the client, and the permissions may be granted (by the client) to any advisor that needs to move documents to that folder. Any document placed in this folder may then have permissions set (by the client) before any advisors may view the document.

Thus, before an advisor can review and edit a document within the client's home folder, the advisor must be given the appropriate access privileges to do so, provided the advisor doesn't already have such access privileges. A client can give one or more advisors the permission to review, edit, and delete a document that is within the client's home folder.

To give such permission to an advisor, the client must first add the advisor to his advisors list and set the advisors access status to "allow," as described previously herein. Next, in one embodiment, the client must give the advisor at least "read" access to the folder in which the document resides if the advisor doesn't already have such access. To do this, the client activates my documents button 1112 to view the files and folders in the client's home folder and then locates the folder in which the document resides. For example, the document may reside in the home folder or in a folder within the home folder. If the document resides in the home folder, then by activating permission button 1806 while the contents of the home folder are displayed and while no folder within the home folder is selected, the client will be able to set the permissions for the home folder. If the document resides in a folder within the home folder, then by selecting the folder and then activating permission button 1806, the client will be able to set the permissions for the selected folder. By selecting more than one folder and then activating permission button 1806, the client is able to set the permission for the group of folders, such that each folder in the group will have the same permissions.

In response to the client activating permission button 1806, documents sub-module 903 displays a permission screen 2400 (see FIG. 24) in display area 1140. Permission screen 2400 includes a status area 2401 that displays the advisors that have been given access to the selected folder (or group of folders and documents) and displays the advisor's access level. Permission screen 2400 also includes a drop down list 2402 that lists all of the advisors who are included in the client's advisors list that have not been given access to the folder. Drop down list 2402 enables the client to select a listed advisor. After selecting the advisor from drop down list 2402, the client selects the access to give to the selected advisor for the selected folder. In the embodiment shown in FIG. 24, three access levels are defined: read, read/write, and read/write/delete. Lastly, after selecting an advisor and an access level, the client activates add button 2404. Activating add button 2404 will give the selected advisor the selected access rights to the selected folder. If an advisor is not given at least "read" rights to the selected folder, then the advisor would not be able to see the contents of the folder or view or edit any document within the folder. In this, way the client can set the permission for each folder, including his home folder.

After setting the permissions for the folder in which the document resides, the client may have to set the permissions for the document itself in order to give an advisor access to the document. To do this, the client locates the document within his home folder, selects the document, and then activates permission button 1806. As described above, activating permission button 1806 causes permission screen 2400 to be displayed. Thus, the client uses permission screen 2400 as described above to give the advisor a selected level of access to the document. In this way, the client can determine which advisors get to review, edit and delete the client's documents.

By selecting more than one document and folder and then activating permission button 1806, the client is able to set the permission for the group of documents/folders, such that each document and folder in the group will have the same permissions.

If the client has given to a certain advisor certain access rights to a document or folder, but desires to take away those access rights, the client can select the document of folder, activate permission button 1806, select the certain advisor displayed in the status area 2401, and then activate delete button 2410. This will remove all of the selected advisor's access rights to the document or folder.

Once an advisor is given the appropriate access (e.g., read or read/write access) to one of his client's folders, the advisor can perform a variety of tasks, such as create a new folder within the client's folder, create a new document within the client's folder, and move a document from the client's folder to another folder, such as the advisor's home folder or another folder. To create a new folder within the client's folder, the advisor activates new folder button 2901. Activating this button causes create folder screen 2100 to be displayed. This screen enables the advisor to name the new folder and to optionally provide comments. When the client activates ok button 2102, collaboration tool 120 updates database 120 to reflect that a new folder has been created in the folder and a new folder having the name specified by the advisor will appear in content table 2950. To add a new document to the client's folder, the advisor activates new document button 2902. Activating this button causes add document form 1900 to be displayed, which is described above. To move a document from the client's folder to another folder, the advisor activates move button 2904. Activating this button causes move document(s) screen 2300 to be displayed, which is described above.

Similarly, once an advisor is given the appropriate access to one of his client's documents, the advisor can review, edit, delete and create a new version of the document by performing the following steps. First, the advisor accesses clients sub-module 802 by activating my clients button 1006. As described above, in response to the advisor activating my clients button 1006 the client screen 1200 is displayed. Next, the advisor selects the client (e.g., clicks on the client's name in client table 1250). Clicking on the client's name in client table 1250 causes advisor module 124 to open the selected client's home folder and display the contents of the client's home folder in a documents screen 2900 (see FIG. 29).

The advisor can view a document by activating a view button 2952 that is associated with the document. For example, the advisor can view the document named "test3" by activating view button 2952. When the client activates this button, advisor module 124 displays the contents of the document to the advisor.

To make edits to a document that is listed in screen 2900, the advisor must first transfer the document (or a copy of the document) to the advisor's local storage device 103, if the document is not already stored therein. The advisor can transfer the document to a local storage device 103 by activating a transfer button 2954 associated with the document. For example, the advisor can transfer the document named "test3" to local storage 103 by activating transfer button 2954. When the advisor activates this button, save as box 2500 is displayed. As described previously, save as box 2500 allows the advisor to specify the location on local storage device 103 to where the document will be transferred and to specify a name for the file. After the advisor activates save button 2502, the document will be transferred to the specified location and will be given the specified name. After transferring the document to local storage, the advisor can use a conventional document editing program to edit the document.

Additionally, after transferring the document, the advisor may choose to "lock" the document so that no one else can transfer the document to their own local storage. This will prevent two people from editing the same document at the same time. An advisor locks a document by selecting the document (e.g., clicking in the selection box located adjacent to the document, if there is one) and then activating lock button 2905. To unlock the document, the advisor activates unlock button 2906.

Figure 30:
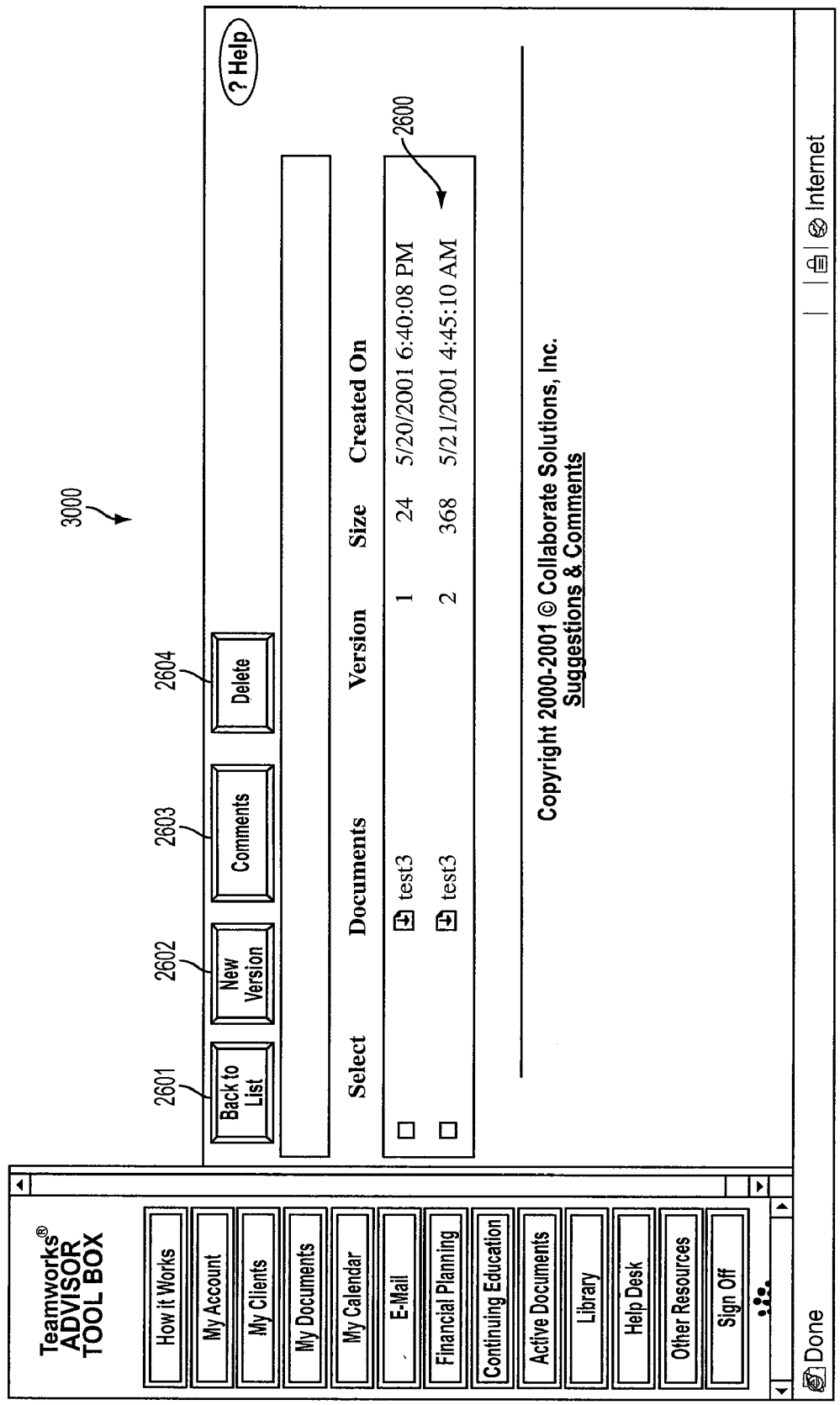
FIG. 30 is an example of a document detail screen, according to an embodiment of the present invention.

When the advisor is finished making all of his desired edits, the advisor can create a new version of the document by transferring the edited document (or a copy of the edited document) back to collaboration tool 120 in the manner described below. After the new version of the document is transferred to collaboration tool 120, the advisor's client can review the new version and make his own edits to this version. The advisor creates a new version by selecting (e.g., clicking on) the name of the document in screen 2900. Selecting the name of the document causes a document detail screen 3000 (see FIG. 30) to be displayed. Document detail screen 3000 is exactly like document detail screen 2600 with the exception that document detail screen 3000 does not include permission button 2605. That is document detail screen 3000 includes function button 2601-2604 and a version table 2600.

Like screen 2600, document detail screen 3000 allows the advisor to, among other things, view information concerning the properties for the selected document and to transfer the edited document (or a copy of the edited document) back to collaboration tool 120, thereby creating a new version of the document.

The advisor transfers an edited document back to collaboration tool 120 by selecting new version button 2602. In response to the advisor activating new version button 2602, the add document version screen 2700 is displayed to the advisor. The advisor selects the document to be transferred to collaboration tool 120 by activating select file button 2702. Selecting this button causes window 2000 to be displayed. As described above, window 2000 enables the advisor to navigate through the advisor's various local folders to find the document that the advisor desires to transfer to collaboration tool 120. Once the desired document is found, the advisor selects the document and activates the open button 2002. This will cause the add document version screen 2700 to re-appear with the selected file listed in window 2710. At this point, the advisor optionally inputs a comment into comments box 2790, and then activates ok button 2714. After activating ok button 2714, the selected document is transferred to tool collaboration tool 120, which updates client database 130 to indicate that a new version of the document has been created. Optionally, the selected file or a pointer to the selected file may be sent to collaboration tool 120.

Additionally, if the advisor selected e-mail notification by placing a mark in checkbox 2715, then after the advisor activates ok button 2714, an e-mail (or other communication) is automatically sent to the client and to one or more of the advisors listed in the client's advisor list. More specifically, the e-mail is automatically sent to those advisors that at least have read permission for the document. In the above manner, the advisor can create a new version of a document within his client's home folder.

Comments associated with a version of a document can be reviewed through document detail screen 3000. The advisor can view comments associated with a version of a document and provide comments for a version of a document by selecting the desired document version and activating comments button 2603. In response to the advisor activating comments button 2603, document comments screen 2800 is displayed. Document comments screen 2800 includes a comment box 2802 for receiving the advisor's comments and a comment area 2810 for displaying the comments that have previously been inputted.

The advisor can delete one of the documents within his client's home folder by returning to client screen 1200, clicking on the client name, selecting the document from screen 2900, which will display the contents of the client's home folder, and then activating delete button 2903.

Referring back to process 1700, at step 1722, each of the documents and other information created as part of the collaboration process may be saved by collaboration tool 120 in one of its databases 130-138.

The present invention represents an approach to client-advisor collaboration that provides tools which optimize the collaboration process in various different ways. For example, important documents and other material for each client may be available to the client's advisor(s) (depending on how the client sets the permissions for each document). Also, each advisor may perform the activities which are native to their specialty. Every advisor may have immediate access to the client information via the Internet (or other methods of communication). Additionally, as seen from the above description, collaboration tool 120 allows a client to devise a team of advisors, all of which may seamlessly interact as needed to support the client's needs. For example, if a client has a specific document that needs to be reviewed and edited by a team of advisors, the client can create the advisor team by adding each advisor to his advisors list and giving each of the advisors the permission to review and edit the document.

Collaboration tool 120 may also have extensive reference facilities and links to other web sites and facilities. A financial planning module may also be a feature of the present invention which may allow a financial planner to devise personalized plans for each of his clients. Collaboration tool 120 may also provide a document generation and forms capability, which may allow for easy and quick tailoring of common legal documents to a client's specific needs and goals. These and other additional features are further described below.

Client module 122, in addition to having the sub-modules described above, includes the following additional sub-modules according to the embodiment shown in FIG. 9: account sub-module 901, calendar sub-module 904, e-mail sub-module 905, financial planning sub-module 906, library sub-module 907, help desk sub-module 908, other resources sub-module 909, and electronic forms ("e-forms") sub-module 910. Similarly, advisor module 124, in addition to having the sub-modules described above, includes the following additional sub-modules according to the embodiment shown in FIG. 8: account sub-module 801, calendar sub-module 804, e-mail sub-module 805, financial planning sub-module 806, continuing education sub-module 807, forms sub-module 808, library sub-module 809, help desk sub-module 810, and other resources sub-module 811. Client account sub-module 901, calendar sub-module 904, e-mail sub-module 905, library sub-module 907, help desk sub-module 908, and other resources sub-module 909 provide the same features and functionality as advisor account sub-module 801, calendar sub-module 804, e-mail sub-module 805, library sub-module 809, help desk sub-module 810, and other resources sub-module 811.

Figure 31:
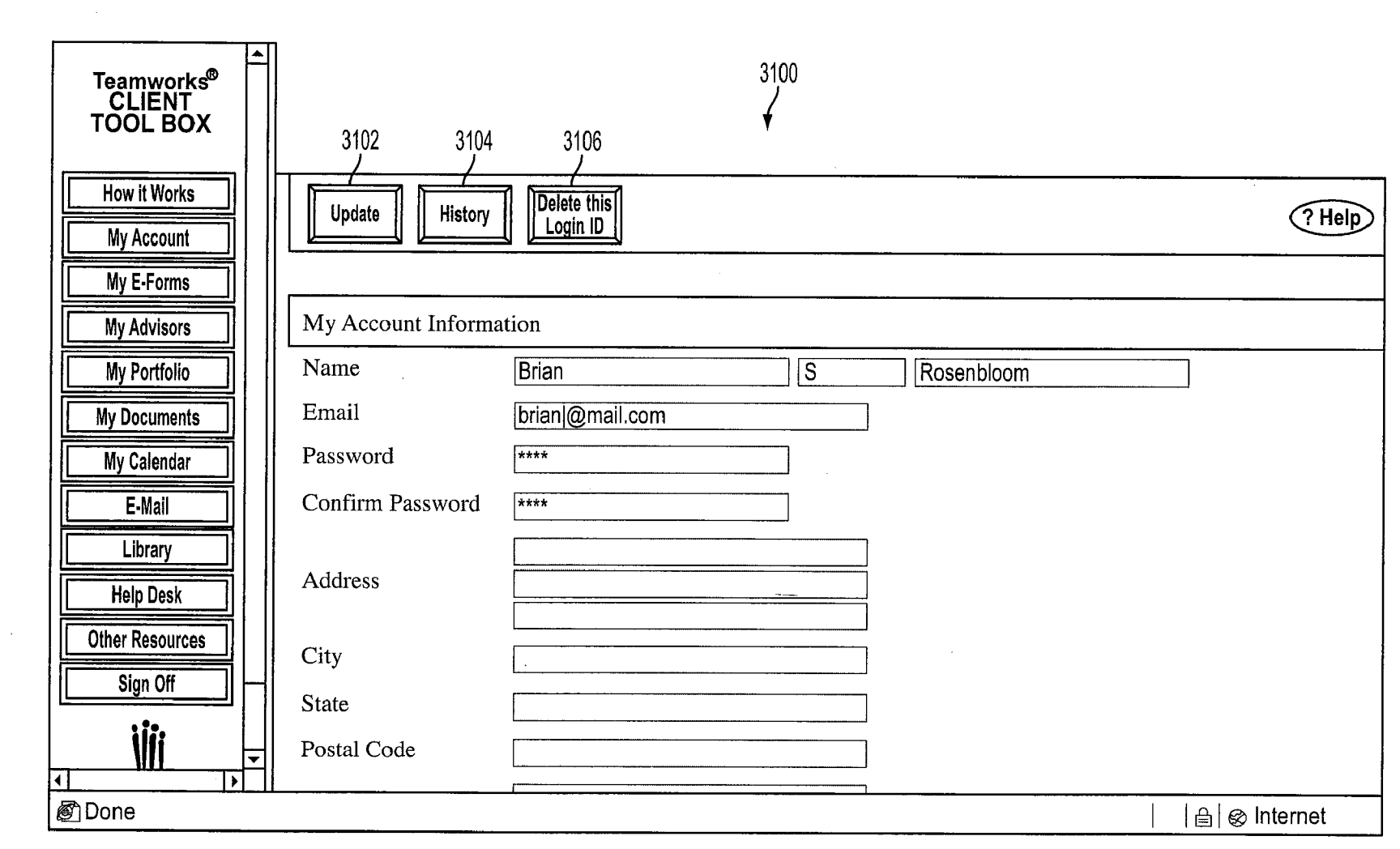

Account sub-module 801/901 allows a user (client and advisor, respectively) to change their billing, e-mail, login, security and/or other information ("account information"). In one embodiment, collaboration tool 120 maintains each user's account information in database 129. A client accesses this module by activating my account button 1104 and an advisor by activating my account button 1004. In response to a user accessing account sub-module 801/901, collaboration tool 120 reads the account information from the database and displays it to the user in an account screen (see FIG. 31 for an example client account screen 3100). At this point, the user can update the user's account information by editing the information and activating an update button 3102.

In addition to displaying the user's account information and enabling the user to update the account information, account sub-module 801/901 enables the user to view history information concerning each document that has been placed in the user's home folder. To view this information, the user activates history button 3104. In response to a user activating history button 3104, a history screen 3200 (see FIG. 32) is displayed. History screen 3200 displays information accessed from a historical database (e.g., database 136) where information related to documents, folders, and other items may be stored and accessed. For example, a historical log of various actions (e.g., read, write, delete, etc.) taken for a particular document may be displayed along with information related to who took the corresponding action, when and from what source. Other information may also be available. A user may generate a personalized report based on user defined factors as applied to historical data for tracking and maintenance purposes. History page may display various information, such as document type, version, date, change action, changed by, source folder, move folder and/or other information.

Lastly, the user can delete his account information from collaboration tool by activating delete this login id button 3106. As a result, all files in the home folder for this user may be deleted from the system and the user may no longer be able to log in to collaboration tool 120. In addition, billing (and/or other) activity for this account may be terminated.

Calendar sub-module 804/904 of the present invention provides a personal calendar for a user (advisor and client, respectively). The personal calendar may be used to track events, tasks, or other schedule related items. The calendar may also be used to set automatic notifications and reminders. Users may use the person calendar to schedule meetings, tasks, activities and other events. For example, a client, associated advisors and other participants may access the calendar feature where meetings, conferences, due dates, tasks, social activities and other events may be coordinated around a particular client. A client may use the calendar feature to view a comprehensive timeline of activities and other events. The client may view the events involved for a particular date, week, month, or other user defined time frame.

When a client accesses the client's personal calendar, the client may view activities, meetings, due dates, alarms and other events associated with each individual advisor or other participant within the client's collaborative team. For example, a calendar event that may be the responsibility of a particular advisor may be displayed in a distinct color, manner or other identifying manner. Other advisor specific events (or tasks, etc.) may be displayed in another distinct color, manner, or other identifying manner. This enables the client to visually distinguish certain events (or tasks, etc.) that may be the responsibilities of different advisors. Other implementations may be used.

When an advisor accesses a calendar specific to a client, the advisor may view events (or tasks, etc.) that may be the responsibility of other advisors. The events (or tasks, etc.) that may be the responsibility of the viewing advisor may be highlighted. The calendar specific to the client may be accessed at the client's site.

According to another embodiment of the present invention, an advisor may have access to the advisor calendar at the advisor's site, where conference, tasks and other events may be scheduled and later uploaded onto the client's specific calendar. While events are being uploaded and coordinated with the client, the advisor may have other conferences, tasks and events that may be specific to other clients. These conferences, tasks and events of various clients may be maintained on the advisor's calendar to avoid double booking and overlapping events. Various visual tools may be used to assist the advisor in tracking and organizing various events for different clients. For example, as each event is uploaded from an advisor's calendar onto a client's calendar, the uploaded event may be displayed in a different manner so that the advisor may know that the event has been scheduled on the client's calendar but remained on the advisor's calendar as a reminder.

FIG. 42 is an example of a calendar feature, according to an embodiment of the present invention. Calendar 4210 is an example of a calendar, which is displayed in response to the client activating my calendar button 1114 or advisor activating my calendar button 1010. Navigational arrows 4212 and 4214 may be used to view past calendar displays (e.g., previous months, weeks, days, etc.) and future calendar displays (e.g., next months, weeks, days, etc.). Other views of a calendar display may include month view 4230, week view 4232, day view 4234, and other user defined views 4236.

Various calendar options and features may also be available, such as schedule meeting function 4240, alarm function 4242, notification function 4244, tasks/to do function 4246, detail function 4248 and other functions. Schedule meeting function 4240 may enable a user to identify one or more participants of a meeting. This function may also enable the user to specify a topic, backup dates and times, instructions, directions, and other information. The intended participants may have the option to accept or reject with or without an explanation. The intended participant may have the option to suggest an alternative time for a meeting (or conference, etc.) if the suggested time is not available. The user may also be informed of whether one or more participants have a conflict.

Alarm function 4242 may enable a user to program an alarm (or alert) that may be used to remind the user of one or more predetermined events at a user defined time period or predetermined time intervals.

Notification function 4244 may enable a user to define preferred modes of notification, such as e-mail, pager, cell phone, phone, PDA, and other forms of communication via wireless devices, Internet and others. The user may specify different modes of communication for different predetermined triggers.

Tasks/to do function 4246 may enable a user to specify a "things to do list" with associated reminders and other planning tools. A user may also be assigned tasks and/or projects. Also, a user may also use this function to assign tasks and/or projects to other team members of a collaborative team.

Detail function 4248 may be used to provide a user with details of one or more selected events, tasks, conference, etc. Detail information may include information related to participants of a selected event, time and/or date information, topics and agendas, and other information.

Financial planning sub-module 906 allows a client to review the client's financial information, plan, and/or other financial data. The financial (or other) plan may be a result of the collaborative efforts of the client's collaboration team (e.g., the client's advisors). In another example, financial planning sub-module 906 enables the client to view aggregated data which may include account (or other) information from various sources, such as different banks, credit unions, accounts, stocks, bonds and other sources. This feature of the present invention may enable the client to view consolidated financial information, for example. The client may also sort aggregated data according to user defined factors. Other types of client data from more than one source may be aggregated, in accordance with the present invention. The client accesses financial planning sub-module 906 by activating my portfolio button 1110 from client interface 1100.

Financial planning sub-module 806 allows an advisor to create, review, and modify a financial and/or other plan for a client. Preferably, financial planning sub-module 806 may use the functionality provided by a third party entity (e.g., a strategic partner). That is, when an advisor invokes financial planning sub-module 806, the financial planning sub-module 806 may launch or connect to a third party program for providing financial planning services, such as the NaviPlan™ financial planning software provided by Emerging Information Systems Incorporated (EISI). The advisor invokes financial planning sub-module 806 by activating financial planning button 1014 from advisor interface 1000.

E-mail sub-module 805/905 allows a user (advisor and client, respectively) to send or receive e-mail to any other user. Preferably, e-mail sub-module 805/905 may use the functionality provided by a third party entity (e.g., a strategic partner). That is, when a user invokes e-mail sub-module 805/905, the e-mail sub-module 805/905 may launch or connect to a third party e-mail program for providing e-mail services, such as a desktop e-mail program (e.g., Microsoft Outlook). The advisor invokes e-mail sub-module 805 by activating e-mail button 1012 from advisor interface 1000, and the client invokes e-mail sub-module 905 by activating e-mail button 1116 from client interface 1100.

E-mail messages may be used to coordinate activities or tasks in the collaboration process. According to an embodiment of the present invention, collaboration tool 120 may send automatic e-mails in a variety of cases, such as when a document is revised or deleted, or when an advisor is added to or removed from a client's advisors list. Other triggers or scheduled events may be defined. Other forms of communication, which may include wireless, Internet and other modes, may also be implemented in accordance by the present invention.

Library sub-module 809/907 enables a user (advisor and client) to make use of an extensive research and online content library provided by a third party, such as a strategic partner (for example: Forefield, Inc. of Marlboro, Mass.). The library may provide exhaustive, in depth financial and other information on a wide variety of planning, investment, advisory and other topics. Once library sub-module 809/907 has been invoked, the user may be presented with a number of search and selection topic groups. The advisor invokes library sub-module 809 by activating library button 1020 from advisor interface 1000, and the client invokes library sub-module 907 by activating library button 1118 from client interface 1100.

A library feature of the present invention may enable a user to perform extensive research on a variety of topics and areas of interest. Various methods for research may be implemented by a user of the present invention. For example, a user may search by search terms (e.g., similar to, sounds like, find stems, exact phrase, one or more terms, etc.), table of contents (e.g., folders), selection by goals, and other search methods.

For example, a user may perform research by selecting one or more goals of interest. In this embodiment, goals in financial (or other) planning areas may allow the user to focus on one area or work with multiple areas to address the goals of an advisor's clients. A list of goals and related issues may open with folders. Topics may include one or more of Basic Planning, Business Owner, Education Planning, Estate Planning, Government Benefits, Investment Planning, Protection Planning, Retirement Planning, Special Situations, Tax Planning, and other areas of interest.

A user may drill down on more detailed topics and/or areas of interest. For example, a folder symbol may indicate more detailed topics (e.g., more folders and/or documents) and a document symbol may open directly to a document. Other variations may be implemented.

A user may view and access resources and varying levels of detailed explanations and/or summaries. The present invention may enable advisors (or other users) the ability to formulate presentations, documents and other forms of data for the client (or other user). The presentation may be available in the client's home folder or other common forum for the client and other advisors to view and/or access.

Help desk Sub-Module 810/908 enables a user to contact an appropriate technical resource to assist the user in using collaboration tool 120. This tool may also be used to report problems or bugs that the user encounter in using too 120. When help desk sub-module 810/908 is invoked, a fill out form (not shown) is displayed to the user. The user may fill out the form describing the user's question or problem. This form may be automatically submitted to an internal technical resource who may research the issue and respond to the user once a resolution is available. In certain cases, the resolution process may involve direct contact via a phone, or other mode of communication. The present invention may also provide a link to a technical support entity where a user may contact the technical support entity for assistance and other inquiries. The advisor invokes help desk sub-module 810 by activating help desk button 1022 from advisor interface 1000, and the client invokes help desk sub-module 908 by activating help desk button 1120 from client interface 1100.

Other resources sub-module 811/909 provides a user with an extensive list of web based (or other) resources relating to various areas, such as business, finance, investment and other areas. These resources may be grouped into a number of selectable categories including one or more of general business, small business, consumer links, investment/financial, financial and business magazines, philanthropic, associations and other. By selecting a desired category, the user may be presented with the resources in that category including links (or other contact information) to the named web (or other) locations. These resources may provide a wide variety of research, education, investment, finance and media sites for the user in support of the user's individual or collaborative goals. The advisor invokes other resources sub-module 811 by activating other resources button 1024 on advisor interface 1000, and the client invokes other resources sub-module 909 by activating other resources button 1122 on client interface 1100.

Continuing education sub-module 807 enables an advisor to research and sign up for various educational programs for example those that may be applied towards fulfilling CEU (Continuing Education Unit) requirements for a CFP (Certified Financial Planner). This tool may be continually updated with the latest in professional educational opportunities. The advisor invokes continuing education sub-module 807 by activating continual education button 1016 on advisor interface 1000.

The advisor forms sub-module 808 works in conjunction with the client e-forms sub-module 910 to enable the advisor to create highly specific legal documents which are automatically tailored to the needs of a specific client.

More specifically, advisor forms module 808 enables the advisor to select a predefined form and send the form to one of his clients, whereby the client can fill in the form using a computer and send the filled in form back to the advisor.

Figure 33:
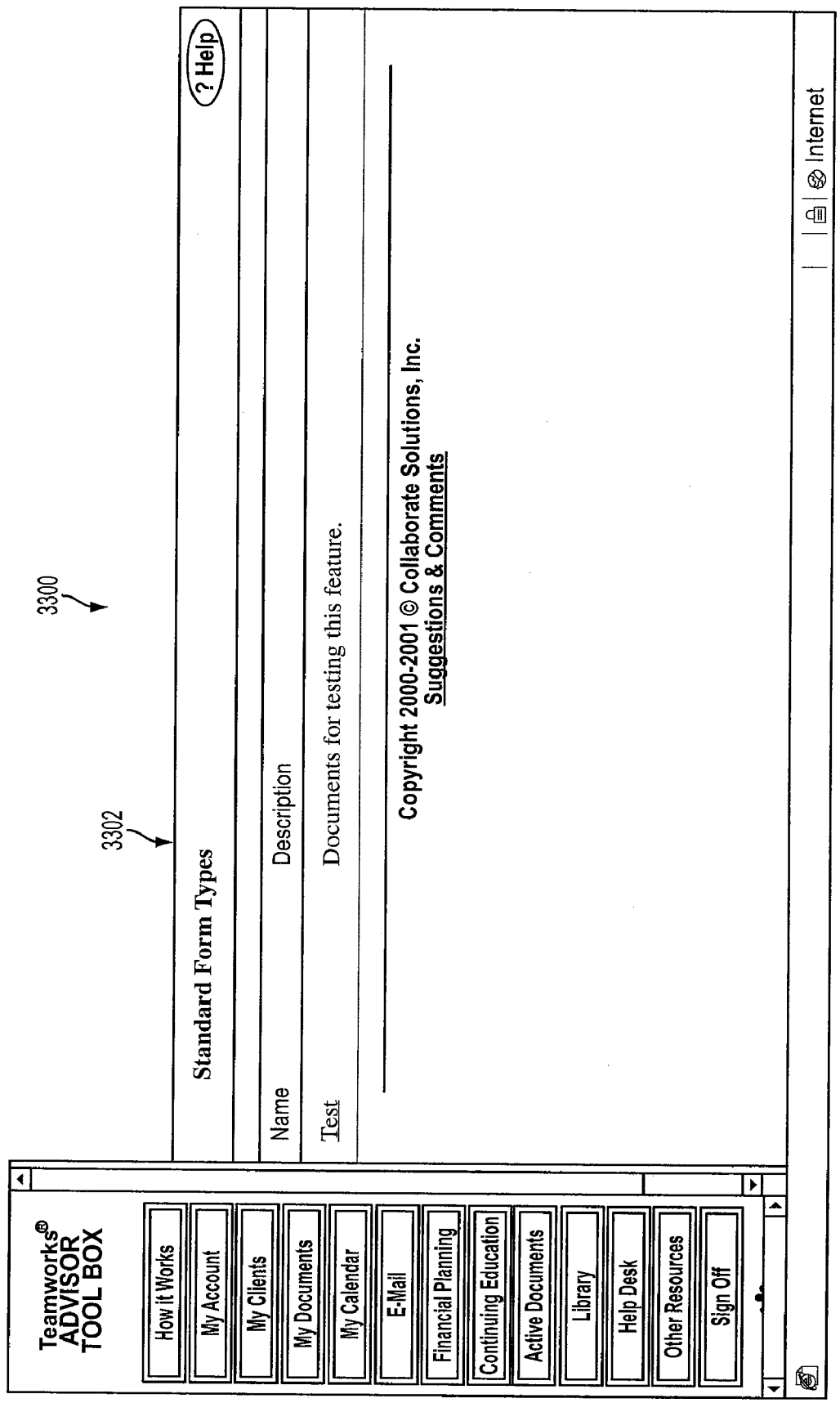
FIG. 33 is an example of a form type screen, according to an embodiment of the present invention.

The advisor invokes forms sub-module 808 by activating active documents button 1018 on advisor interface 1000. When the advisor activates this button, a forms screen 3300 (see FIG. 33) is displayed. Forms screen 3300 includes a type table 3302 that lists the available standard form types. In the example forms screen 3300 shown in FIG. 33, a single standard form type is listed, however it is contemplated that several form types may be listed. As shown, the listed standard form type is named "test."

Figure 34:
FIG. 34 is an example of a forms screen, according to an embodiment of the present invention.

The advisor selects a form to send to one of his clients by first selecting a form type that is listed in type table 3302. To select a form type from type table 3302, the advisor may click on the name of the form type. When the advisor selects a form type, a forms screen 3400 (see FIG. 34) is displayed. Forms screen 3400 provides forms drop-down list 3402 for presenting the advisor with the specific list of forms that are available in the category selected on the previous forms screen 3300. Forms screen 3400 also includes a client drop-down list 3404 for presenting the advisor with a list of clients. The advisor must select one of each (a form from drop-down list 3402 and a client from drop-down list 3404). After having made the desired selections, the advisor activates the add button 3406, which adds the selected form to the clients "e-forms" area and causes collaboration tool 120 to automatically notify the selected client (e.g., via e-mail or other communication) that the advisor has added an e-form to the client's e-forms area.

Figure 35:
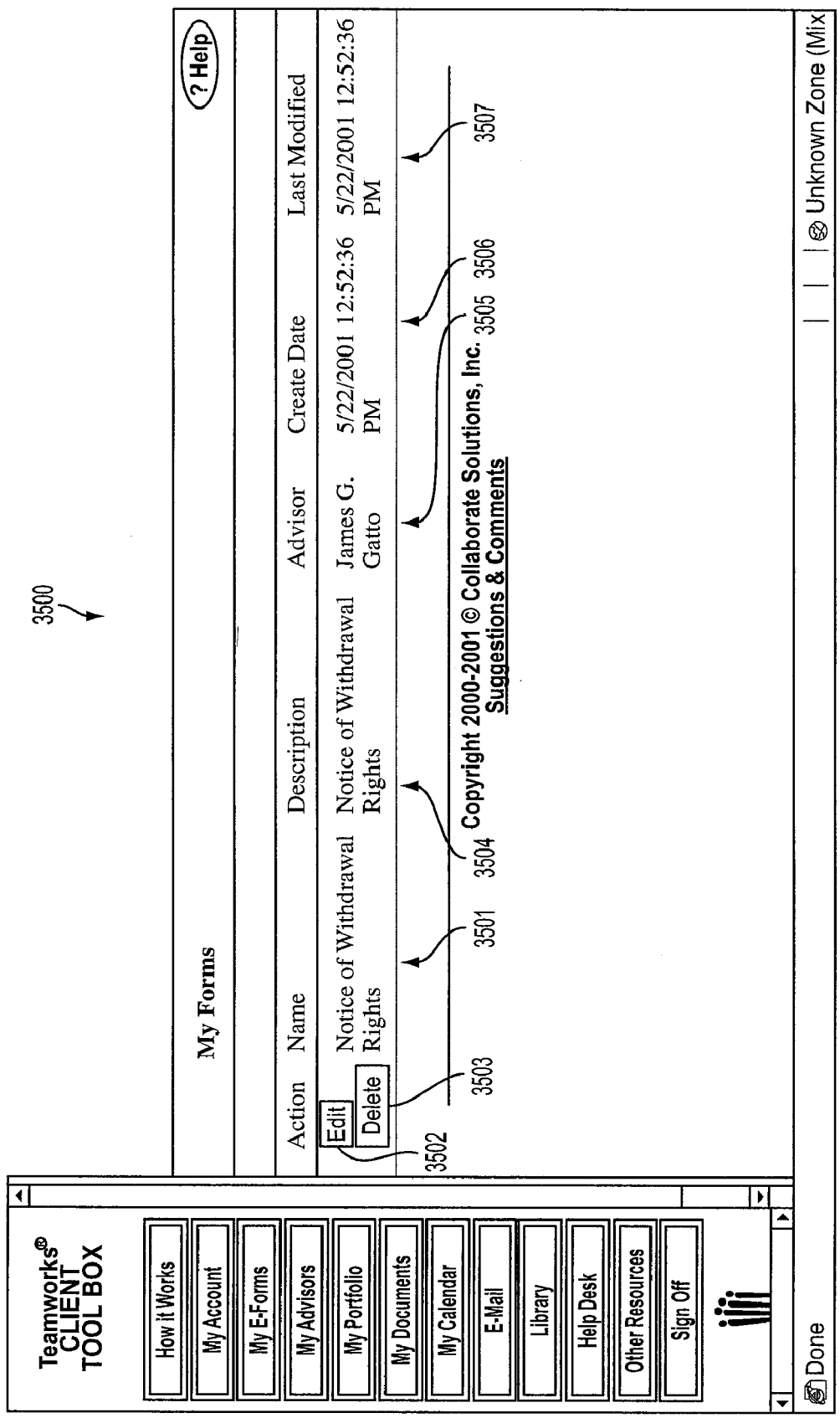
FIG. 35 is an example of a client's form screen, according to an embodiment of the present invention.

The client accesses the e-forms area by selecting my e-forms button 1106 on client interface 1100. When the client selects my e-forms button 1106, a my forms screen 3500 (see FIG. 35) is displayed. My forms screen 3500 displays a list of each form that is currently in the client's e-forms area. More specifically, for each form that is in the e-forms area, my forms screen 3500 displays the name 3501 of the form, an edit button 3502, a delete button 3503, a description 3504 of the form, the name of the advisor 3505 who placed the form in the e-forms area, the creation date 3506 of the form, and the last modification date 3507 of the form.

Figure 36:
FIG. 36 is an illustration of an exemplary electronic form (e-form).

To fill in the form, the client selects edit button 3502. If the client wants to delete the form, the client can select the delete button 3503 that is associated with the form. When the client selects edit button 3502, an e-form is displayed to the client and the client can then fill in the information requested by the e-form directly into the e-form. FIG. 36 illustrates an example e-form 3600. When the client has finished filling in the requested information, the client selects the save button 3602. After selecting save button 3602, my forms form 3500 is displayed. However, this time it is displayed, the edit button 3502 has been replaced with a done button 3702, as shown in FIG. 37. To send a copy of the filled in form to the advisor that sent it originally, the client selects done button 3702.

Once the client has filled in the e-form, saved it, and pressed the done button 3702, the advisor will see an edit button 3801 and a file button 3802 appear on forms screen 3400 (as shown in FIG. 38). By selecting edit button 3801, the advisor can review (and change if necessary) the contents of the e-form. By pressing file button 3802, the advisor causes the e-form to appear in the advisors home folder, where it may be moved to the clients home folder for review by the collaborative team (i.e., the client and one or more of the client's other advisors who are given access to the form by the client).

As can be seen from the above description, the e-forms feature of the present invention provides a convenient and easy mechanism for the advisor to collaborate with his client.

FIG. 39 is a block diagram of additional modules 3901 that can be included in client module 122 and/or adviser module 124. The additional modules 3901 include: a net meeting module 3902 which contains a software application that enables presentation and telephone conferencing utilizing the Internet; an instant messaging module 3904 allowing one user to send a short message to another user on the system at the same time; a national advisor question and answer module 3906 enabling advisors to conduct joint work efforts for clients; a national expert database and search engine module 3908 enabling a client to search for a particular subject matter expert by location, name or several other search factors; a client chat module 3910 enabling clients to open a chat window application for quick communication between each other; a real time financial planning module 3912 where advisors and clients can collaborate with automated integration of real-time aggregation of asset values through a strategic partner application (e.g., OnMoney), and a centralized client data fact finder module 3914 allowing advisors to easily capture needed client information once before preparing financial plans, and then access the same information from multiple sources within the offering.

Figure 40:
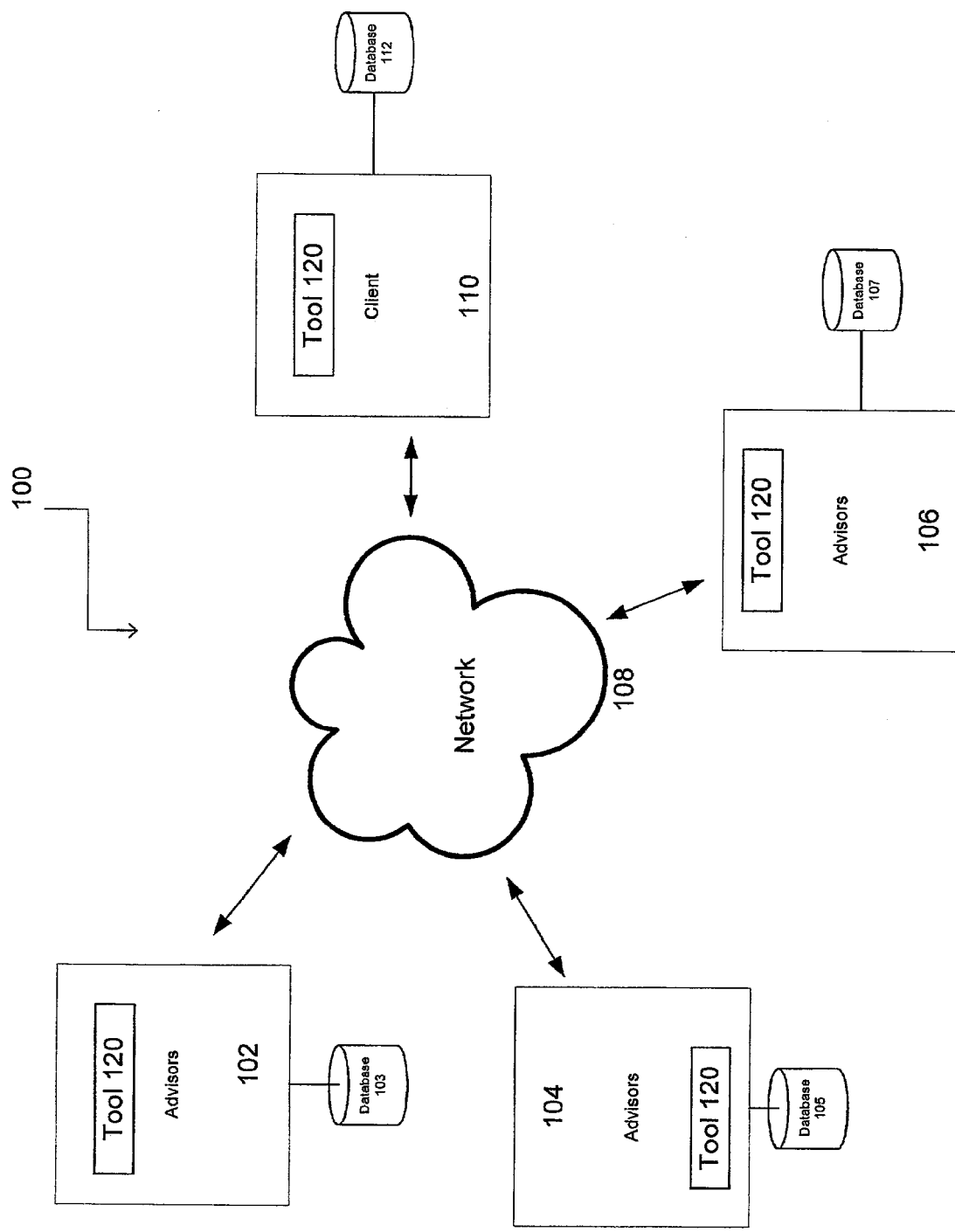
FIG. 40 is a diagram of a system for enabling clients and advisors to collaborate, according to an embodiment of the present invention.

Referring now to FIG. 40, an alternative embodiment 4000 of the present invention is illustrated in block diagram form. The embodiment shown in FIG. 40 implements a peer-to-peer architecture, rather than the client/server architecture shown in FIG. 1. It is well understood by one skilled in the art that a hybrid client/server—peer-to-peer architecture could also be used to implement the present invention and that the invention is not limited to any particular type of architecture. As shown in FIG. 40, collaboration tool 120 (or portions of collaboration tool 120) is distributed to each client and advisor such that there is no central collaboration tool. However, all of the features described above are still accessible to the clients and the advisors.

While various embodiments of the present invention have been described above, it should be understood that they have been presented by way of example, and not limitation. It will be understood by those skilled in the art that various changes in form and detail may be made therein without departing from the spirit and scope of the invention as defined by the following claims. Thus the breadth and scope of the present invention should not be limited by any of the above-described exemplary embodiments, but should be defined only in accordance with the following claims and their equivalents.

What is claimed is:

1. A computer implemented method for enabling collaboration between advisors and clients, the method being implemented in a computer system comprising one or more processors configured to execute computer program modules, the method comprising:

receiving requests to define a collaboration team that includes advisors associated with a client, wherein the requests further define different scopes of authorization for the advisors to access financial documents including financial information associated with the client;

hosting, over a network, an electronic collaboration forum that enables collaboration between the advisors and the client and, responsive to receipt of the selections, selectively provides the advisors access to stored financial documents associated with the client in accordance with the scopes of authorization for the advisors defined in the requests;

providing a first advisor access to a first financial document associated with the client through the electronic collaboration forum, responsive to reception of a request for the first financial document from the first advisor and to the scope of authorization for the first advisor permitting access to the first financial document;

receiving a modification to the first financial document from the first advisor via the electronic collaboration forum;

modifying, by the one or more processors, the first financial document accessible through the electronic collaboration forum in accordance with the received modification; and providing access to the modified first financial document via the electronic collaboration forum for (i) the client and (ii) the advisors associated with scopes of authorization that permit access to the first financial document.

2. The method of claim 1, wherein providing the first advisor access to the first financial document comprises transmitting the first financial document to the advisor over the network in response to the reception of the request for the first financial document, the reception of the request being received through the electronic collaboration forum.

3. The method of claim 1, further comprising tracking one or more actions taken by the first advisor via the electronic collaboration forum, wherein the tracked one or more actions comprise one or both of accessing and/or modifying the first financial document.

4. The method of claim 1, further comprising:
receiving an input to a calendar function associated with the electronic collaboration forum, the input scheduling an event associated with the collaboration team, wherein the scheduled event relates to one or more advisor services to be provided to the client by the collaboration team; and scheduling the event in the calendar function associated with the electronic collaboration forum.

5. The method of claim 4, further comprising:
receiving additional inputs to the calendar function of the electronic collaboration forum, the additional inputs being related to additional interactions involving the client and/or advisors from the collaboration team, the additional interactions being related to the one or more advisor services to be provided to the client that are related to the scheduled event; and scheduling the additional interactions in the calendar function in response to the additional inputs.

6. The method of claim 5, further comprising hosting a chat board in the electronic collaboration forum that is accessible to the client and the collaboration team, wherein the client and at least one advisor of the collaboration team interact with one another in a real-time online conference via the chat board to perform one or more of the scheduled additional interactions.

7. The method of claim 6, further comprising hosting, within the electronic collaboration forum, visual content associated with the client and the collaboration team performing one or more of the scheduled additional interactions such that the client is enabled to view the hosted visual content.

8. The method of claim 5, wherein the one or more advisor services include the collaboration team collaboratively accessing and interacting with the stored financial documents associated with the client, via the electronic collaboration forum, to formulate a financial plan for the client.

9. The method of claim 1, further comprising:
defining a triggering event to alert the collaboration team, the triggering event including reception through the electronic collaboration forum of one or more specific inputs from the client; and notifying one or more of the advisors on the collaboration team that the triggering event has occurred in response to a determination that the triggering event has occurred.

10. The method of claim 1, wherein the scopes of authorization comprise a scope of authorization for a second advisor that provides the second advisor with (i) read only access to the first financial document, (ii) read and write access to the first financial document, (iii) read, write, and delete access to the first financial document, or (iv) no access to the first financial document.

11. A computer implemented system for enabling collaboration between advisors and clients, wherein the system comprises one or more processors configured to:
receive requests to define a collaboration team that includes advisors associated with a client, wherein the requests further define different scopes of authorization for the advisors to access financial documents including financial information associated with the client;

host, over a network, an electronic collaboration forum configured to enable collaboration between the advisors and the client, and, responsive to receipt of the selections, selectively provide the advisors access to stored financial documents associated with the client in accordance with the scopes of authorization for the advisors defined in the requests;

provide a first advisor access to a first financial document associated with the client through the electronic collaboration forum, responsive to reception of a request for the first financial document from the first advisor and to the scope of authorization for the first advisor permitting access to the first financial document;

receive a modification to the first financial document from the first advisor via the electronic collaboration forum;

modify the first financial document accessible through the electronic collaboration forum in accordance with the received modification; and provide the access to the modified first financial document via the electronic collaboration forum for (i) the client and (ii) the advisors associated with scopes of authorization that permit access to the first financial document.

12. The system of claim 11, wherein the one or more processors are further configured to provide the first advisor access to the first financial document by transmitting the first financial document to the first advisor over the network in response to the reception of the request for the first financial document, the reception of the request being received through the electronic collaboration forum.

13. The system of claim 11, wherein the one or more processors are further configured to track one or more actions taken by the first advisor via the electronic collaboration forum, wherein the tracked one or more actions comprise one or both of accessing and/or modifying the first financial document.

14. The system of claim 11, wherein the one or more processors are further configured to receive an input to a calendar function associated with the electronic collaboration forum, wherein the input schedules an event associated with the collaboration team, wherein the scheduled event relates to one or more advisor services to be provided to the client by the collaboration team, and wherein the one or more processors are further configured to schedule the event in the calendar function associated with the electronic collaboration forum in response to the received input.

15. The system of claim 14, wherein the one or more processors are further configured to receive additional inputs to the calendar function of the electronic collaboration forum, the additional interactions involving the client and/or advisors from the collaboration team, the additional interactions being related to the one or more advisor services to be provided to the client that are related to the scheduled event, and wherein the one or more processors are still further configured to schedule the additional interactions in the calendar function in response to the additional inputs.

16. The system of claim 15, wherein the one or more processors are further configured to host a chat board in the electronic collaboration forum that is accessible to the client and the collaboration team, wherein the access to the chat board enables the client and at least one advisor of the collaboration team to interact with one another in a real-time online conference to perform one or more of the scheduled additional interactions.

17. The system of claim 16, wherein the one or more processors are further configured to host, within the electronic collaboration forum, visual content associated with the client and the collaboration team performing one or more of the scheduled additional interactions such that the client is enabled to view the hosted visual content.

18. The system of claim 15, wherein the one or more advisor services include the collaboration team collaboratively accessing and interacting with the stored financial documents associated with the client, via the electronic collaboration forum, to formulate a financial plan for the client.

19. The system of claim 11, wherein the one or more processors are further configured to:
define a triggering event to alert the collaboration team, the triggering event including reception through the electronic collaboration forum of one or more specific inputs from the client; and
notify one or more of the advisors on the collaboration team that the triggering event has occurred in response to a determination that the triggering event has occurred.

20. The system of claim 11, wherein the scopes of authorization comprise a scope of authorization for a second advisor that provides the second advisor with (i) read only access to the first financial document, (ii) read and write access to the first financial document, (iii) read, write, and delete access to the first financial document, or (iv) no access to the first financial document.

* * * * *